US011910508B2

(12) United States Patent
Taipale et al.

(10) Patent No.: US 11,910,508 B2
(45) Date of Patent: *Feb. 20, 2024

(54) DIGITAL LOAD CONTROL SYSTEM PROVIDING POWER AND COMMUNICATION VIA EXISTING POWER WIRING

(71) Applicant: Lutron Technology Company LLC, Coopersburg, PA (US)

(72) Inventors: Mark S. Taipale, Harleysville, PA (US); Timothy P. Gredler, Center Valley, PA (US); Akshay Bhat, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,630

(22) Filed: Dec. 12, 2022

(65) Prior Publication Data

US 2023/0106235 A1  Apr. 6, 2023

Related U.S. Application Data

(60) Continuation of application No. 17/135,191, filed on Dec. 28, 2020, now Pat. No. 11,528,796, which is a
(Continued)

(51) Int. Cl.
*H05B 47/185* (2020.01)
*H05B 47/11* (2020.01)
(Continued)

(52) U.S. Cl.
CPC .......... *H05B 47/185* (2020.01); *H05B 45/10* (2020.01); *H05B 45/12* (2020.01); *H05B 45/37* (2020.01);
(Continued)

(58) Field of Classification Search
CPC ...... H05B 47/11; H05B 47/19; H05B 47/105; H05B 47/185; H05B 45/10; H05B 45/37
See application file for complete search history.

(56) References Cited

U.S. PATENT DOCUMENTS 4,200,862 A  4/1980 Campbell et al.
4,418,333 A  11/1983 Schwarzbach et al.
(Continued)

FOREIGN PATENT DOCUMENTS

GB  2335334 A  9/1999
WO  2011/014657 A1  2/2011
WO  2011/054552 A1  5/2011

OTHER PUBLICATIONS

Lutron, "Tu-Wire Fluorescent Dimming Ballasts Specification Submittal", Jul. 23, 2009, 7 pages.
Nulite, "Retrofit Kit Specification Sheet", May 2008, 1 page.

*Primary Examiner* — Alexander H Taningco
*Assistant Examiner* — Pedro C Fernandez
(74) *Attorney, Agent, or Firm* — Michael S. Czarnecki; Glen R. Farbanish; Philip N. Smith

(57) ABSTRACT

A two-way load control system comprises a power device, such as a load control device for controlling an electrical load receiving power from an AC power source, and a controller adapted to be coupled in series between the source and the power device. The load control system may be installed without requiring any additional wires to be run, and is easily configured without the need for a computer or an advanced commissioning procedure. The power device receives both power and communication over two wires. The controller generates a phase-control voltage and transmits a forward digital message to the power device by encoding digital information in timing edges of the phase-control voltage. The power device transmits a reverse digital message to the controller via the power wiring.

18 Claims, 50 Drawing Sheets

Related U.S. Application Data continuation of application No. 16/817,943, filed on Mar. 13, 2020, now Pat. No. 10,893,595, which is a continuation of application No. 16/704,182, filed on Dec. 5, 2019, now Pat. No. 10,624,194, which is a continuation of application No. 16/380,229, filed on Apr. 10, 2019, now Pat. No. 10,506,689, which is a continuation of application No. 16/188,563, filed on Nov. 13, 2018, now Pat. No. 10,292,245, which is a continuation of application No. 15/958,702, filed on Apr. 20, 2018, now Pat. No. 10,159,139, which is a continuation of application No. 15/797,828, filed on Oct. 30, 2017, now Pat. No. 9,999,115, which is a continuation of application No. 15/480,344, filed on Apr. 5, 2017, now Pat. No. 10,004,127, which is a continuation of application No. 15/358,883, filed on Nov. 22, 2016, now Pat. No. 9,642,226, which is a division of application No. 15/180,718, filed on Jun. 13, 2016, now Pat. No. 9,538,618, which is a division of application No. 13/828,920, filed on Mar. 14, 2013, now Pat. No. 9,392,675.

(51) Int. Cl.
  *H05B 47/19* (2020.01)
  *H05B 45/375* (2020.01)
  *H05B 45/38* (2020.01)
  *H05B 47/13* (2020.01)
  *H05B 45/12* (2020.01)
  *H05B 45/37* (2020.01)
  *H05B 45/10* (2020.01)
  *H05B 47/105* (2020.01)
  *H05B 47/195* (2020.01)

(52) U.S. Cl.
  CPC .......... *H05B 45/375* (2020.01); *H05B 45/38* (2020.01); *H05B 47/105* (2020.01); *H05B 47/11* (2020.01); *H05B 47/13* (2020.01); *H05B 47/19* (2020.01); *H05B 47/195* (2020.01)

(56) References Cited

U.S. PATENT DOCUMENTS

| | | |
|---|---|---|
| 4,638,299 A | 1/1987 | Campbell |
| 4,719,446 A | 1/1988 | Hart |
| 4,990,908 A | 2/1991 | Tung |
| 5,189,412 A | 2/1993 | Mehta et al. |
| 5,264,823 A | 11/1993 | Stevens |
| 5,365,154 A | 11/1994 | Schneider et al. |
| 5,554,968 A | 9/1996 | Lee |
| 5,808,417 A | 9/1998 | Ference et al. |
| 5,872,429 A | 2/1999 | Xia et al. |
| 5,905,442 A | 5/1999 | Mosebrook et al. |
| 5,982,103 A | 11/1999 | Mosebrook et al. |
| 6,084,758 A | 7/2000 | Clarey et al. |
| 6,111,368 A | 8/2000 | Luchaco |
| 6,452,344 B1 | 9/2002 | MacAdam et al. |
| 6,528,957 B1 | 3/2003 | Luchaco |
| 6,734,784 B1 | 5/2004 | Lester |
| 6,784,790 B1 | 8/2004 | Lester |
| 7,038,399 B2 | 5/2006 | Lys et al. |
| 7,091,853 B2 | 8/2006 | Pfleging et al. |
| 7,190,125 B2 | 3/2007 | McDonough et al. |
| 7,265,654 B1 | 9/2007 | Lester |
| 7,345,998 B2 | 3/2008 | Cregg et al. |
| 7,362,285 B2 | 4/2008 | Webb et al. |
| 7,369,060 B2 | 5/2008 | Veskovic et al. |
| 7,391,168 B1 | 6/2008 | Dernovsek et al. |
| 7,391,297 B2 | 6/2008 | Cash et al. |
| 7,573,208 B2 | 8/2009 | Newman, Jr. |
| 7,619,539 B2 | 11/2009 | Veskovic et al. |
| 7,688,183 B2 | 11/2010 | Lester |
| 7,872,429 B2 | 1/2011 | Steiner et al. |
| 7,880,638 B2 | 2/2011 | Veskovic et al. |
| 7,940,167 B2 | 5/2011 | Steiner et al. |
| 8,009,042 B2 | 8/2011 | Steiner et al. |
| 8,035,529 B2 | 10/2011 | Veskovic et al. |
| 8,068,014 B2 | 11/2011 | Steiner et al. |
| 8,199,010 B2 | 6/2012 | Sloan et al. |
| 8,330,638 B2 | 12/2012 | Altonen et al. |
| 8,350,678 B1 | 1/2013 | Xiong et al. |
| 8,410,630 B2 | 4/2013 | Campbell |
| 8,410,706 B2 | 4/2013 | Steiner et al. |
| 8,451,116 B2 | 5/2013 | Steiner et al. |
| 8,492,987 B2 | 7/2013 | Nuhfer et al. |
| 9,553,451 B2 | 1/2017 | Zaharchuk et al. |
| 9,736,911 B2 | 8/2017 | Taipale et al. |
| 2004/0217718 A1 | 11/2004 | Kumar et al. |
| 2006/0244395 A1 | 11/2006 | Taipale et al. |
| 2006/0284728 A1 | 12/2006 | Rubinstein et al. |
| 2008/0203934 A1 | 8/2008 | Van Meurs |
| 2008/0258647 A1 | 10/2008 | Scianna |
| 2008/0258882 A1 | 10/2008 | Lester et al. |
| 2009/0160627 A1 | 6/2009 | Godbole |
| 2009/0273433 A1 | 11/2009 | Rigatti et al. |
| 2009/0322251 A1 | 12/2009 | Hilgers |
| 2010/0127626 A1 | 5/2010 | Altonen et al. |
| 2010/0188009 A1 | 7/2010 | Bull |
| 2010/0238047 A1 | 9/2010 | Ackmann et al. |
| 2010/0241255 A1 | 9/2010 | Benetz et al. |
| 2010/0303099 A1 | 12/2010 | Rieken |
| 2010/0327766 A1 | 12/2010 | Recker et al. |
| 2011/0115293 A1 | 5/2011 | Cash et al. |
| 2011/0121744 A1 | 5/2011 | Salvestrini et al. |
| 2011/0316441 A1 | 12/2011 | Huynh |
| 2012/0032599 A1 | 2/2012 | Mohan et al. |
| 2012/0039400 A1 | 2/2012 | Rieken |
| 2012/0043900 A1 | 2/2012 | Chitta et al. |
| 2012/0230073 A1 | 9/2012 | Newman, Jr. et al. |
| 2014/0320020 A1* | 10/2014 | Shirai .................... H04B 3/54 315/246 |

* cited by examiner

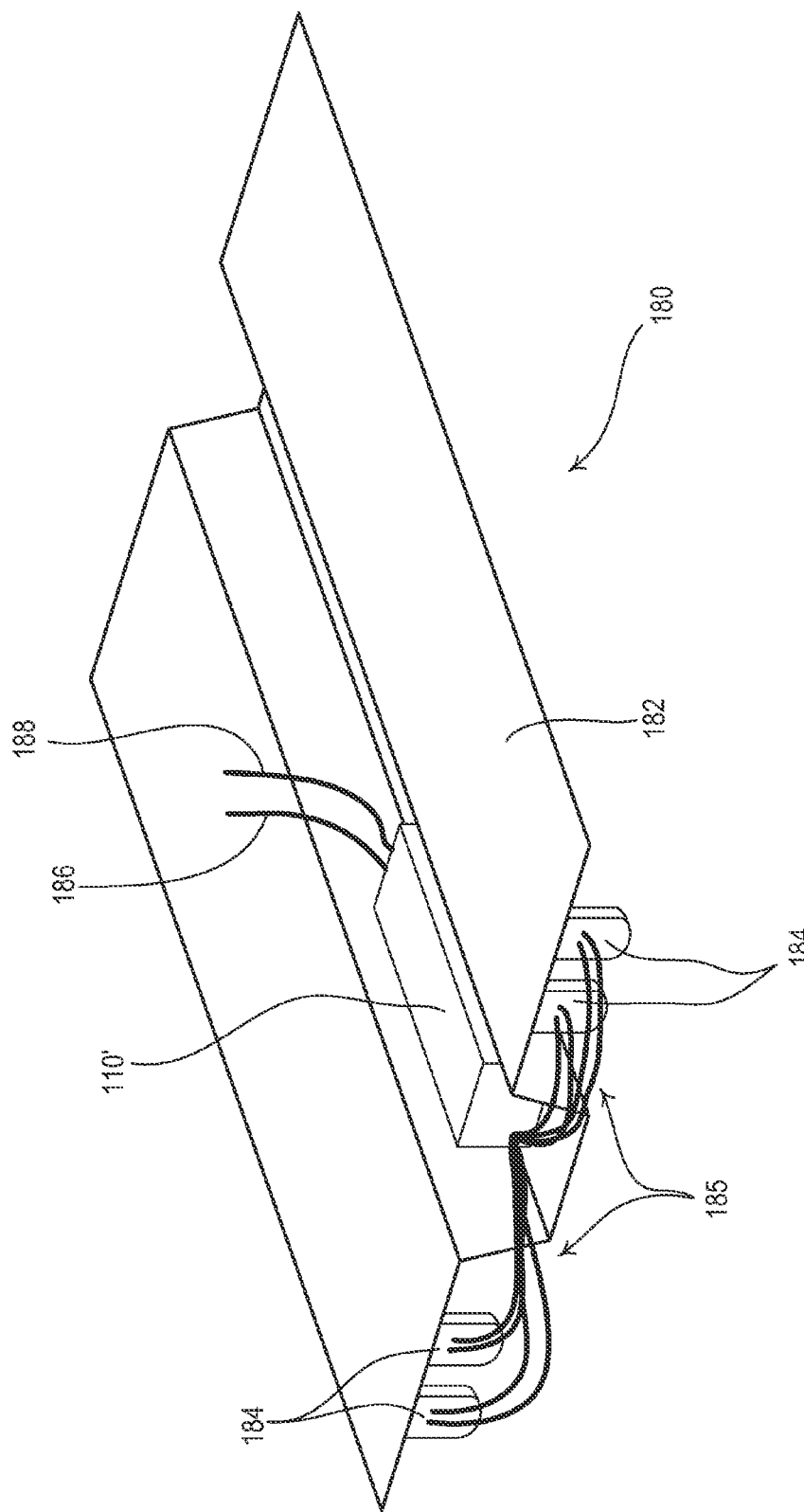

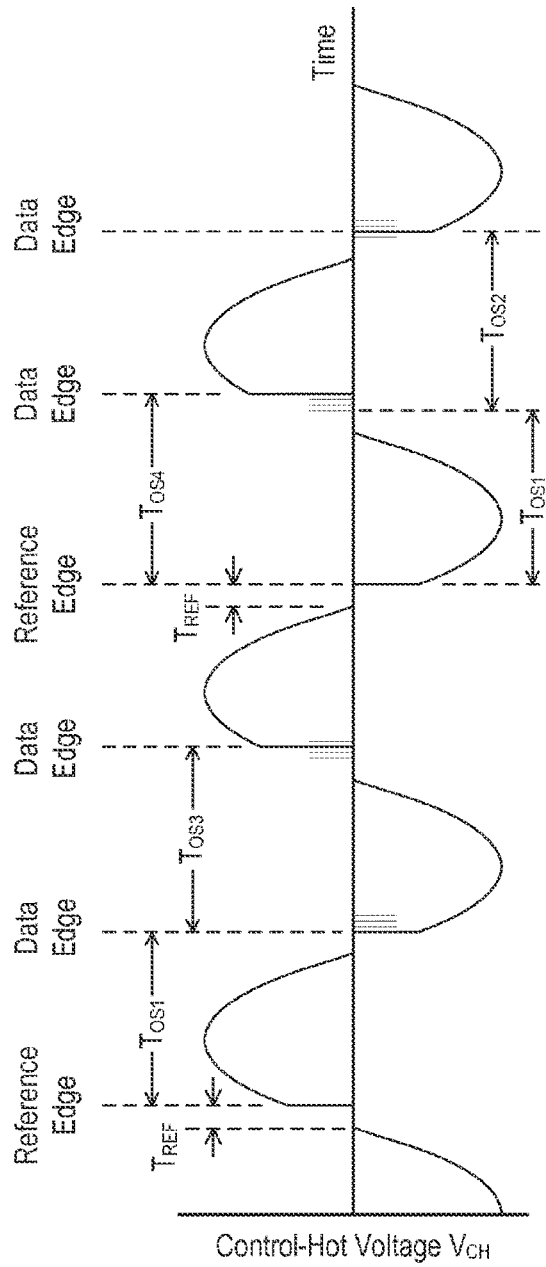
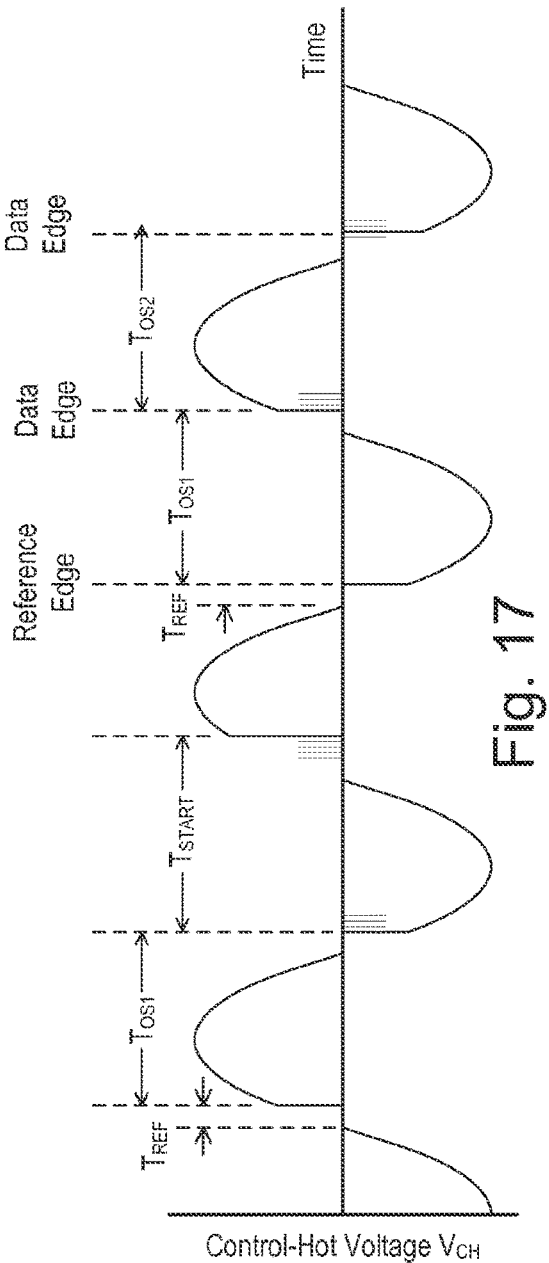
Fig. 16
Fig. 17

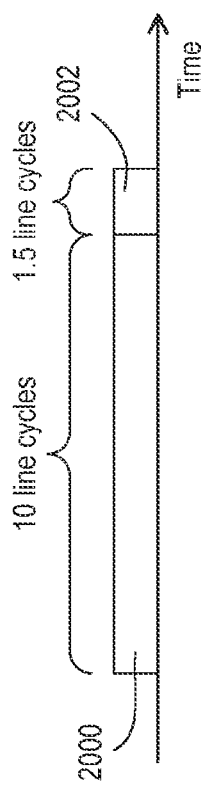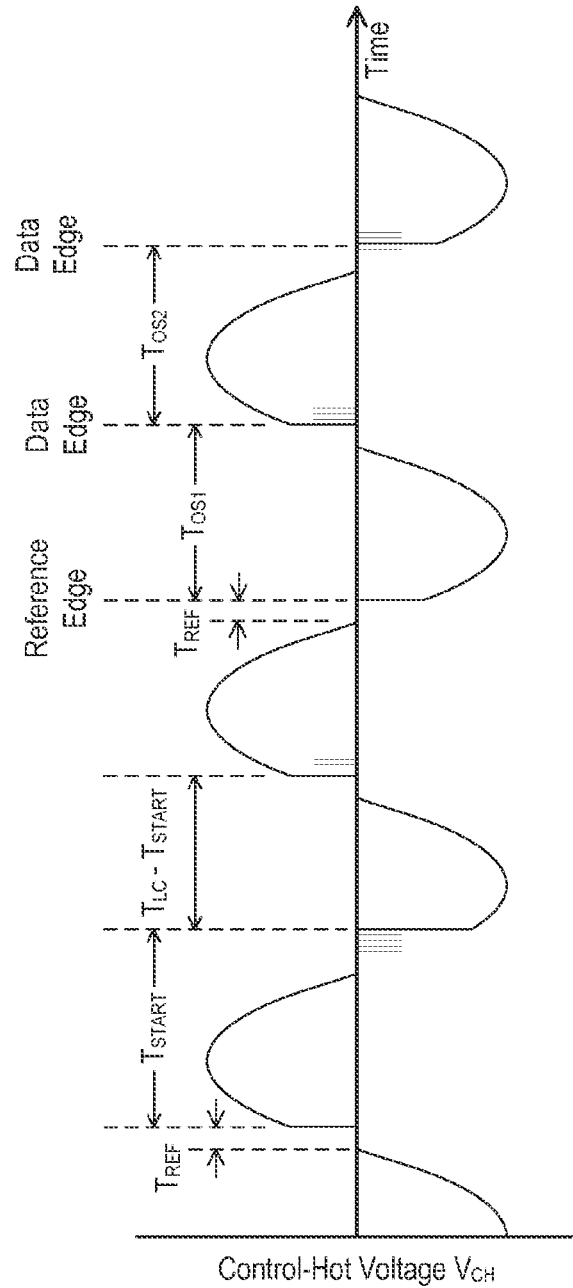
Fig. 28A
Fig. 28B

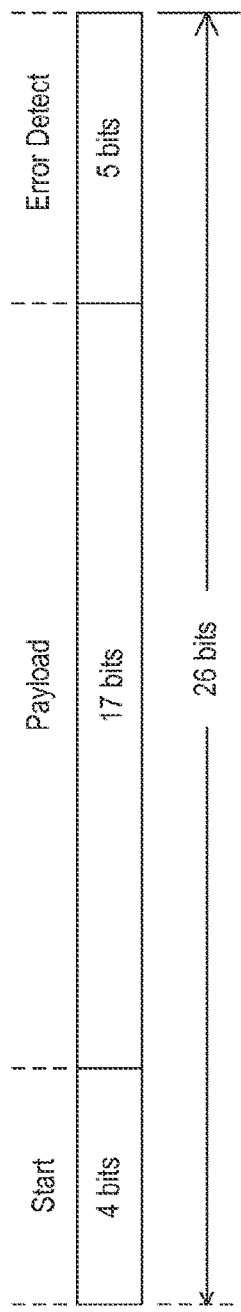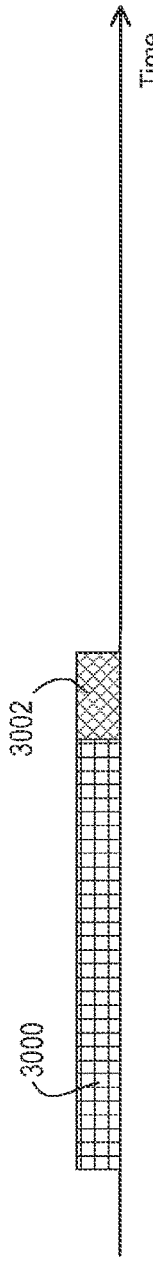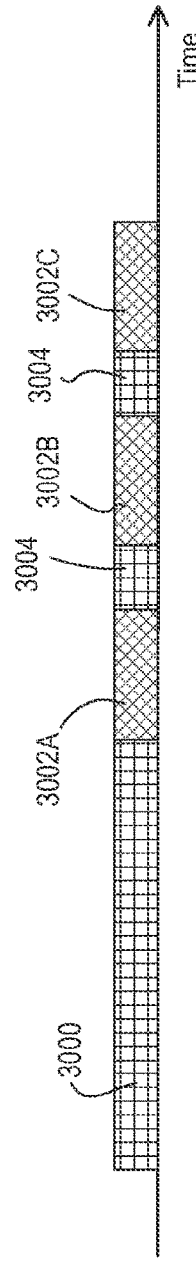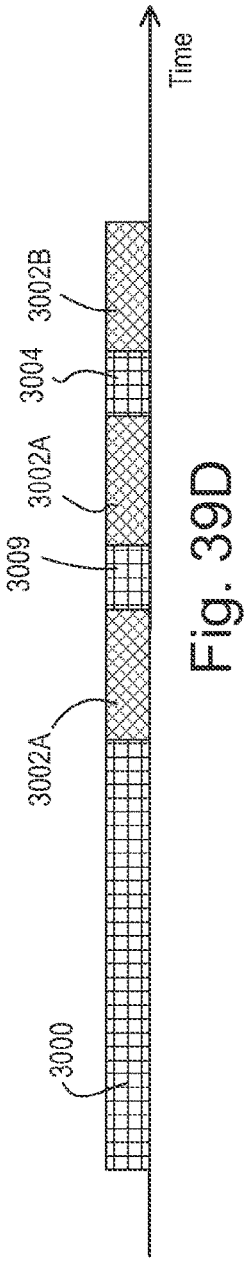

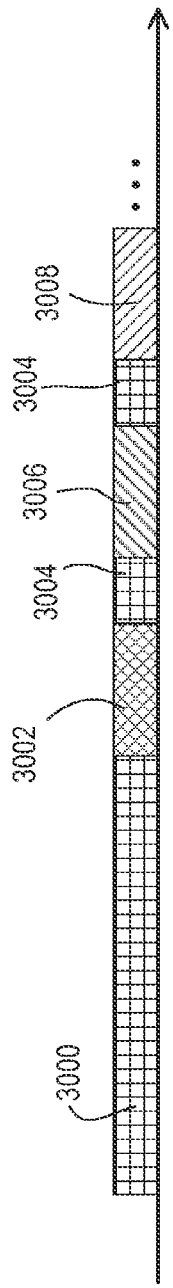
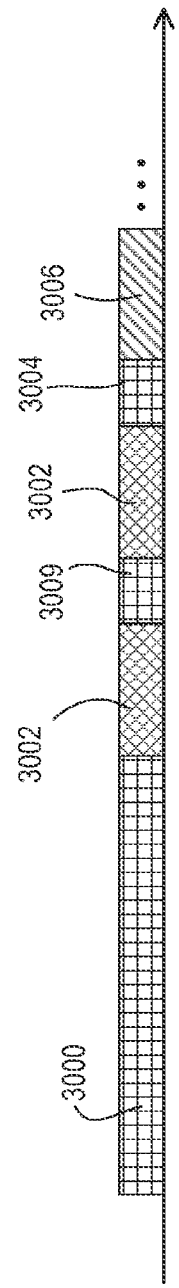
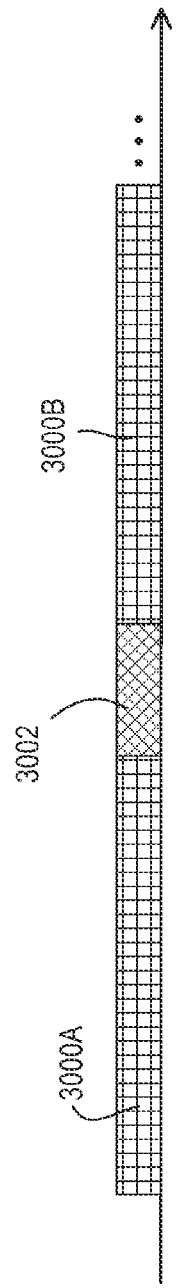
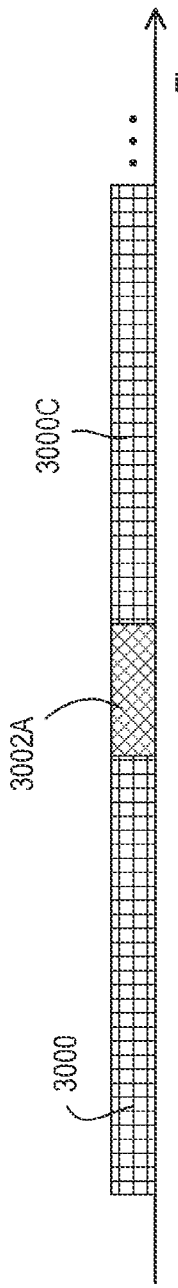

DIGITAL LOAD CONTROL SYSTEM PROVIDING POWER AND COMMUNICATION VIA EXISTING POWER WIRING

CROSS REFERENCE TO RELATED APPLICATIONS

This application is a continuation of U.S. patent application Ser. No. 17/135,191, filed Dec. 28, 2020; which is a continuation of U.S. patent application Ser. No. 16/817,943, filed Mar. 13, 2020, now U.S. Pat. No. 10,893,595 issued Jan. 12, 2021; which is continuation of U.S. patent application Ser. No. 16/704,182, filed Dec. 5, 2019, now U.S. Pat. No. 10,624,194 issued Apr. 4, 2020; which is a continuation of U.S. patent application Ser. No. 16/380,229, filed Apr. 10, 2019, now U.S. Pat. No. 10,506,689 issued Dec. 10, 2019; which is a continuation of U.S. patent application Ser. No. 16/188,563, filed Nov. 13, 2018, now U.S. Pat. No. 10,292,245 issued May 14, 2019; which is a continuation of U.S. patent application Ser. No. 15/958,702, filed Apr. 20, 2018, now U.S. Pat. No. 10,159,139 issued December 18, which is a continuation of U.S. patent application Ser. No. 15/797,828, filed Oct. 30, 2017, now U.S. Pat. No. 9,999,115 issued Jun. 12, 2018; which is a continuation of U.S. patent application Ser. No. 15/480,344, filed Apr. 5, 2017, now U.S. Pat. No. 10,004,127, issued Jun. 19, 2018; which is a continuation of U.S. patent application Ser. No. 15/358,883, filed Nov. 22, 2016, now U.S. Pat. No. 9,642,226 issued May 2, 2017; which is a divisional of U.S. patent application Ser. No. 15/180,718, filed Jun. 13, 2016, now U.S. Pat. No. 9,538,618 issued Jan. 3, 2017; which is a divisional of U.S. patent application Ser. No. 13/828,920, filed Mar. 14, 2013, now U.S. Pat. No. 9,392,675 issued Jul. 12, 2016, all of which are hereby incorporated by reference herein in their entireties.

BACKGROUND

Technical Field

The present disclosure relates to a load control system for controlling the amount of power delivered to an electrical load, such as a lighting load. More particularly, the present disclosure relates to a "two-wire" load control system having load control devices that receive both power and communication over two wires from a digital controller that is easily configured without the need for a computer or an advanced commissioning procedure. In addition, the present disclosure relates to a two-wire load control system having a plurality of load control devices and a digital controller that may be installed in a pre-existing electrical network without requiring any additional wiring. Further, the present disclosure relates to a two-wire load control system having controllers that respond to a plurality of input devices and transmit digital messages and power over two wires to load control devices without interfering with other control devices on the electrical network.

Description of the Related Art

In order for a gas discharge lamp, such as a fluorescent lamp, to illuminate, the lamp is typically driven by a ballast. The ballast may be mounted in a lighting fixture in which the fluorescent lamp is located, or to a junction box adjacent the lighting fixture. Electronic ballasts receive alternating-current (AC) mains line voltage from an AC power source and convert the AC mains line voltage to an appropriate voltage waveform to drive the lamp. Many ballasts are simply switching (or non-dim) ballasts that are only able to turn the connected fluorescent lamp on and off. To control a switching ballast, a standard wallbox-mounted mechanical switch is simply coupled in series electrical connection between the AC power source and the ballast, such that a user turns the fluorescent lamp on and off by toggling the mechanical switch. Multiple switching ballasts may be coupled to a single mechanical switch, such that multiple fluorescent lamps can be turned on and off together in response to actuations of the single mechanical switch.

In contrast, dimming ballasts allow for control of the intensity of the controlled fluorescent lamp from a minimum intensity (e.g., approximately 5%) to a maximum intensity (e.g., approximately 100%). A typical prior art dimming ballast is operable to control the intensity of the controlled fluorescent lamp in response to a phase-control voltage (i.e., a dimmed-hot voltage) received from a dimmer switch. The dimmer switch is electrically coupled between the AC power source and the ballast (i.e., in the place of the mechanical switch that controls a non-dim ballast) and generally requires a connection to the neutral side of the AC power source. There are typically three electrical connections to the prior art electronic dimming ballast: a switched-hot connection, a dimmed-hot connection, and a neutral connection. The switched-hot connection receives a switched-hot voltage, which may be generated by a relay of the dimmer switch for turning the controlled lamp and the ballast on and off. The ballast receives the phase-control voltage at the dimmed-hot connection and is operable to determine a desired lighting intensity in response to the length of a conduction period of the phase-control voltage.

It is often desirable to upgrade a non-dim ballast installation to have a dimming ballast to thus allow the user to adjust the intensity of the fluorescent lamp. In a standard non-dim installation, there is typically only one electrical wire (i.e., a switched-hot voltage) coupled between the electrical wallbox of the mechanical switch and the lighting fixture in which the ballast is located. Moreover, a neutral wire connection coupled to the neutral side of the AC power source may not be available in the wallbox where the mechanical switch is located. However, it is desirable to replace the non-dim ballast with the dimming ballast and to replace the mechanical switch with the dimmer switch without running any additional electrical wiring between the dimmer switch and the dimming ballast (i.e., using only the pre-existing wiring). Running additional wiring can be very expensive, due to the cost of the additional electrical wiring as well as the cost of installation. Typically, installing new electrical wiring requires a licensed electrician to perform the work (where simply replacing one ballast with another ballast without running new wiring may not require a licensed electrician). In addition, if the pre-existing wiring from the mechanical switch to the ballast runs behind a fixed ceiling or wall (e.g., one comprising plaster or expensive hardwood), the electrician may need to breach the ceiling or wall to install the new electrical wiring, which will thus require subsequent repair.

A further complication may arise when the existing ceiling contains asbestos. So long as the asbestos is not disturbed, it presents a minimal health hazard and may be left in place. However, if new wiring must be installed between the dimmer switch and the dimming ballast, then the asbestos must be remediated. Such remediation must be performed by specially trained personnel. Also, the removed asbestos and assorted building materials must be handled as hazardous waste. The process is expensive and time consuming. Therefore, the prior art three-wire dimming ballast does not work well in retrofit installations as described above because the ballast requires two electrical connections—not one—between the dimmer switch and the ballast (i.e., the switched-hot voltage and the dimmed-hot voltage) and the dimmer switch requires connection to a neutral wire coupled to the neutral side of the AC power source in addition to the hot wire.

Some prior art dimming ballasts require only two connections (a dimmed-hot connection for receiving the phase-control voltage and a neutral connection) and thus only a single electrical connection need be made between the dimmer switch and the two-wire dimming ballast. Such prior art two-wire dimming ballasts receive power (for driving the controlled lamp) and the phase-control voltage (for determining the desired lighting intensity) over the single electrical connection between the dimmer switch and the two-wire dimming ballasts. The desired lighting intensity is proportional to the conduction period of the phase-control voltage. Accordingly, these two-wire ballasts may be installed in retrofit installations to replace non-dim ballast withouts running any additional electrical wiring. A single dimmer switch may control the intensities of multiple two-wire dimming ballasts coupled to receive the phase-control voltage from the dimmer switch. However, the dimmer switch is only able to control the two-wire dimming ballasts in unison since each ballast receives the identical phase-control voltage from the dimmer switch. The dimmer switch cannot individually control the intensities of each of the ballasts coupled to the dimmer switch. Prior art two-wire ballasts are described in greater detail in commonly-assigned U.S. Pat. No. 6,111,368, issued Aug. 29, 2000, entitled SYSTEM FOR PREVENTING OSCILLATIONS IN A FLUORESCENT LAMP BALLAST, and U.S. Pat. No. 6,452,344, issued Sep. 17, 2002, entitled ELECTRONIC DIMMING BALLAST, the entire disclosures of which are hereby incorporated by reference.

Some load control systems have digital electronic dimming ballasts that allow control of individual lighting fixtures or groups of lighting fixtures independently of the electrical circuits to which the ballasts are wired for receiving power. Such load control systems typically have a controller coupled to the ballasts via a wired (low-voltage) digital communication link (distinct from the power wiring) to allow for the communication of digital messages between the controller and the ballasts. For example, the controller and ballasts may communicate using the industry-standard Digital Addressable Lighting Interface (DALI) communication protocol. The DALI protocol allows each DALI ballast in the load control system to be assigned a unique digital address, to be programmed with configuration information (such as, for example, preset lighting intensities), and to control a fluorescent lamp in response to commands transmitted via the communication link. Typically, a trained installer is required to perform an advanced commissioning procedure using a personal computer (PC) or other advanced programming tool to program the unique digital address and configuration information of the DALI ballasts.

Some DALI controllers may provide a user interface that allows for control of the ballasts of the load control system. In addition, the load control system may include, for example, wall-mounted keypads or handheld devices, such as infrared (IR) remote controls or personal digital assistants (PDA), for controlling the electronic dimming ballasts. The IR commands are received by an IR receiving sensor that sends appropriate commands to the controlled ballasts. In addition to IR receiving sensors, the load control system may also include daylight sensors or occupancy sensors. The daylight and occupancy sensors monitor the condition (e.g., the ambient light level or motion from an occupant, respectively) of a space and send appropriate commands to the controlled ballasts in response to the sensed conditions in the space. Examples of digital electronic dimming ballasts are described in greater detail in commonly-assigned U.S. Pat. No. 7,619,539, issued Nov. 17, 2009, entitled MULTIPLE-INPUT ELECTRONIC DIMMING BALLAST WITH PROCESSOR, and U.S. Pat. No. 8,035,529, issued Oct. 11, 2011, entitled DISTRIBUTED INTELLIGENCE BALLAST SYSTEM, the entire disclosures of which are hereby incorporated by reference.

The prior art digital dimming ballasts require that the wired digital communication link is coupled to each of the ballasts—in addition to the power wiring—and thus are not well suited to retrofit installations, where the digital dimming ballasts are replacing non-dimming ballasts. To address these limitations, some prior art control systems have provided for digital communication between control devices over the existing power wiring coupled to the devices. For example, in a power-line carrier (PLC) communication system, such as an X10 control system, the control devices are able to modulate high-frequency digital messages on the AC mains line voltage provided on the power wiring (e.g., referenced between hot and neutral of the AC power source). Examples of power-line carrier communication systems are described in greater detail in U.S. Pat. No. 4,200,862, issued Apr. 29, 1980, entitled APPLIANCE CONTROL, and U.S. Pat. No. 4,418,333, issued Nov. 29, 1983, entitled APPLIANCE CONTROL SYSTEM, the entire disclosures of which are hereby incorporated by reference.

However, such power-line carrier communication systems have many disadvantages that have prevented the systems from enjoying wide commercial success. Typically, the control devices of power-line carrier communication systems require connections to both the hot side and the neutral side of the AC power source, which connections may not both be available in the electrical wallboxes of a retrofit installation. In addition, since the control devices reference the transmitted signals between hot and neutral, the signals are able to travel throughout the power system, and thus may cause noise and interference with other control devices coupled to the power system. Often, such systems require back filters to prevent the communication signals from being transmitted throughout the power system. In addition, large reactive elements (i.e., capacitances) coupled across the AC power source can attenuate the digital messages transmitted by the control devices thus degrading the quality of the transmitted digital messages and decreasing the reliability of the communications of the system.

Attempts have been made to design power-line control systems that avoid the disadvantages of the above-referenced prior art power-line carrier communication systems. U.S. Pat. No. 5,264,823, issued Nov. 23, 1993, entitled POWER LINE COMMUNICATION SYSTEM (referred to herein as the '823 patent), discloses a system in which data is transmitted on a power line by means of momentary interruptions of the power at or near the zero-crossings of an AC waveform. The '823 patent teaches that different patterns of interruptions can represent different digital "words." The interruptions form "notches" in an otherwise sinusoidal AC waveform. A receiver is configured to detect the presence of the "notches," to compare detected patterns of "notches" with pre-stored values, and to respond if a match is found with a detected pattern.

The '823 patent proposes techniques for detecting power interruptions at or near zero-crossings, a number of which techniques are complex and subject to error. For example, a power interruption that occurs near a zero-crossing, as the '823 patent proposes, may not be reliably detected due to the existence of "noise" on the AC mains line. A power interruption that occurs away from a zero-crossing, according to the '823 patent, assertedly can be detected by "pattern recognition of some sort" or by performing "a fast Fourier transform of the waveform" and looking for "selected high order coefficients to detect a notch." Such processes would be costly and complex to implement, and would also be susceptible to errors due to the existence of "noise" on the AC mains line. The system disclosed in the '823 patent also has very low data transfer rates, with at most one bit being transferred per complete AC cycle. A multi-bit message would occupy at least as many complete AC cycles in the '823 patent, and potentially twice as many cycles if consecutive positive half-cycles or zero-crossings were used.

U.S. Pat. No. 6,784,790, issued Aug. 31, 2004, entitled SYNCHRONIZATION/REFERENCE PULSE-BASED POWERLINE PULSE POSITION MODULATED COMMUNICATION SYSTEM (referred to herein as the '790 patent), discloses a system in which control devices generate high frequency voltage pulses on the AC mains line voltage and transmit data by means of timed intervals between the pulses. In an attempt to avoid communication errors as a result of the attenuation of transmitted signals (which is a problem of the prior art power-line carrier communication systems), the '790 patent proposes use of the high-frequency voltage pulses that occur near zero-crossings and whose magnitude is much larger, relative to the AC power line voltage, than the carrier voltage pulses utilized in earlier prior art power-line carrier communication systems.

The system disclosed in the '790 patent involves superimposing a carrier signal on AC mains voltage. The transmitter in the '790 patent requires a connection to both the hot side and the neutral side of the AC power source and thus would not work in many retrofit situations. The high-frequency voltage pulses are generated near the zero-crossings of the AC power source and may produce noise that could cause communication errors at other control devices. In addition, since the high-frequency pulses generated by the control devices of the '790 patent look very similar to typical noise generated by other electrical devices on the AC mains line voltage, the control devices may be susceptible to communication reception errors. Further, and despite their magnitude relative to AC mains voltage, the pulses proposed in the '790 patent would be susceptible to attenuation due to large reactive elements coupled across the AC power source.

U.S. Pat. No. 8,068,014, issued Nov. 29, 2011, entitled SYSTEM FOR CONTROL OF LIGHTS AND MOTORS, discloses a system in which data is transmitted by means of a carrier signal superimposed on the load current of an isolated load control system rather than AC mains line voltage. The system includes a transmitting device coupled in series between an AC power source and a load control device, which is coupled to an electrical load for regulating the load current conducted through the load. If there are multiple load control devices in a current-carrier communication system, the load current that is conducted by the transmitting device is divided between the multiple load control devices. Accordingly, the magnitude of each high-frequency digital message modulated onto the load current is attenuated (i.e., by current division) and the quality of the digital messages may be degraded.

Despite decades of attempts to develop practical power line carrier lighting control systems, there continues to be a need for apparatus that can reliably communicate data over a single power line between a dimmer switch and an electronic dimming ballast in a low-cost lighting control system. There also continues to be a need for low cost apparatus that can reliably and selectively control a plurality of fluorescent or light-emitting diode (LED) lighting fixtures connected to a single controller by a single power line. In addition, there continues to be a need for low cost PLC apparatus that is suitable for upgrading a simple, non-dim lighting system to a dimmed lighting system without the need for additional wiring or a complex commissioning process.

SUMMARY

As described herein, a two-way load control system for controlling an electrical load receiving power from an alternating-current (AC) power source comprises a power device (e.g., a load control device for controlling the electrical load or an input device) and a controller that is adapted to be coupled in series electrical connection between the AC power source and the power device. The load control system may be installed without requiring any additional wires to be run. The power device receives both power and communication from the controller over two wires (e.g., the pre-existing wiring). The controller may be coupled to the neutral side of the AC power source (if available), but does not require a connection to neutral.

Rather than modulating high-frequency digital messages or pulses onto the AC mains line voltage to communicate with the power devices, the controller generates a phase-control voltage having a variable timing edge (i.e., phase angle). Specifically, the controller transmits "forward" digital messages to the power devices by modulating the timing edges of the phase-control voltage relative to a reference edge, i.e., digital information is encoded in the timing between the edges. The timing of the edges of the phase-control voltage can be controlled precisely by the controller and detected reliably by each power device, which does not require a zero-crossing detector to detect the timing edges of the phase-control voltage. Each power device is operable to transmit a "reverse" digital message to the controller and the other power devices of the load control system in response to receiving a forward digital message. Specifically, the power device is operable to modify the phase-control voltage generated by the controller to transmit reverse digital messages.

Since the controller generates a phase-control voltage for communicating digital information to the power device, the electrical hardware of the controller is very similar to that of a standard dimmer switch. In addition, the controller is able to "swallow" the phase-control signal, such that the phase-control signal only exists on the power wiring between the controller and the power device, and does not generate noise that interferes with other control devices coupled to the power wiring. In other words, the phase-control signal only travels downstream from the controller to the power device, and not upstream from the controller to the AC power source. Since the controller and the power devices do not modulate high-frequency digital messages onto the AC mains line voltage, large reactive elements coupled across the AC power source do not degrade the quality of the digital messages transmitted by the controller to the power device.

The load control system may comprise a plurality of power devices. For example, the load control system may comprise a plurality of load control devices that are operable to control respective electrical loads and are coupled to the controller via a single circuit wiring. Different types of load control devices may be mixed on a single circuit and controlled by the controller. The load control devices may comprise, for example, a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a set-point temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system may be configured and reconfigured without requiring a computer or an advanced commissioning procedure and without requiring access to the power devices (which may be remotely located and not easily accessible). Since the power devices are operable to transmit reverse digital message to the controller, the controller is able to assigned unique addresses to each of the power devices by transmitting forward digital messages to the power devices, for example, using a "soft addressing" procedure. The power devices may also be assigned to groups (i.e., zone), such that the controller is able transmit digital messages to the power devices to control the loads individually or in the groups. In particular, when the power devices comprise ballasts, the ballasts may be installed just like a prior art non-dim ballast since the ballasts are each assigned a link address during the soft addressing procedure. Prior to being assigned link addresses by the controller, the power devices are operable to work out-of-box as a single group. In addition, the load control system provides for easy replacement of missing or faulty power devices. When a missing or faulty power device is replaced by a new power device, the controller is able to automatically detect the new power device and to program the new power device with the operational settings of the old power device. Since the load control system may be installed without requiring any additional wiring and is easily programmed, the load control system may be configured prior to shipment as a preprogrammed system that can simply be installed and is then fully operational immediately upon first power up.

Further, the load control system may comprise a plurality of controllers, each coupled to one or more load control devices via a separate circuit wiring. In addition, the controllers may be operable to transmit digital messages to the load control devices to control the loads in response to input signals received from input devices to allow for both local and central control of the loads. For example, the controllers may be operable to receive radio-frequency (RF) signals from a plurality of RF transmitters. Accordingly, the controllers may be operable to control the electrical loads in response to the RF transmitters in groups that are independent of the separate circuit wirings. The input devices (i.e., the RF transmitters and the power devices) of the load control system may comprise, for example, occupancy sensors, vacancy sensors, daylight sensors, radiometers, cloudy-day sensors, temperature sensors, humidity sensors, pressure sensors, smoke detectors, carbon monoxide detectors, air-quality sensors, security sensors, proximity sensors, fixture sensors, partition sensors, keypads, battery-powered remote controls, kinetic or solar-powered remote controls, key fobs, cell phones, smart phones, tablets, personal digital assistants, personal computers, laptops, timeclocks, audio-visual controls, safety devices, power monitoring devices (such as power meters, energy meters, utility submeters, utility rate meters), central control transmitters, residential, commercial, or industrial controllers, or any combination of these input devices.

Because the power devices are able to transmit the reverse digital messages in response to receiving forward digital messages, the controller can receive feedback information from the power devices. For example, when the power devices comprise ballasts, the ballasts may transmit present light intensities of the controlled lamps or information regarding lamp status information (such as indications of missing or failed lamps) to the controller. Alternatively, an occupancy sensor could transmit information regarding occupancy and vacancy conditions and a daylight sensor could transmit a measured light level to the controller. The controller could be operable to transmit the received feedback information to an external device, such as a central controller that is coupled to a network.

Each power devices is able to transmit an acknowledgement to the controller in response to receiving a forward digital message, such that the controller is able to confirm that all of the power devices received the forward digital message. Accordingly, the controller is operable to transmit new values of operating settings and updated firmware to the power devices via forward digital messages. This allows the load control system to adapt to new types of power devices and changes in the functionality of power devices after installation.

According to another embodiment, a load control system comprises a plurality of power devices adapted to be coupled in parallel with each other and operable to receive power from an AC power source via a power wiring, and a controller adapted to be coupled in series electrical connection on the power wiring between the AC power source and the parallel combination of the power devices. The controller is operable to produce a phase-control voltage that is adapted to be received by the power devices, and is configured to transmit a first digital message to the power devices via the power wiring by encoding digital information in timing edges of the phase-control voltage. At least one of the power device is operable to transmit a reverse digital message via the power wiring. The controller is configured to transmit a short pattern immediately prior to the power device transmitting the reverse digital message, where the short pattern has a length less than the length of the forward digital message.

Other features and advantages of the present disclosure will become apparent from the following description and the accompanying drawings.

BRIEF DESCRIPTION OF THE DRAWINGS

FIG. 5 is a simplified perspective view of a retrofit kit having a digital dimming ballasts pre-wired to lamp sockets and mounted to a pan.

FIG. 16 is an example timing diagram of a control-hot voltage having two data edges per one reference edge.

FIG. 17 is an example timing diagram of a control-hot voltage showing a start pattern.

FIG. 28A is an example diagram of a "forward" digital message transmitted from a digital power device controller to a power device and a "reverse" digital message transmitted from the power device to the digital power device controller.

FIG. 28B is an example timing diagram of a control-hot voltage showing a start pattern.

FIG. 39A is an example diagram of a message structure for a digital message transmitted by a digital power device controller to a power device.

FIGS. 39B-39H are simple diagrams of forward digital messages transmitted from a digital ballast controller to a power device and reverse digital messages transmitted from the power device to the digital ballast controller.

DETAILED DESCRIPTION

Figure 1:
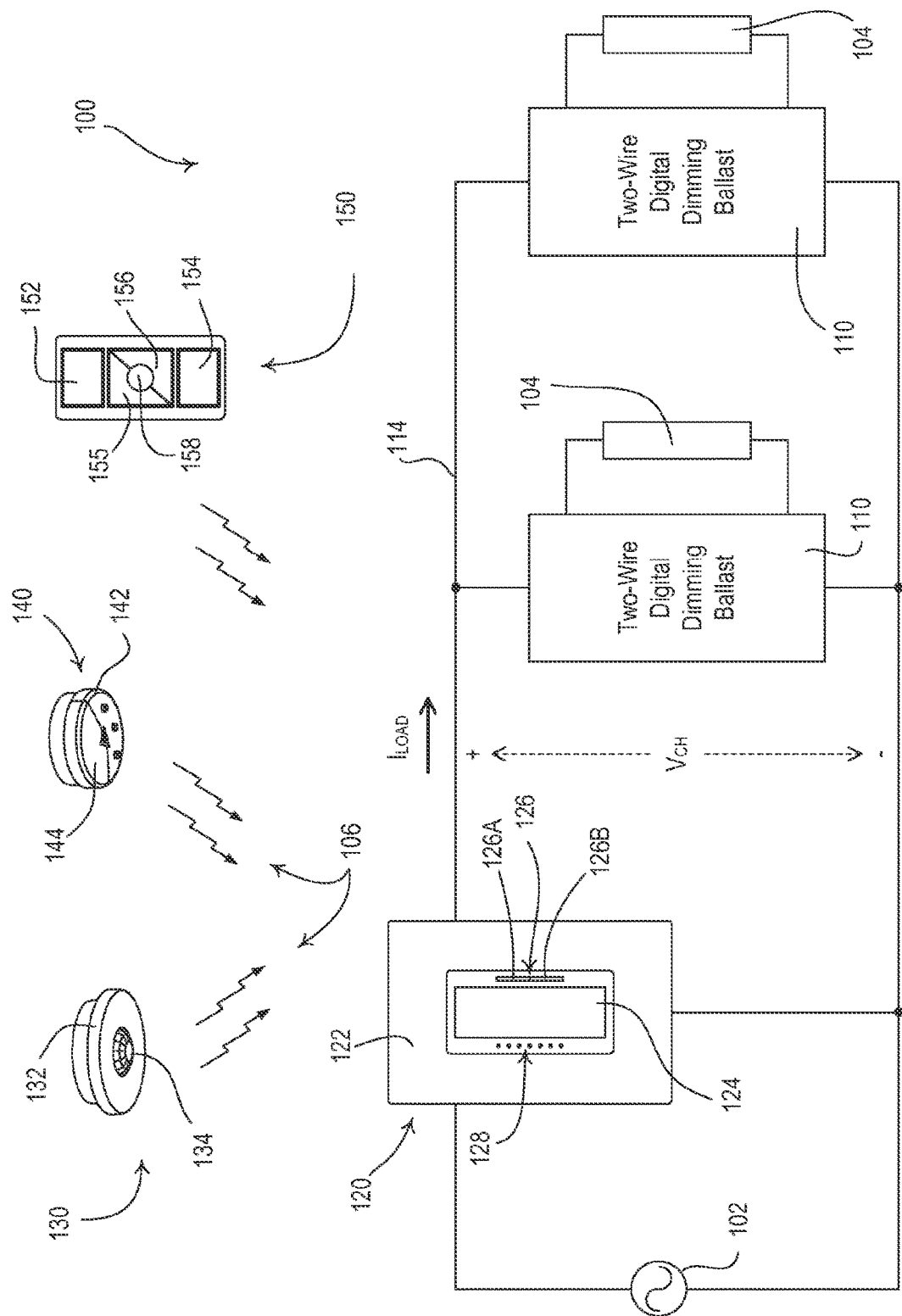
FIG. 1 is a simple wiring diagram of a lighting control system having a plurality of two-wire digital dimming ballasts and a digital ballast controller.

The foregoing summary, as well as the following detailed description of the preferred embodiments, is better understood when read in conjunction with the appended drawings. For the purposes of illustrating the disclosure, there is shown in the drawings embodiments, in which like numerals represent similar parts throughout the several views of the drawings, it being understood, however, that the invention is not limited to the specific methods and instrumentalities disclosed.

FIG. 1 is a simple wiring diagram of a load control system 100 having a plurality of two-wire power devices (e.g., two-wire load control devices, such as two-wire digital dimming ballasts 110). The two-wire digital dimming ballasts 110 are coupled to respective lamps 104 for controlling the intensities of the lamps to a desired lighting intensity $L_{DES}$ between a low-end (i.e., minimum) intensity $L_{LE}$ (e.g., approximately 1%) and a high-end (i.e., maximum) intensity $L_{HE}$ (e.g., approximately 100%). The load control system 100 also comprises a digital ballast controller 120 (i.e., a remote control device) that is adapted to be coupled in series electrical connection between an alternating-current (AC) power source 102 and the two-wire digital dimming ballasts 110 via a circuit wiring 114. In other words, each digital dimming ballast 110 is coupled in series with the digital ballast controller 120 across the AC power source 102. As shown in FIG. 1, the digital ballast controller 120 may be directly coupled to the neutral side of the AC power source 102. The circuit wiring 114 may be the pre-existing wiring of the electrical network of the building in which the load control system 100 is installed and may be located in the interior and exterior of the building.

The two-wire digital dimming ballasts 110 are coupled in parallel and receive both power and digital communication from a control-hot voltage $V_{CH}$ (i.e., a phase-control voltage) that is generated by the digital ballast controller 120 as will be described in greater detail below. The control-hot voltage $V_{CH}$ generated by the digital ballast controller 120 differs from the phase-control voltage received by prior art three-wire and two-wire dimming ballasts in that the digital dimming ballasts 110 of the load control system 100 do not determine the desired lighting intensity $L_{DES}$ for the respective lamp 104 in response to the length of the conduction period of the control-hot voltage $V_{CH}$. Rather, the two-wire digital dimming ballasts 110 of the load control system 100 are able to determine the desired lighting intensity $L_{DES}$ (i.e., are controlled to a defined state) in response to the digital control information (i.e., digital communication messages) derived from the control-hot voltage $V_{CH}$.

As shown in FIG. 1, the digital ballast controller 120 may be a wallbox device, i.e., adapted to be wall-mounted in a standard single-gang electrical wallbox, thus replacing a standard mechanical switch that may have been controlling the power delivered to the previous ballasts and lamps prior to installation of the digital ballast controller. The digital ballast controller 120 comprises a faceplate 122 and a user interface that is received in an opening of the faceplate and includes a toggle actuator 124 and an intensity adjustment actuator 126 for receiving user inputs to control the fluorescent lamps 104. The digital ballast controller 120 communicates with the digital dimming ballasts 110 to cause the fluorescent lamps 104 to toggle, i.e., turn off and on, in response to actuations of the toggle actuator 124. The digital ballast controller 120 increases and decreases the lighting intensity of the fluorescent lamps 104 in response to actuations of an upper portion 126A or a lower portion 126B of the intensity adjustment actuator 126, respectively. The user interface of the digital ballast controller 120 also includes a plurality of visual indicators 128, e.g., light-emitting diodes (LEDs), which are arranged in a linear array and are illuminated to provide feedback of the intensity of the fluorescent lamps 104.

The load control system 100 may also comprise a plurality of input devices, for example, wireless transmitters, such as a wireless occupancy sensor 130, a wireless daylight sensor 140, and a wireless battery-powered remote control 150, which are operable to transmit digital messages (i.e., input signals) to the digital ballast controller 120 via radio-frequency (RF) signals 106. The digital ballast controller 120 is operable to turn the fluorescent lamps 104 on and off and adjust the intensities of the fluorescent lamps 104 in response to the digital messages received from the occupancy sensor 130, the daylight sensor 140, and the battery-powered remote control 150. The wireless transmitters may be operable to transmit the digital messages to the digital ballast controller 120 according to a predefined RF communication protocol, such as, for example, one of LUTRON CLEAR CONNECT, WIFI, ZIGBEE, Z-WAVE, KNX-RF, and ENOCEAN RADIO protocols. Alternatively, the wireless transmitters could transmit the digital messages via a different wireless medium, such as, for example, infrared (IR) signals or sound (such as voice). The digital ballast controller 120 may be operable to transmit digital messages to the digital dimming ballasts 110 via the control-hot voltage $V_{CH}$ in response to receiving RF signals from via a wireless network (i.e., via the Internet).

Because the digital dimming ballasts 110 are typically mounted inside metal lighting fixtures, the digital dimming ballasts 110 are typically not able to receive the RF signals 106 from the wireless transmitters. However, since the digital ballast controller 120 transmits digital messages to the digital dimming ballasts 110 via the control-hot voltage $V_{CH}$ in response to receiving the RF signals 106 from the wireless transmitters, the fluorescent lamps 104 are able to be controlled in response to the wireless transmitters.

During a setup procedure of the load control system 100, the digital ballast controller 120 is associated with the occupancy sensor 130, the daylight sensor 140, and the battery-powered remote control 150, for example, by pressing an actuator on the wireless transmitter and pressing an actuator on the digital ballast controller (e.g., the toggle actuator 124). All digital messages transmitted to the digital ballast controller 120 by the occupancy sensor 130, the daylight sensor 140, and the battery-powered remote control 150 may include a command and identifying information, for example, a serial number (i.e., a unique identifier) associated with the wireless transmitter. The digital ballast controller 120 is responsive to messages containing the serial numbers of the occupancy sensor 130, the daylight sensor 140, and the battery-powered remote control 150 to which the digital ballast controller is associated.

The occupancy sensor 130 may be removably mountable to a ceiling (as shown in FIG. 1) or to a wall, for example, in the vicinity of (i.e., a space around) the fluorescent lamps 104 controlled by the ballasts 110. The occupancy sensor 130 is operable to detect occupancy conditions in the vicinity of the fluorescent lamps, and includes an internal occupancy detection circuit, e.g., having a pyroelectric infrared (PIR) detector, which is housed in an enclosure 132 having a lens 134. The internal detector is operable to receive infrared energy from an occupant in the space via the lens 134 to thus sense the occupancy condition in the space. The occupancy sensor 130 is operable to process the output of the PIR detector to determine whether an occupancy condition (i.e., the presence of the occupant) or a vacancy condition (i.e., the absence of the occupant) is presently occurring in the space, for example, by comparing the output of the PIR detector to a predetermined occupancy voltage threshold. Alternatively, the internal detector could comprise an ultrasonic detector, a microwave detector, or any combination of PIR detectors, ultrasonic detectors, and microwave detectors.

The occupancy sensor 130 operates in an "occupied" state or a "vacant" state in response to the detections of occupancy or vacancy conditions, respectively, in the space. If the occupancy sensor 130 is in the vacant state and the occupancy sensor determines that the space is occupied in response to the PIR detector, the occupancy sensor changes to the occupied state. The occupancy sensor 130 transmits digital messages wirelessly via RF signals 106 to the digital ballast controller 120 in response to the present state of the occupancy sensor. The commands included in the digital messages transmitted to the digital ballast controller 120 by the occupancy sensor 130 may comprise an occupied command or a vacant command.

When the fluorescent lamps 104 are off, the digital ballast controller 120 is operable to turn on the fluorescent lamps in response to receiving the occupied command from the occupancy sensor 130. The digital ballast controller 120 is operable to turn off the fluorescent lamps 104 in response to receiving the vacant command from the occupancy sensor 130. If there were more than one occupancy sensor 130 in the load control system 100, the digital ballast controller 120 would turn on the fluorescent lamps 104 in response to receiving a first occupied command from any one of the occupancy sensors, and turn off the fluorescent lamps in response to the last vacant command received from those occupancy sensors from which the occupancy sensor received occupied commands. For example, if two occupancy sensors 130 both transmit occupied commands to the digital ballast controller 120, the digital ballast controller will not turn off the fluorescent lamps 104 until subsequent vacant commands are received from both of the occupancy sensors. Accordingly, the occupancy sensor 130 provides automatic control and energy savings by turning off the fluorescent lamps 104 when the space is unoccupied.

Alternatively, the occupancy sensor 130 could be implemented as a vacancy sensor. The digital ballast controller 120 would only operate to turn off the fluorescent lamps 104 in response to receiving the vacant commands from the vacancy sensor. Therefore, if the load control system 100 includes vacancy sensors, the fluorescent lamps 104 must be turned on manually (e.g., in response to a manual actuation of the toggle actuator 124 of the digital ballast controller 120). Examples of RF load control systems having occupancy and vacancy sensors are described in greater detail in commonly-assigned U.S. patent application Ser. No. 12/203,518, filed Sep. 3, 2008, entitled RADIO-FREQUENCY LIGHTING CONTROL SYSTEM WITH OCCUPANCY SENSING; U.S. patent application Ser. No. 12/203,500, filed Sep. 3, 2008, entitled BATTERY-POWERED OCCUPANCY SENSOR; and U.S. patent application Ser. No. 12/371,027, filed Feb. 13, 2009, entitled METHOD AND APPARATUS FOR CONFIGURING A WIRELESS SENSOR, the entire disclosures of which are hereby incorporated by reference.

The daylight sensor 140 is mounted so as to measure a total light intensity in the space around the daylight sensor (i.e., in the vicinity of the fluorescent lamps 104). The daylight sensor 140 includes an internal photosensitive circuit, e.g., a photosensitive diode, which is housed in an enclosure 142 having a lens 144 for conducting light from outside the daylight sensor towards the internal photosensitive diode. The daylight sensor 140 is responsive to the total light intensity measured by the internal photosensitive circuit. Specifically, the daylight sensor 140 is operable to wirelessly transmit digital messages including a value representative of the total light intensity to the digital ballast controller 120 via the RF signals 106. The digital ballast controller 120 automatically adjusts the lighting intensities of the fluorescent lamps 104 in response to the total light intensity measured by the daylight sensor 140, so as to reduce the total power consumed by the load control system 100. If there is more than one daylight sensor 140 in the load control system 100, the digital ballast controller 120 may be operable to, for example, average the values of the total light intensities measured by multiple daylight sensors 140 and then adjust the intensities of the fluorescent lamps 104 in response to the average of the values of the total light intensities measured by multiple daylight sensors. Examples of RF load control systems having daylight sensors are described in greater detail in commonly-assigned U.S. patent application Ser. No. 12/727,956, filed Mar. 19, 2010, entitled WIRELESS BATTERY-POWERED DAYLIGHT SENSOR, and U.S. patent application Ser. No. 12/727,923, filed Mar. 19, 2010, entitled METHOD OF CALIBRATING A DAYLIGHT SENSOR, the entire disclosures of which are hereby incorporated by reference.

The battery-powered remote control 150 comprises an on button 152, an off button 154, a raise button 155, a lower button 156, and a preset button 158 for providing manual control of the fluorescent lamps 104 by a user of the load control system 100. The remote control 150 is operable to transmit digital messages including commands to control the fluorescent lamps 104 to the digital ballast controller 120 in response to actuations of the buttons 152-158. Specifically, the battery-powered remote control 150 simply transmits information regarding which of the buttons 152-158 was actuated to the digital ballast controller 120 via the RF signals 106. The digital ballast controller 120 turns the fluorescent lamps 104 on and off in response to actuations of the on button 152 and the off button 154 of the remote control 150, respectively. The digital ballast controller 120 raises and lowers the intensity of the fluorescent lamps 104 in response to actuations of the raise button 155 and the lower button 156, respectively. The digital ballast controller 120 controls the intensity of each of the fluorescent lamps 104 to a preset intensity in response to actuations of the preset button 158. Examples of battery-powered remote controls are described in greater detail in commonly-assigned U.S. patent application Ser. No. 12/399,126, filed Mar. 6, 2009, entitled WIRELESS BATTERY-POWERED REMOTE CONTROL HAVING MULTIPLE MOUNTING MEANS, and U.S. Pat. No. 7,573,208, issued Aug. 22, 2009, entitled METHOD OF PROGRAMMING A LIGHTING PRESET FROM A RADIO-FREQUENCY REMOTE CONTROL the entire disclosures of which are hereby incorporated by reference.

Figure 2A:
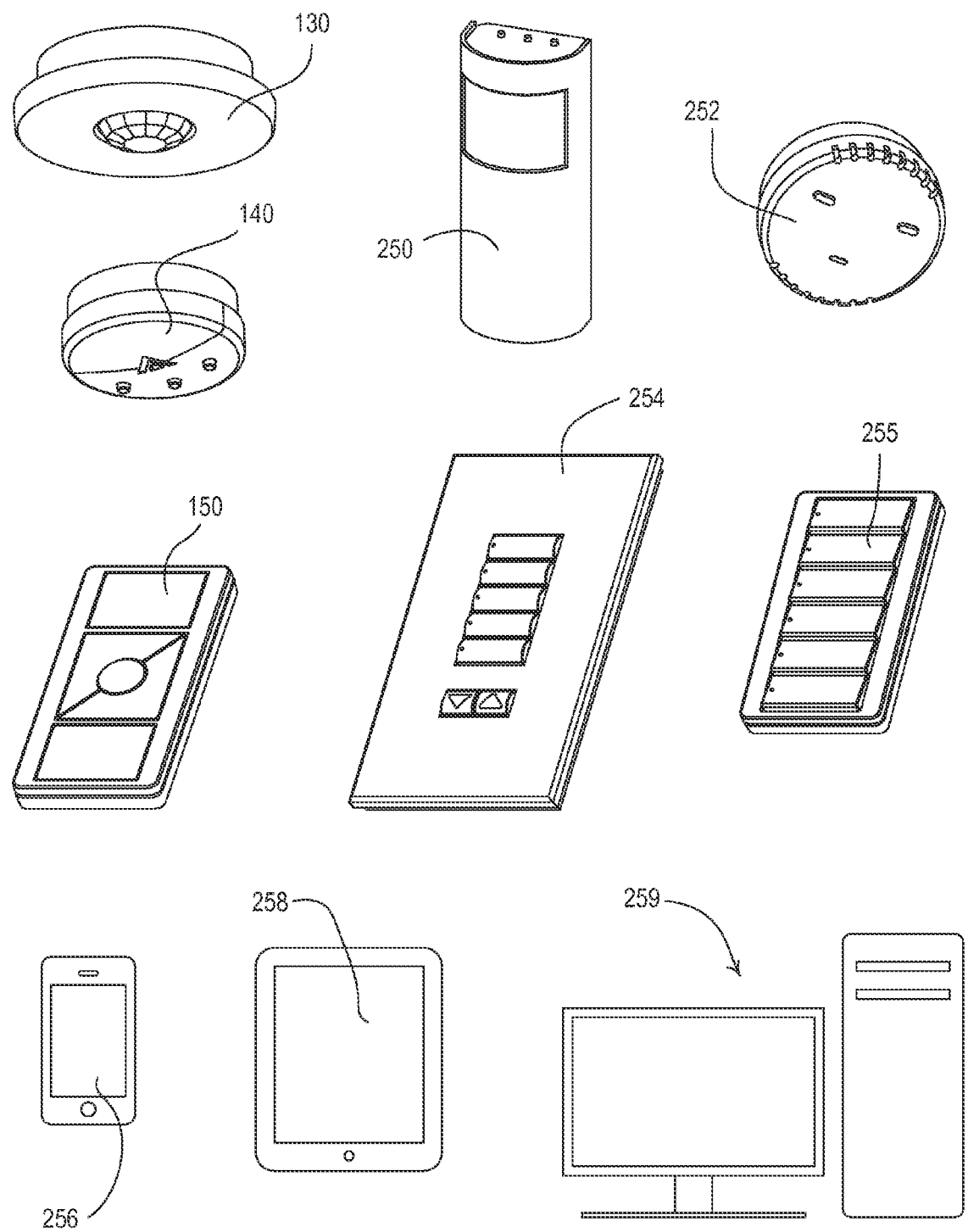
FIG. 2A shows example input devices of the load control system of FIG. 1.

The load control system 100 may comprise a plurality of occupancy sensors 130, daylight sensors 140, and battery-powered remote controls 150 for providing local control of the fluorescent lamps 104. In addition, the load control system 100 may comprise additional types of input devices as shown in FIG. 2A. The additional input devices of the load control system 100 may comprise a wall-mounted occupancy sensor 250, a temperature sensor 252, a radiometer, a cloudy-day or shadow sensor, a humidity sensor, a pressure sensor, a smoke detector, a carbon monoxide detector, an air-quality sensor, a security sensor, a proximity sensor, a fixture sensor, a wall-mounted keypad 254, a remote control keypad 255, a kinetic or solar-powered remote control, a key fob, a cell phone, a smart phone 256, a tablet 258, a personal digital assistant (PDA), a personal computer 259, a laptop, a timeclock, an audio-visual control, safety devices (such as fire protection, water protection, and medical emergency devices), a power monitoring device (such as a power meter, an energy meter, a utility submeter, and a utility rate meter), or any residential, commercial, or industrial controller. In addition, the input devices may comprise one or more partition switches that transmit RF signals in dependence upon whether a partition is opened or closed. The input devices may further comprise a central control transmitter to allow for central control of the fluorescent lamps 104. Specifically, the central control transmitter may be adapted to transmit a digital message including one of: a timeclock command, a load shed command, a demand response command, a peak demand command, or time-of-day pricing information. In addition, the digital ballast controller 120 could be operable to transmit information, such as the status and energy consumption of the controlled loads, back to the central control transmitter or one of the other input devices. One or more of the different types of input devices may be provided in a single load control system.

Alternatively, the input devices could comprise wired transmitters operable to transmit control signals to the controller via a wired control link, for example, a digital communication link operating in accordance with a predefined communication protocol (such as, for example, one of Ethernet, IP, XML, Web Services, QS, DMX, BACnet, Modbus, LonWorks, and KNX protocols), a serial digital communication link, an RS-485 communication link, an RS-232 communication link, a digital addressable lighting interface (DALI) communication link, a LUTRON ECO-SYSTEM communication link, or an analog control link. In addition, the wired transmitter could be adapted to produce one of a line-voltage control signal, a phase-control signal, a 0-10V control signal, and a contact closure output control signal.

Figure 2B:
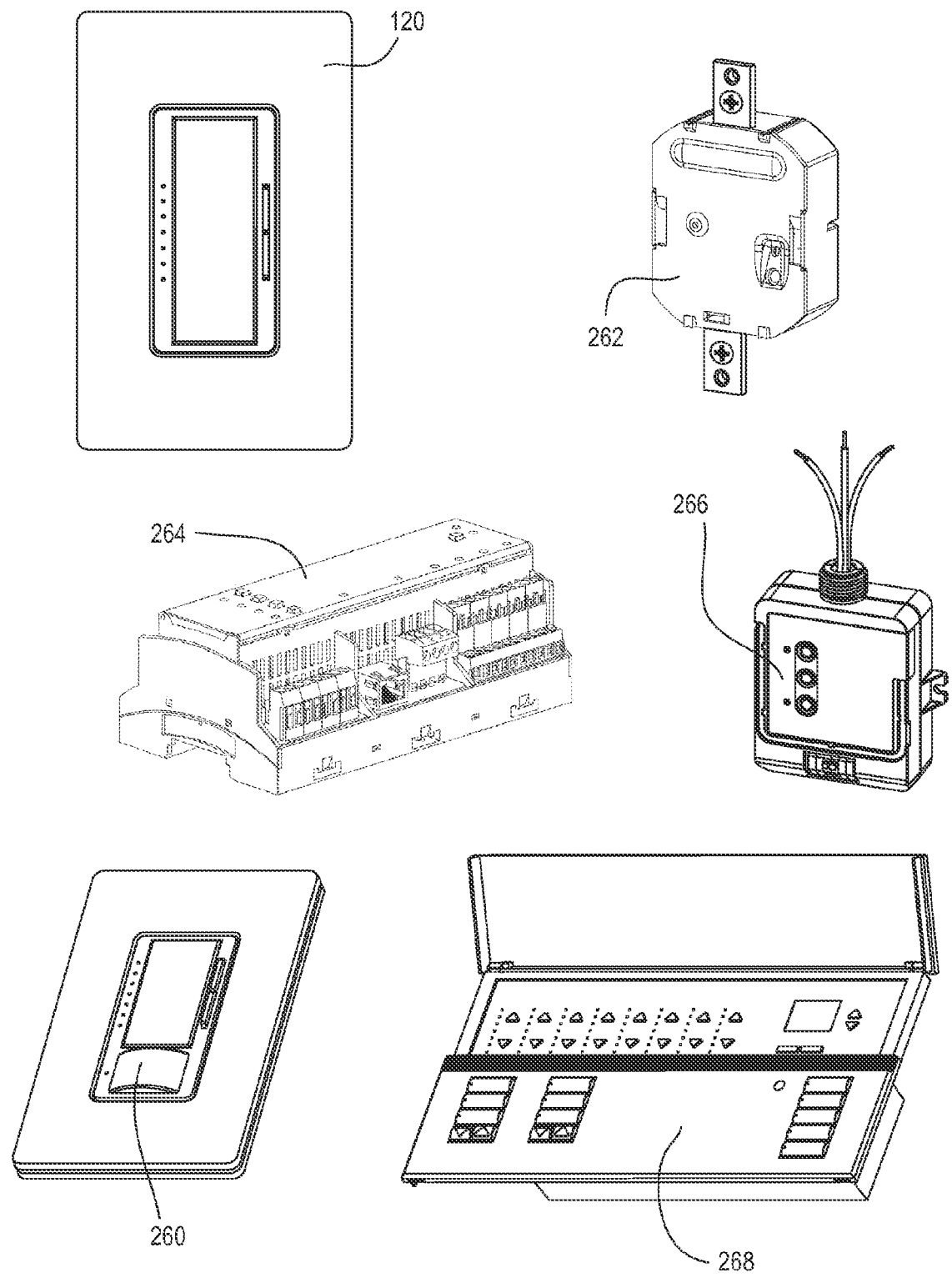
FIG. 2B shows example form factors of the digital ballast controller of the load control system of FIG. 1.

Alternatively, the digital ballast controller 120 may comprise different user interfaces and form factors as shown in FIG. 2B. The user interface of the digital ballast controller 120 may not include the visual indicators 128 for providing feedback and may comprise different button combinations than that shown in FIG. 2B. In addition, the user interface of the digital ballast controller 120 could also include a lens in the front surface for directing infrared energy from an occupant to an internal occupancy detection circuit (similar to that of the occupancy sensor 130) for detecting occupancy and vacancy conditions. The digital ballast controller 120 may not include the user interface, but could simply comprise an in-wall device 260 adapted to be mounted inside an electrical wallbox and to receive the RF signals from the wireless occupancy sensor 130, the wireless daylight sensor 140, and the wireless battery-powered remote control 150. In addition, the digital ballast controller 120 could alternatively be mounted to a ceiling, in an electrical panel, to a DIN rail in an electrical closet (e.g., device 262 in FIG. 2B), directly to a lighting fixture in which one of the digital dimming ballasts 110 is installed, or to a junction box behind a wall or above a ceiling (e.g., device 264 in FIG. 2B). The digital ballast controller 120 may also comprise a printed circuit board mounted in an enclosure or in a power panel, for example, as shown and described in greater detail in commonly-assigned U.S. Pat. No. 5,808,417, issued Sep. 15, 1998, entitled LIGHTING CONTROL SYSTEM WITH CORRUGATED HEAT SINK, the entire disclosure of which is hereby incorporated by reference. Further, the digital ballast controller 120 could comprise a multi-zone lighting control device 266, such as a GRAFIK EYE control unit, which is adapted to be mounted in a multi-gang electrical wallbox and has an advanced user interface for configuring and adjusting the controlled lighting loads.

The ballasts 110 could alternatively be digital switching ballasts that are only responsive to digital messages transmitted by the digital ballast controller 120 that include commands to turn the respective lamps on and off. The digital switching ballasts would not be responsive to commands to adjust the intensity of the respective lamp 104 across the dimming range of the ballast, i.e., between the low-end intensity $L_{LE}$ and the high-end intensity $L_{HE}$. However, the digital switching ballasts may be operable to adjust the high-end intensity $L_{HE}$ in response to digital messages received from the digital ballast controller 120.

In addition, the ballasts 110 could alternatively be digital bi-level switching ballasts that are each able to individually control (e.g., turn off and on) a plurality of lamps (e.g., two or three lamps per ballast). For example, a bi-level switching ballast controlling three lamps may be operable to turn all three lamps on to provide a maximum intensity, turn one lamp off and two lamps on to provide a first dimmed level, turn two lamps off and one lamp on to provide a second dimmer level (less than the first dimmed level), and turn all lamps off. The digital ballast controller 120 may transmit specific bi-level switching commands to the ballast 110 when the ballasts are bi-level switching ballasts (e.g., commands to turn on one lamp, turn of two lamps, etc.). Alternatively, a bi-level switching ballast may be responsive to commands to adjust the intensity to any level across the dimming range of a standard dimming ballast, i.e., between the low-end intensity $L_{LE}$ and the high-end intensity $L_{HE}$. For example, the bi-level switching ballast may turn on all three lamps in response to receiving a command to control the lamps to 100%, may turn on two lamps in response to receiving a command to control the lamps to less than 100%, but greater than or equal to 50%, may turn on one lamp in response to receiving a command to control the lamps to less than 50%, but greater than 0%, and may turn off the lamps in response to receiving a command to control the lamps to 0%. The bi-level switching ballasts provide lower cost alternatives to standard dimming ballasts when only a few discrete dimmed levels are required for an installation. For example, a bi-level switching ballast may only turn one lamp of three lamps on in response to an occupancy sensor (e.g., the occupancy sensor 130) detecting an occupancy condition, and may turn on all lamps in response to an actuation of a button of a remote control device (e.g., the remote control device 150).

Further, the ballasts 110 could alternatively be emergency ballasts having internal batteries for powering at least one lamp of a lighting fixture in the event of loss of power.

Figure 2C:
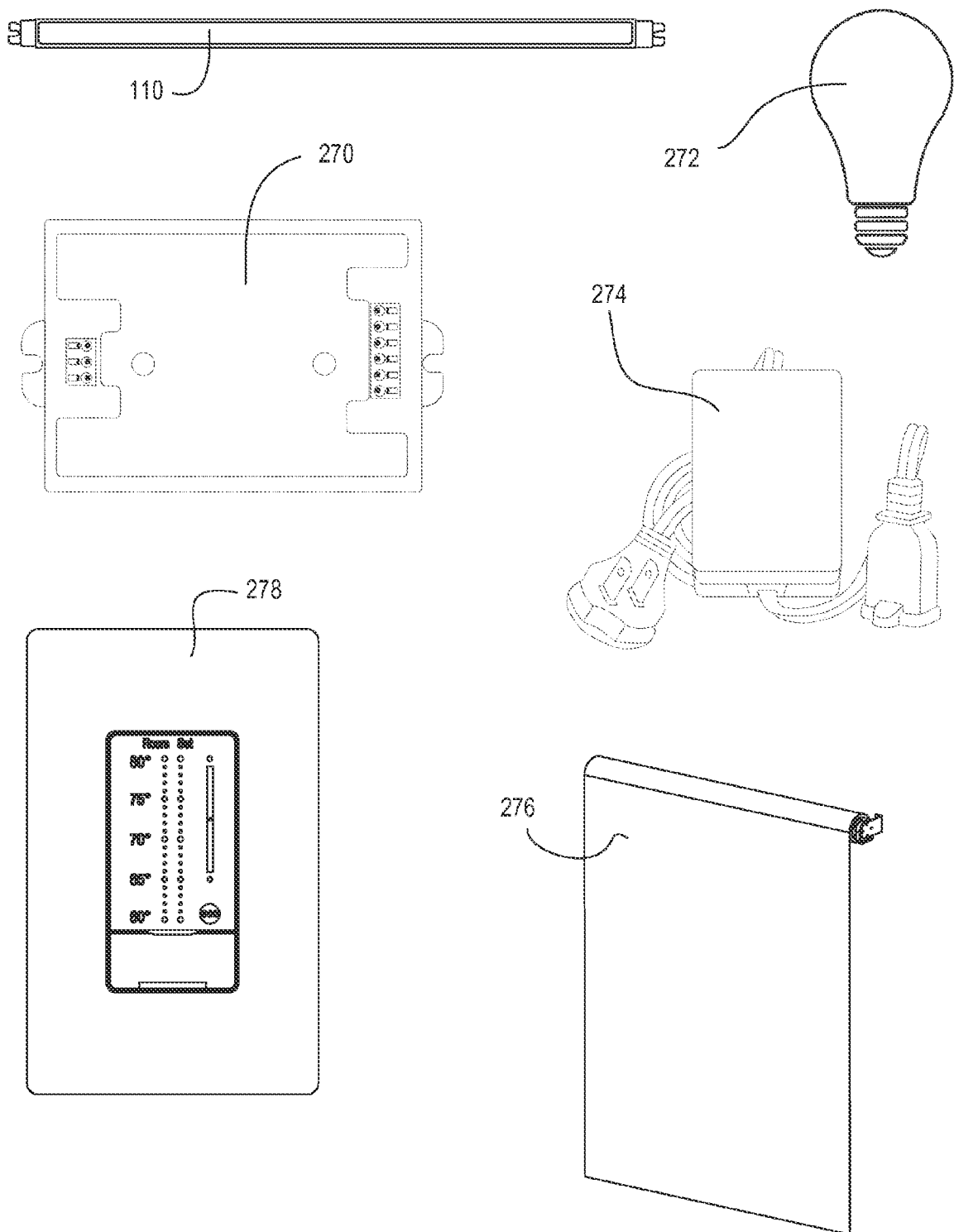
FIG. 2C shows example electrical load and load control devices of the load control system of FIG. 1.

The load control system 100 of FIG. 1 could alternatively comprise load control devices for other types of electrical loads (rather than ballasts for fluorescent lamps). FIG. 2C shows examples of additional types of electrical loads and load control devices that may be included in the load control system 100. For example, the load control devices of the load control system 100 may also comprise a light-emitting diode (LED) driver 270 for driving an LED light source (i.e., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp 272, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device 274, controllable electrical receptacle, or controllable power strip for controlling one or more plug-in electrical loads (such as coffee pots or space heaters); a motor control unit for controlling a motor load, such as a ceiling fan or an exhaust fan; a drive unit for controlling a motorized window treatment 276 or a projection screen; motorized interior or exterior shutters; a thermostat for a heating and/or cooling system; a temperature control device 278 for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). In addition, a single digital ballast controller could be coupled to multiple types of load control devices in a single load control system.

Figure 3A:
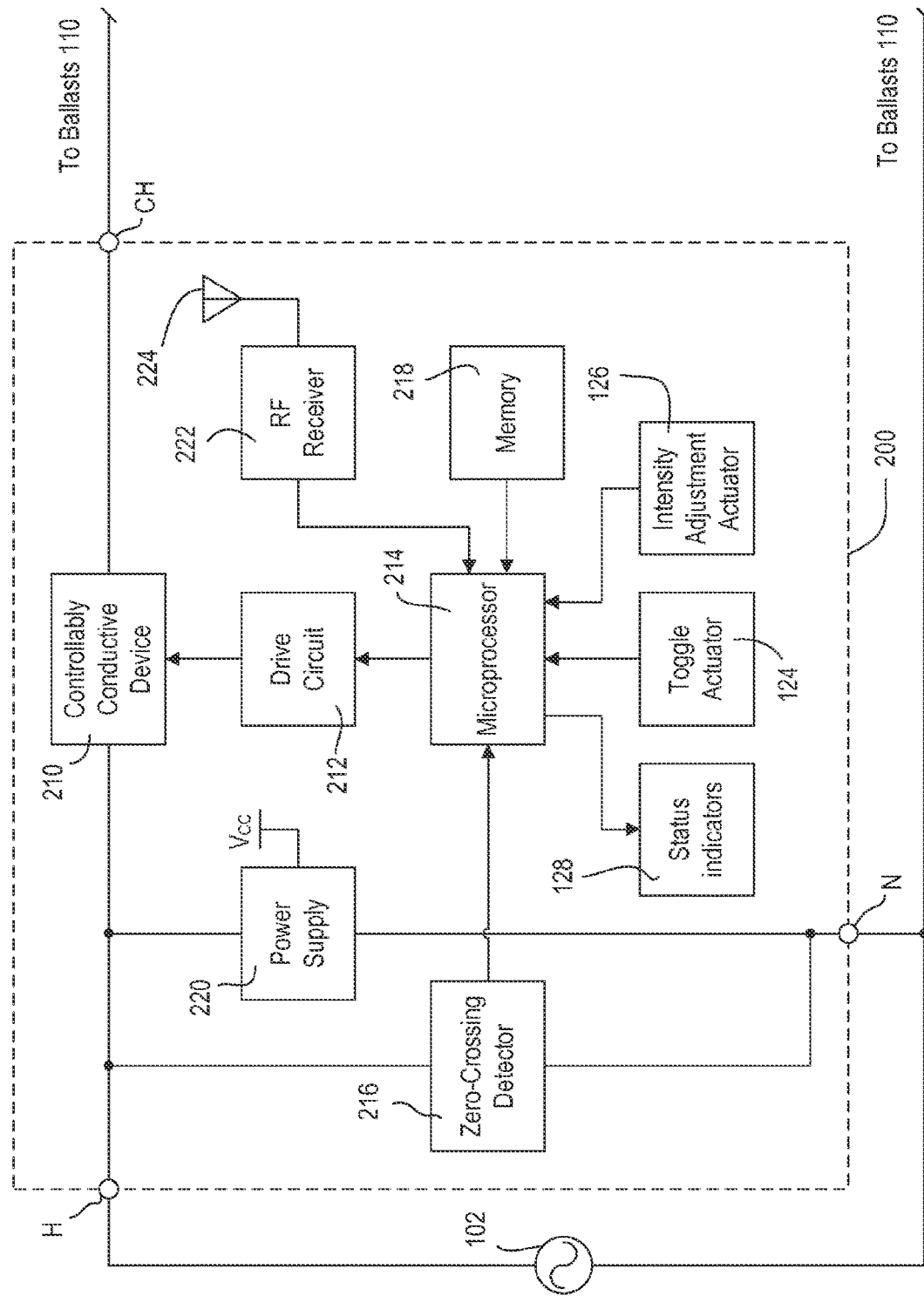
FIG. 3A is a simplified block diagram of a digital ballast controller.

FIG. 3A is a simplified block diagram of a digital ballast controller 200 (e.g., the digital ballast controller 120 of the load control system 100 shown in FIG. 1). The electrical hardware of the digital ballast controller 200 is very similar to that of a standard dimmer switch. The digital ballast controller 200 comprises a hot terminal H and a neutral terminal N adapted to be coupled to the AC power source 102, and a control-hot terminal CH adapted to be coupled to one or more two-wire digital dimming ballast (e.g., the two-wire digital dimming ballast 110 of the load control system 100 shown in FIG. 1). The digital ballast controller 200 comprises a controllably conductive device (CCD) 210, i.e., a controlled switch, coupled in series electrical connection between the AC power source 102 and the digital dimming ballasts 110 for generating a control-hot voltage $V_{CH}$. The controllably conductive device 210 may comprise any suitable type of bidirectional semiconductor switch, such as, for example, a triac, a field-effect transistor (FET) in a rectifier bridge, two FETs in anti-series connection, or one or more insulated-gate bipolar junction transistors (IGBTs). The controllably conductive device 210 is operable to conduct a total load current $I_{LOAD}$ of the ballasts 110 and the lamps 104. The controllably conductive device 210 includes a control input coupled to a drive circuit 212. The digital ballast controller 200 further comprises a microprocessor 214 coupled to the drive circuit 212 for rendering the controllably conductive device 210 conductive or non-conductive to thus generate the control-hot voltage $V_{CH}$ at the control-hot terminal CH. The microprocessor 214 may alternatively comprise, for example, a microcontroller, a programmable logic device (PLD), an application specific integrated circuit (ASIC), a field-programmable gate array (FPGA), or any suitable processing device, controller, or control circuit.

The microprocessor 214 is coupled to a zero-crossing detector 216, which is coupled between the hot terminal H and the neutral terminal N for determining the zero-crossings of the AC power source 102. The zero-crossings are defined as the times at which the AC supply voltage of the AC power source 102 transitions from positive to negative polarity, or from negative to positive polarity, for example, at the beginning (and end) of each half-cycle. The microprocessor 214 may be operable to measured a line-cycle time period $T_{LC}$ by measuring the (i.e., the time period between every other zero-crossing of the AC power source 102).

The microprocessor 214 provides the control inputs to the drive circuit 212 at predetermined times relative to the zero-crossings of the AC power source 102 for controlling the controllably conductive device 210 to be non-conductive and conductive each half-cycle of the AC power source to thus generate the control-hot voltage $V_{CH}$. Specifically, the controllably conductive device 210 is controlled to be non-conductive at the beginning of each half-cycle and is rendered conductive at a firing time, such that the controllably conductive device is conductive for a conductive period each half-cycle of the AC power source (i.e., the control-hot voltage $V_{CH}$ resembles a forward phase-control voltage). The microprocessor 214 is operable to adjust the firing time of the controllably conductive device 210 across a small range each half-cycle to communicate the digital messages (i.e., packets of digital data) to the digital dimming ballasts 110 as will be described in greater detail below. In addition, if the lamps 104 of the both ballasts 110 should be off, the microprocessor 214 may be operable to render the controllably conductive device 210 non-conductive for the entire length of each half-cycle to interrupt the load current $I_{LOAD}$ to the ballasts, and thus, preventing the ballasts 110 from drawing any standby current from the AC power source 102.

As mentioned above, the microprocessor 214 renders the controllably conductive device 210 conductive each half-cycle to generate the control-hot voltage $V_{CH}$. The control-hot voltage $V_{CH}$ is characterized by a frequency (e.g., approximately twice the frequency of the AC mains line voltage) that is much smaller the frequency of the digital messages transmitted by the control devices of the prior art power-line carrier communication systems. Since the controllably conductive device 210 is coupled between the AC power source 102 and the digital dimming ballasts 110, the control-hot voltage $V_{CH}$ only exists on the circuit wiring 114 between the digital ballast controller 120 and the digital dimming ballasts 110 (i.e., the digital ballast controller operates to "swallow" the control-hot voltage $V_{CH}$). Accordingly, the control-hot voltage $V_{CH}$ does not interfere with other control devices that may be coupled to the AC power source 102. In addition, the control-hot voltage $V_{CH}$ is not degraded by a reactive element that may be coupled in parallel with the AC power source 102, for example, a large capacitance due to the other control devices coupled in parallel with the AC power source.

Since the electrical hardware of the digital ballast controller 200 is very similar to that of a standard dimmer switch, the microprocessor 214 could be controlled to alternately operate in a dimmer mode and a digital communication mode. In the dimmer mode, the microprocessor 214 could render the controllably conductive device 210 conductive at a phase angle each half-cycle that is dependent upon the desired lighting intensity $L_{DES}$ to control one or more prior art dimmable two-wire ballasts, for example, a screw-in compact fluorescent lamp having an integral dimmable electronic ballast circuit. In the digital communication mode, the microprocessor 214 could render the controllably conductive device 210 conductive each half-cycle to generate the control-hot voltage $V_{CH}$ to transmit digital messages to the digital dimming ballasts 110 as described herein. Accordingly, the digital ballast controller 200 could be field-configurable to operate in the dimmer mode and the digital communication mode (e.g., using an advanced programming mode) depending upon the type of loads to which the digital ballast controller is coupled. An example of an advanced programming mode for a wall-mounted load control device is described in greater detail in U.S. Pat. No. 7,190,125, issued Mar. 13, 2007, entitled PROGRAMMABLE WALLBOX DIMMER, the entire disclosure of which is hereby incorporated by reference.

The microprocessor 214 receives inputs from actuators, e.g., the toggle actuator 124 and the intensity adjustment actuator 126 of the digital ballast controller 120, and controls a visual display, e.g., the status indicators 128 shown in FIG. 1. The microprocessor 214 is also coupled to a memory 218 for storage of the preset intensities of fluorescent lamps 104 and the serial number of wireless control devices (e.g., wireless transmitters, such as the occupancy sensor 130, the daylight sensor 140, and the remote control 150) to which the digital ballast controller 200 is associated. The memory 218 may be implemented as an external integrated circuit (IC) or as an internal circuit of the microprocessor 214. A power supply 220 is coupled between the hot terminal H and the neutral terminal H and generates a direct-current (DC) supply voltage $V_{CC}$ for powering the microprocessor 214, the memory 218, and other low-voltage circuitry of the digital ballast controller 200.

The digital ballast controller 200 further comprises a wireless communication circuit, e.g., an RF receiver 222 and an antenna 224 for receiving the RF signals 106 from wireless control devices (i.e., the occupancy sensor 130, the daylight sensor 140, and the remote control 150). The microprocessor 214 is operable to control the controllably conductive device 210 in response to the messages received via RF signals (e.g., the RF signals 106). Examples of antennas for wall-mounted control devices, such as the digital ballast controller 120, are described in greater detail in U.S. Pat. No. 5,982,103, issued Nov. 9, 1999, and U.S. Pat. No. 7,362,285, filed Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference. Alternatively, the wireless communication circuit could comprise an RF transmitter for transmitting RF signals, an RF transceiver for both receiving and transmitting RF signals, or an infrared (IR) receiver for receiving IR signals. The digital ballast controller 200 could also include an integral occupancy detection circuit (not shown) similar to that of the occupancy sensor 130 for detecting occupancy and vacancy conditions in the space in which the digital ballast controller 200 is located. The digital ballast controller 200 may comprise a lens in the front surface for receiving infrared energy from an occupant in the space, for example, as shown in commonly-assigned U.S. Patent Application Publication No. 2010/0188009, published Jul. 29, 2010, entitled MULTI-MODAL LOAD CONTROL SYSTEM HAVING OCCUPANCY SENSING, the entire disclosure of which is hereby incorporated by reference.

Figure 3B:
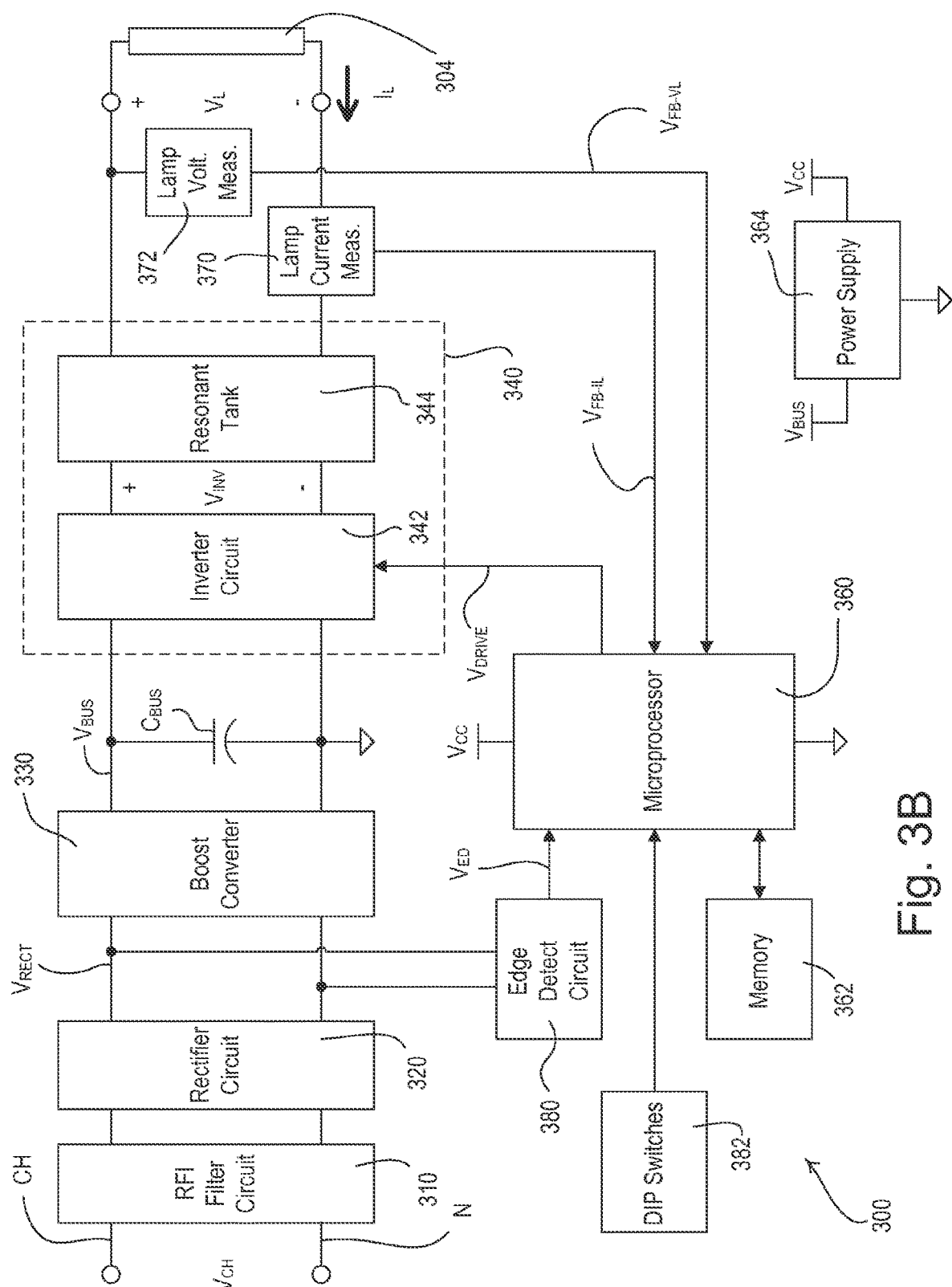
FIG. 3B is a simplified block diagram of a digital dimming ballast.

FIG. 3B is a simplified block diagram of a digital dimming ballast 300 (e.g., one of the digital dimming ballasts 110 of the load control system 100 shown in FIG. 1) for controlling the intensity of a fluorescent lamp 304. The ballast 300 comprises a control-hot terminal CH and a neutral terminal N that are adapted to be coupled to an alternating-current (AC) power source (not shown) for receiving the control-hot voltage $V_{CH}$ from a digital ballast controller (e.g., the digital ballast controllers 120, 200 shown in FIGS. 1 and 3A). The digital dimming ballast 300 comprises an RFI (radio frequency interference) filter circuit 310 for minimizing the noise provided on the AC mains, and a rectifier circuit 320 for generating a rectified voltage $V_{RECT}$ from the control-hot voltage $V_{CH}$. The digital dimming ballast 300 may further comprises a boost converter 330 for generating a direct-current (DC) bus voltage $V_{BUS}$ across a bus capacitor $C_{BUS}$. The DC bus voltage $V_{BUS}$ typically has a magnitude (e.g., approximately 465 V) that is greater than the peak magnitude $V_{PK}$ of the control-hot voltage $V_{CH}$ (e.g., approximately 170 V). The boost converter 330 also operates as a power-factor correction (PFC) circuit for improving the power factor of the ballast 300. The digital dimming ballast 300 also includes a load regulation circuit 340 comprising an inverter circuit 342 for converting the DC bus voltage $V_{BUS}$ to a high-frequency AC voltage $V_{INV}$ and a resonant tank circuit 344 for coupling the high-frequency AC voltage $V_{INV}$ generated by the inverter circuit to filaments of the lamp 304.

The digital dimming ballast 300 further comprises a microprocessor 360 for controlling the intensity of the fluorescent lamp 304 to the desired lighting intensity $L_{DES}$ between the low-end intensity $L_{LE}$ and the high-end intensity $L_{HE}$. The microprocessor 360 may alternatively comprise, for example, a microcontroller, a programmable logic device (PLD), an application specific integrated circuit (ASIC), a field-programmable gate array (FPGA), or any suitable processing device, controller, or control circuit. The microprocessor 360 is coupled to a memory 362 for storage of the control information of the digital dimming ballast 300. The digital dimming ballast 300 also comprises a power supply 364, which receives the bus voltage $V_{BUS}$ and generates a DC supply voltage $V_{CC}$ (e.g., approximately five volts) for powering the microprocessor 360, the memory 362, and the other low-voltage circuitry of the ballast.

The microprocessor 360 provides a drive control signal $V_{DRIVE}$ to the inverter circuit 342 for controlling the magnitude of a lamp voltage $V_L$ generated across the fluorescent lamp 304 and a lamp current $I_L$ conducted through the lamp. Accordingly, the microprocessor 360 is operable to turn the fluorescent lamp 304 on and off and adjust (i.e., dim) the intensity of the lamp. The microprocessor 360 receives a lamp current feedback signal $V_{FB-IL}$, which is generated by a lamp current measurement circuit 370 and is representative of the magnitude of the lamp current $I_L$. The microprocessor 360 also receives a lamp voltage feedback signal $V_{FB-VL}$, which is generated by a lamp voltage measurement circuit 372 and is representative of the magnitude of the lamp voltage $V_L$.

The ballast 300 comprises an edge detect circuit 380 for receiving the rectified voltage $V_{RECT}$ and generating an edge-detect control signal $V_{DD}$ that is received by the microprocessor 360. For example, the edge detect circuit 380 may drive the edge-detect control signal $V_{ED}$ high (i.e., to approximately the DC supply voltage $V_{CC}$) when the magnitude of the control-hot voltage $V_{CH}$ rises above a rising threshold $V_{TH-R}$ (e.g., approximately 20 volts), and drives the edge-detect control signal $V_{ED}$ low when the magnitude of the control-hot voltage $V_{CH}$ drops below a falling threshold $V_{TH-F}$ (e.g., approximately 10 volts). The microprocessor 360 is operable to determine the firing angle of the control-hot voltage $V_{CH}$ each half-cycle of the AC power source in order to receive the digital messages transmitted by the digital ballast controller 120 as will be described in greater detail below.

The digital dimming ballast 300 could be controlled to alternately operate in a dimmer mode and a digital communication mode. In the dimmer mode, the ballast 300 may be operable to receive a standard phase-control signal from a prior-art dimmer switch and to determine the desired lighting intensity $L_{DES}$ for the lamp 304 in response to the length of the conduction period of the phase-control voltage. In the digital communication mode, the ballast 300 may be operable to receive a control-hot voltage $V_{CH}$ from a digital ballast controller (e.g., the digital ballast controllers 120, 200 shown in FIGS. 1 and 3A) and to determine the desired lighting intensity $L_{DES}$ in response to the digital messages decoded from the control-hot voltage $V_{CH}$.

The microprocessor 360 is operable to determine a control channel (or address) of the digital dimming ballast 300 in response to a channel setting circuit, e.g., two or more DIP (dual in-line package) switches 382. For example, four channels may be selected by adjusting the positions of two DIP switches. Alternatively, the digital dimming ballast 300 could comprise rotary encoder or a plurality of jumpers for selecting the control channel. In addition, the control channel could alternatively be selected in response to digital messages received from the digital ballast controller 120, 200 (e.g., automatically assigned using a "soft-addressing" procedure or manually selected by a user via a graphical user interface running on a computer). The digital dimming ballast 300 may only be assigned to one control channel at a time. However, the digital dimming ballast 300 could alternatively be assigned to multiple control channels. In addition, the digital dimming ballast 300 could alternatively comprise a different DIP switch for each of the plurality of types of wireless control devices to which the ballast may be responsive (e.g., the occupancy sensor 130, the daylight sensor 140, and the remote control 150 shown in FIG. 1). The DIP switch for a specific type of wireless transmitter could be selected (by adjusting the position of the DIP switch) to enable control of the digital dimming ballast 300 in response to that type of wireless transmitter.

The microprocessor 360 determines how the digital dimming ballast 300 operates in response to the various inputs (i.e., the actuations of the toggle actuator 124 and the intensity adjustment actuator 126 of the digital ballast controller 120 or the RF signals 106 received from the occupancy sensor 130, the daylight sensor 140, and the remote control 150) in dependence upon the selected control channel an well as control information stored in the memory 362. The control channel may determine which of the wireless control devices (i.e., the occupancy sensor 130, the daylight sensor 140, and the remote control 150) to which the digital dimming ballast 300 is responsive. In addition, the microprocessor 360 may determine if the digital dimming ballast 300 should respond to actuations of the user interface of the digital ballast controller 120, 200 (e.g., the toggle actuator 124 and the intensity adjustment actuator 126) in response to the control channel. Since the digital dimming ballast 300 determines the control channel in response to the positions of the DIP switches 382 and the digital ballast controller 120 is associated with the wireless transmitters via a manual procedure (i.e., pressing an actuator on the wireless transmitter and pressing an actuator on the digital ballast controller), a load control system including the digital dimming ballast 300 (e.g., the load control system 100 shown in FIG. 1) requires no advanced computing device (e.g., a personal computer or laptop) to be programmed and configured after installation.

For example, the ballasts 110, 300 may respond to the various inputs in dependence upon the control channel as shown in the following table (i.e., which may be stored in the memory 362).

| Channel | Respond to . . . |
|---|---|
| 1 | User interface of digital ballast controller<br>Occupancy Sensors<br>Remote Control #1 |
| 2 | User interface of digital ballast controller<br>Occupancy Sensors<br>Daylight Sensors<br>Remote Control #1 |
| 3 | User interface of digital ballast controller<br>Remote control #2 |
| 4 | User interface of digital ballast controller<br>Occupancy Sensors<br>Remote Control #2 |

When the digital ballast controller 120, 200 receives one of the various inputs (i.e., the actuations of the toggle actuator 124 and the intensity adjustment actuator 126 or the RF signals 106 received from the occupancy sensor 130, the daylight sensor 140, and the remote control 150), the digital ballast controller transmits digital messages including information regarding the channels associated with the source of the control information to the digital dimming ballasts 110, 300. For example, if the digital ballast controller 120, 200 receives an occupied command from the occupancy sensor 130, the digital ballast controller will include information regarding channels 1, 2, and 4 in the digital message that is subsequently transmitted to the digital dimming ballasts 110, 300.

The load control system 100 shown in FIG. 1 allows for easy retrofitting to upgrade from, for example, an older non-dim ballast system. Once installed, the digital dimming ballasts 110, 300 are able to receive power over the existing building wiring, and the digital ballast controller 120, 200 is able to transmit digital messages to the ballasts over the existing building wiring. In other words, the load control system 100 requires no additional wiring and provides both power and communication over the two wires between the AC power source 102 and the digital dimming ballasts 110, 300. The digital dimming ballasts 110, 300 allow users of the system to control their visual environment, thereby improving end user comfort and productivity. Since the load control system 100 requires no additional wiring and no advanced computing device to be programmed, the load control system provides economic savings in regards to installation and servicing, and provides a cognitive benefit to those installing and servicing the load control system. In addition, the digital dimming ballasts 110, 300 may be easily replaced in the event of a ballast failure since the control channel is simply determined from the positions of the DIP switches 382 (which may be effortlessly adjusted to match the ballast that is being replaced). Further, the DIP switches 382 of a plurality of the ballasts 110, 300 could be set at the time of manufacture and then shipped to a customer, such that a load control system including the plurality the digital dimming ballast 110, 300 could be functional immediately upon installation.

Figure 4A:
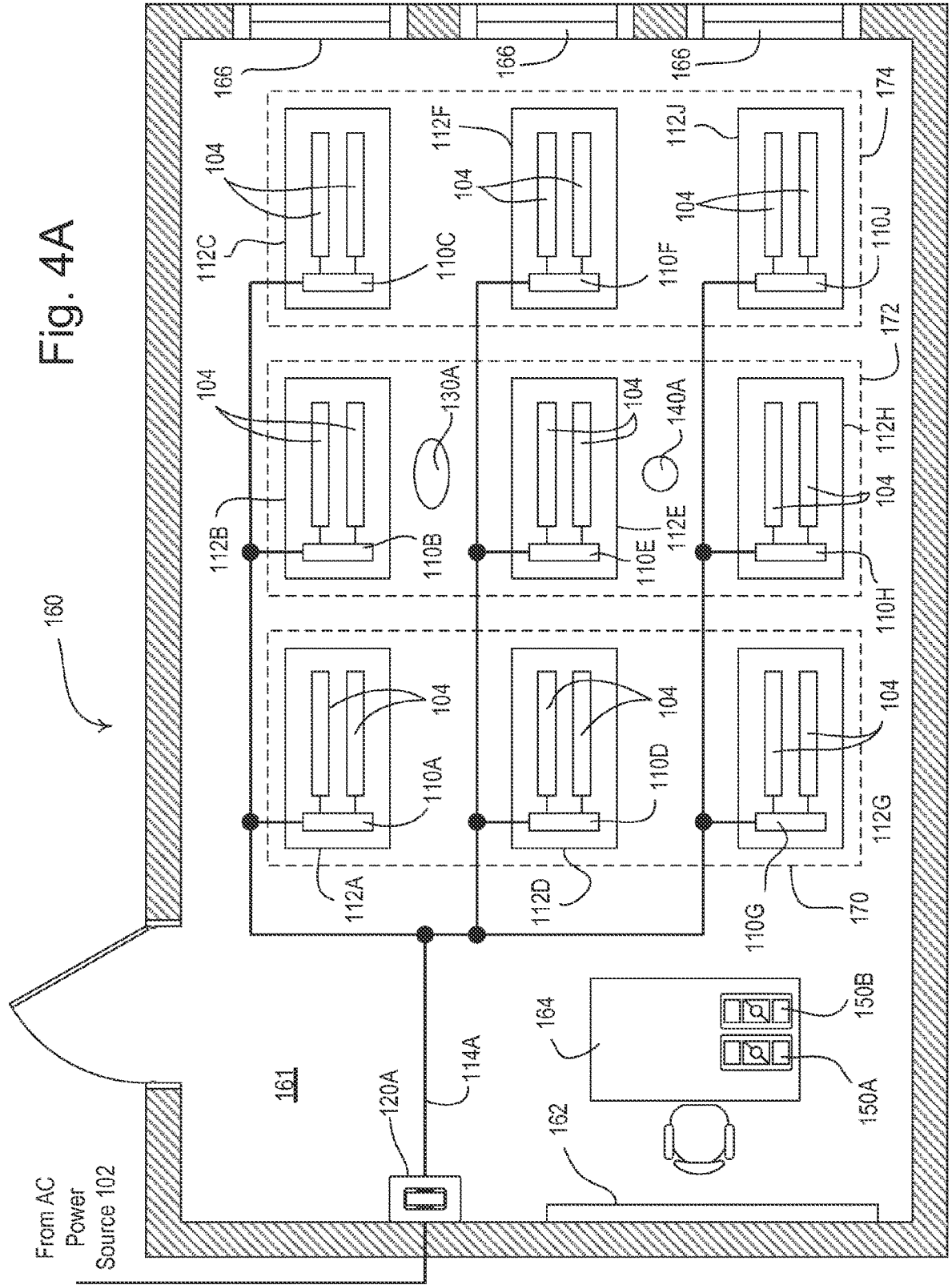
FIGS. 4A and 4B are floor plan diagrams of example installations of lighting control system in a classroom.

FIG. 4A is a floor plan diagram of a first installation 160 of a load control system (e.g., the load control system 100) in a classroom 161. The classroom 161 has a presentation board 162 and a desk 164 at the front end and three windows 166 at the back end. The classroom 161 includes nine lighting fixtures 112A-112J, which each include a respective two-wire digital dimming ballast 110A-110J driving two fluorescent lamps 104. A digital ballast controller 120A (e.g., the digital ballast controller 120, 200 shown in FIGS. 1 and 3A) is mounted in an electrical wallbox adjacent the presentation board 162 and is electrically coupled to the ballasts 110A-110J via a circuit wiring 114A for coupling a control-hot voltage $V_{CH}$ generated by the digital dimming ballast 120A and the neutral side of an AC power source to each ballast. An occupancy sensor 130A and a daylight sensor 140A are mounted to the ceiling of the classroom 161 near the center of the room, and two remote controls 150A, 150B are located on the desk 164.

For example, the digital dimming ballasts 110A-110J could replace standard non-dim ballasts, and the digital ballast controller 120A could replace a standard mechanical switch. The digital ballast controller 120A is able to control ballasts 110A-110J in groups, for example, depending upon the distance of the fixtures 112A-112J from the front end or the back end of the classroom 161. According to the example installation of FIG. 4A, all of the ballasts 110A-110J in the classroom 161 are responsive to actuations of the user interfaces of the digital ballast controller 120A. Only the ballasts 110C, 110F, 110J closest to the windows 166 adjust the intensities of the controlled fluorescent lamps 104 in response to the daylight sensor 140A. The ballasts 110A, 110D, 110G closest to the presentation board 162 are controlled by the second remote control 150B, while the remaining ballasts 110B, 110C, 110E, 110F, 110H, 110J are controlled by the occupancy sensor 130A and the first remote control 150A.

To provide this functionality, the ballasts 110A, 110D, 110G in a first group 170 closest to the presentation board 162 are assigned control channel 3, the ballasts 110B, 110E, 110H in a second group 172 in the center of the room are assigned control channel 1, and the ballasts 110C, 110F, 110J in a third group 174 closest to the windows 166 are assigned control channel 2 (as detailed in the table shown above). Therefore, the ballasts 110A, 110D, 110G in the first group 170 respond to the user interfaces of the respective digital ballast controller 120A and the second remote control 150B. The ballasts 110B, 110E, 110H in the second group 172 respond to the user interfaces of the respective digital ballast controllers 120A-120C, the occupancy sensor 130A, and the first remote control 150A. The ballasts 110C, 110F, 110J in the third group 174 respond to the user interfaces of the respective digital ballast controller 120A, the occupancy sensor 130A, the daylight sensor 140A, and the first remote control 150A.

If all of the lamps 104 controlled by the digital dimming ballasts 110A-110J on the circuit wiring 114A should be off, the digital ballast controller 120A can render the controllably conductive device 210 non-conductive to disconnect the ballasts from the AC power source, and thus prevent the ballasts from drawing any standby current from the AC power source. In addition, one or more of the ballasts 110A-110J could comprise prior art non-dim ballasts that would not be responsive to any digital messages transmitted by the digital ballast controller 120A to the digital dimming ballasts in the classroom 161. The non-dim ballasts would each simply remain at the high-end intensity $L_{HE}$ while the digital dimming ballasts are controlled through the dimming range by the digital ballast controller 120A. The digital ballast controller 120A could turn off the non-dim ballasts (as well as the digital dimming ballasts) by rendering the controllably conductive device 210 non-conductive. As previously mentioned, the ballasts could alternatively comprise digital switching ballasts that are responsive to digital messages transmitted by the digital ballast controller 120A, but only to commands to turn the respective lamps on and off.

Figure 4B:
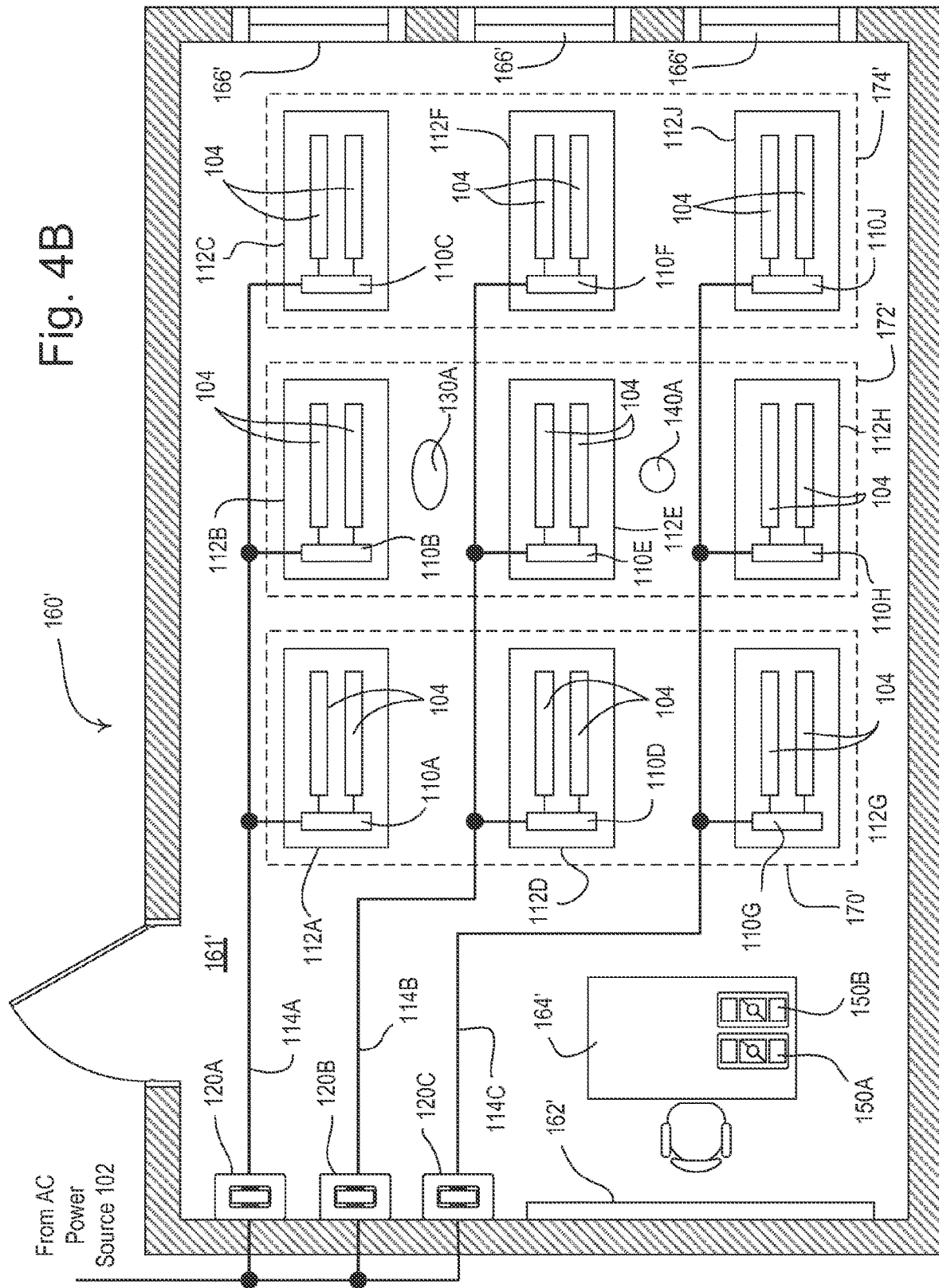

FIG. 4B is a floor plan diagram of a second example installation 160' of a load control system (e.g., the load control system 100) in a classroom 161'. The classroom 161' of FIG. 4B includes three different circuit wirings 114A, 114B, 114C providing power to the ballasts 110A-110J, and thus three digital ballast controllers 120A, 120B, 120C, which are mounted in electrical wallboxes adjacent a presentation board 162'. The first three ballasts 110A, 110B, 110C are electrically coupled to the first digital ballast controller 120A via the first circuit wiring 114A. In addition, ballasts 110D, 110E, 110F are electrically coupled to the second digital ballast controller 120B via the second circuit wiring 114B, and ballasts 110G, 110H, 110J are electrically coupled to the third digital ballast controller 120C via the third circuit wiring 114C.

The digital ballast controllers 120A, 120B, 120C of FIG. 4B are able to control the ballasts 110A-110J in three groups 170', 172', 174', i.e., depending upon the distance of the fixtures 112A-112J from the front end or the back end of the classroom 161'. Accordingly, the digital ballast controllers 120A, 120B, 120C are able to control the ballasts 110A-110J in response to an occupancy sensor 130B, a daylight sensor 140A, and remote controls 150A, 150B independent of the specific circuit wirings 114A, 114B, 114C that extend from the front end to the back end of the classroom 161' (i.e., perpendicular to the groups 170', 172', 174'). All of the ballasts 110A-110J in the classroom 161' are responsive to actuations of the user interfaces of the respective digital ballast controllers 120A-120C. Only the ballasts 110C, 110F, 110J closest to windows 166' adjust the intensities of the controlled fluorescent lamps 104 in response to the daylight sensor 140A. The ballasts 110A, 110D, 110G closest to the presentation board 162' are controlled by the second remote control 150B, while the remaining ballasts 110B, 110C, 110E, 110F, 110H, 110J are controlled by the occupancy sensor 130A and the first remote control 150A.

Since each of the digital ballast controllers 120A, 120B, 120C operates to swallow the digital messages transmitted to the ballasts 110A-110J on the respective circuit wirings 114A, 114B, 114C, these digital messages are not received the other digital ballast controllers and thus do not interfere with the other digital ballast controllers. However, each of the digital ballast controllers 120A, 120B, 120C may be operable to transmit digital messages to the other digital ballast controllers via RF signals. Specifically, the digital ballast controller 120A, 120B, 120C may be operable to transmit digital messages to the other digital ballast controllers in response to actuations of the user interfaces, such that all of the ballasts 110A-110J in the classrooms 161, 161' may be responsive to actuations of the user interfaces of any of the digital ballast controllers.

If the digital dimming ballasts 110, 300 are replacing non-dim ballasts, the sockets for the controlled lamps may need to be upgraded from non-dim sockets to dimmable sockets. However, if new ballasts are digital switching ballasts or digital bi-level switching ballasts, the sockets do not need to be upgraded to dimmable sockets. The load control system 100 can still provide group control of the digital switching and/or digital bi-level switching ballasts independent of the circuit wiring (e.g., circuit wirings 114A, 114B, 114C), as well as provide a few discrete dimmed levels of the digital bi-level switching ballasts.

FIG. 5 is a simplified perspective view of a retrofit kit 180 having a two-wire digital dimming ballast 110' (e.g., one of the two-wired digital dimming ballast 110 of the load control system 100 of FIG. 1) mounted to a pan 182, which is designed to be easily installed in a lighting fixture. The retrofit kit 180 further comprises two pairs of dimmable lamp sockets 184 that are mounted to the pan 182 and are pre-wired to the digital dimming ballast 110' via electrical wires 185. Each pair of sockets 184 is operable to be coupled to, for example, a U-bend fluorescent lamp as shown in FIG. 5. Alternatively, the sockets 184 could be mounted at opposite ends of the pan 182 to thus be adapted to be coupled to a straight fluorescent lamp. In addition, the retrofit kit 180 could comprise more or less sockets 184 to allow the ballast 110' to be coupled to a different number of lamps. The retrofit kit 180 further comprises a control-hot electrical wire 186 and a neutral electrical wire 188 for coupling the ballast 110' to the circuit wiring of the building. Accordingly, to provide for easy retrofit installation, the retrofit kit 180 may be assembled prior to shipment to a customer. The old pan of the ballast being replaced can simply be removed from a lighting fixture and the new retrofit kit 180 can be installed into the lighting fixture its place with the only required electrical connections being the control-hot electrical wire 186 and the neutral electrical wire 188 to the circuit wiring of the building.

Figure 6A:
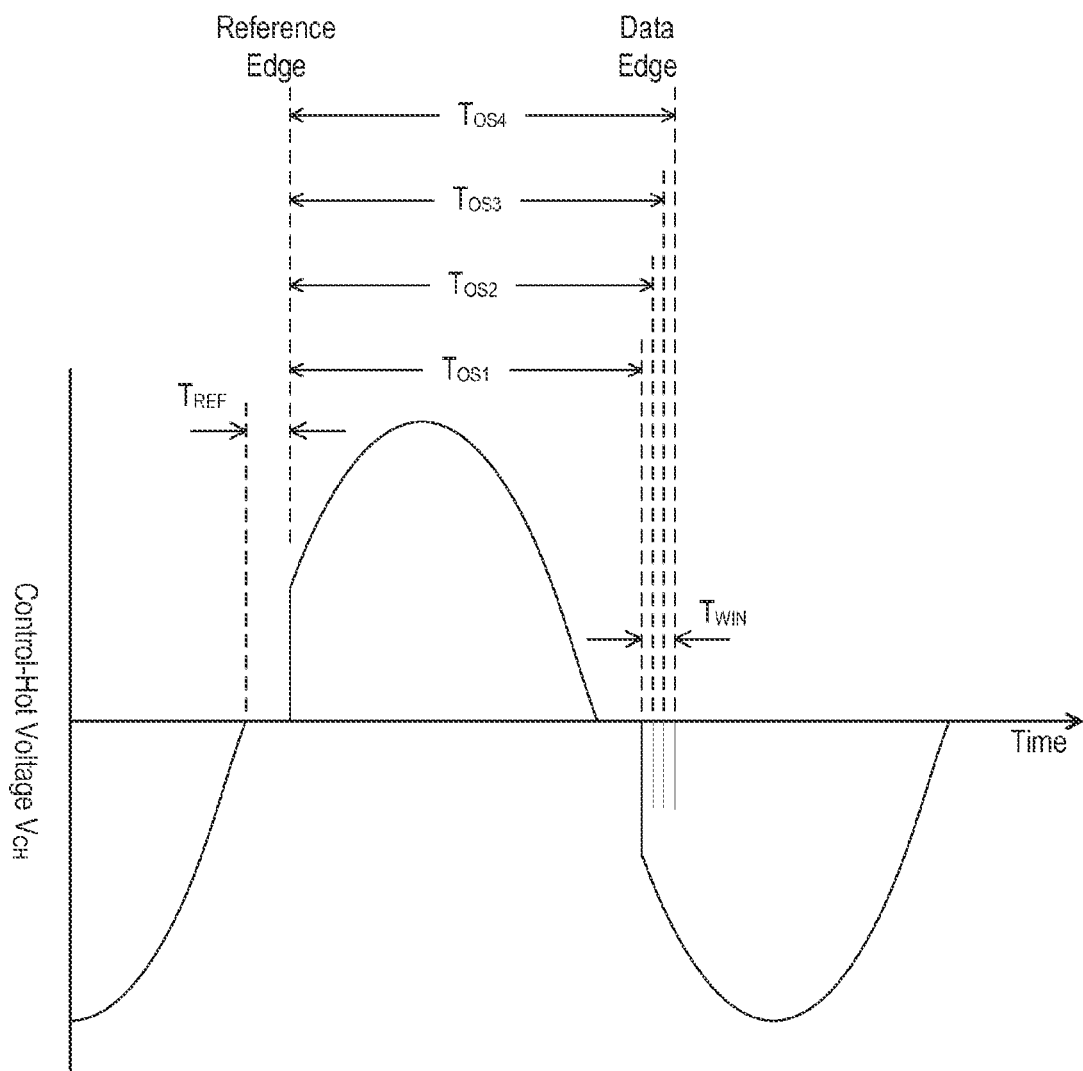
FIGS. 6A and 6B are example timing diagrams of a control-hot voltage generated by a digital ballast controller for communicating digital messages to a digital dimming ballast.
Figure 6B:
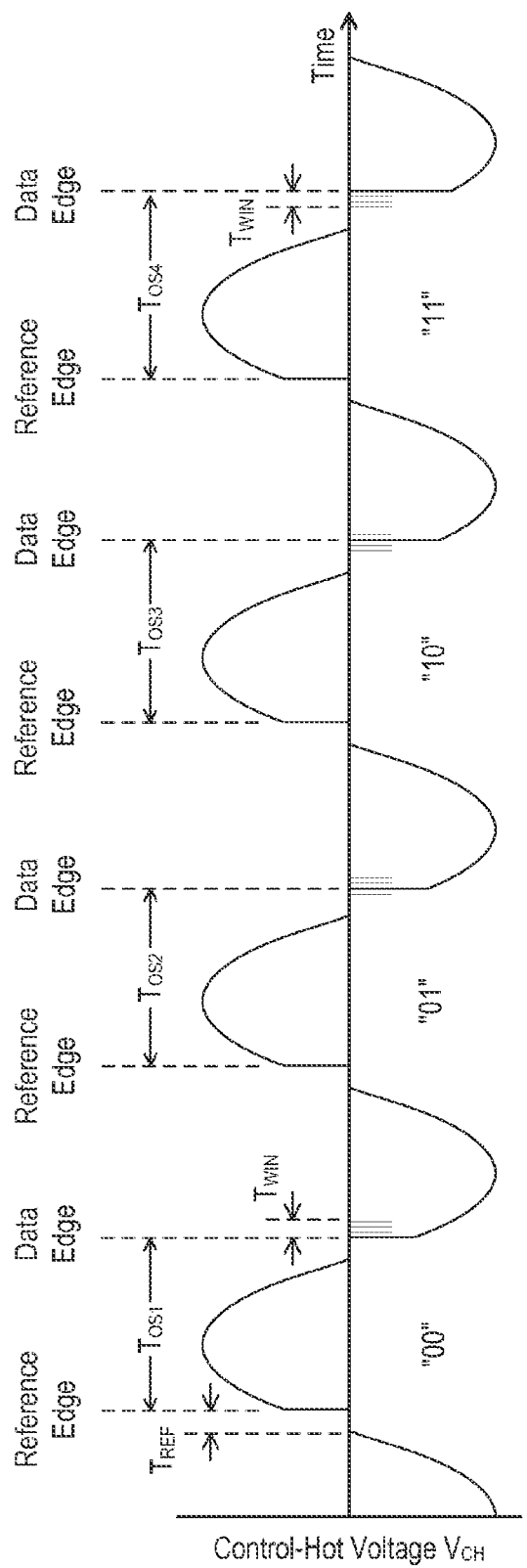

FIGS. 6A and 6B are a simple timing diagrams of a control-hot voltage $V_{CH}$ (e.g., the control-hot voltage generated by the digital ballast controller 120 of FIG. 1) showing a data pattern of a transmitted digital message. As previously mentioned, the digital ballast controller 120 may be operable to adjust the firing time of the respective controllably conductive device 210 across a small time window $T_{WIN}$ (e.g., approximately 300 microseconds) each line cycle to communicate the digital messages to the respective digital dimming ballasts 110. Digital information (i.e., bits of the transmitted digital messages) is encoded in the firing times of timing edges (i.e., transitions) of the control-hot voltage $V_{CH}$. Specifically, the bits of the transmitted digital messages are encoded in the firing time of a data edge (i.e., a data edge time) of the controllably conductive device 210 as measured with respect to a firing time of a reference edge (i.e., a reference edge time) in a previous half-cycle. In other words, the bits of the transmitted digital messages are encoded as a function of the firing times of the reference and data edges. Each data pattern includes a half-cycle having a reference edge and a number $N_{DP}$ of subsequent half-cycles having data edges. Each reference edge is spaced at a reference edge time period $T_{REF}$ (e.g., approximately 1.3 milliseconds) from the zero-crossing of the present half-cycle. As shown in FIG. 6B, there is one data edge for each reference edge (i.e., the number $N_{DP}$ of half-cycles having data edges equal one). When the controllably conductive device of the digital ballast controller 120 comprises a FET in a rectifier bridge, two FETs in anti-series connection, or one or more insulated-gate bipolar junction transistors (IGBTs), the digital ballast controller may be operable to control the length of a transition times (i.e., the rising or falling times) of the reference edges and the data edges.

The value of the digital data transmitted by the digital ballast controller 120 is dependent upon an offset time period $T_{OS}$ (i.e., a difference) between the data edge and the previous reference edge (i.e., in the previous half-cycle). The digital ballast controller 120 may control the data edges to be at one of four times across the time window $T_{WIN}$, thus resulting in one of four offset time periods $T_{OS1}$, $T_{OS2}$, $T_{OS3}$, $T_{OS4}$, from the previous reference edge, such that two bits may be transmitted each line cycle. To transmit bits "00", the digital ballast controller 120 is operable to render the controllably conductive device 210 conductive at the first possible data edge time, such that the first offset time period $T_{OS1}$ (e.g., approximately 8.33 milliseconds) exists between the reference edge and the data edge. For example, each of the possible data edge times may be an offset period difference $\Delta T_{OS}$ (e.g., approximately 100 microseconds) apart, and the rise time of the control-hot voltage $V_{CH}$ at the data edges is less than approximately 10 microseconds.

Accordingly, the digital ballast controller 120 is operable to control the offset time period $T_{OS}$ between the reference edge and the data edge to the second offset time period $T_{OS2}$ (e.g., approximately 8.43 milliseconds) to transmit bits "01", to the third offset time period $T_{OS3}$ (e.g., approximately 8.53 milliseconds) to transmit bits "10", and the fourth offset time period $T_{OS4}$ (e.g., approximately 8.63 milliseconds) to transmit bits "11" as shown in FIG. 6. The microprocessor 360 of each digital ballast 110 determines if the offset time period $T_{OS}$ of each data pattern is approximately equal to one of the four offset time periods $T_{OS1}$, $T_{OS2}$, $T_{OS3}$, $T_{OS4}$ within a default tolerance $\Delta T_{OS}$, which may be equal to, for example, approximately fifty microseconds. Alternatively, the number of data edges possible in the time window $T_{WIN}$ could be greater than four, for example, eight in order to transmit three bits of data each line cycle.

When the digital ballast controller 120 is not transmitting a digital message to the digital dimming ballasts 110, the digital ballast controller continues to render the controllably conductive device 210 conductive as if the digital ballast controller was continuously transmitting bits "00." Specifically, the digital ballast controller 120 renders the controllably conductive device 210 conductive after the reference edge time period $T_{REF}$ from the zero-crossing in a first half-cycle of each line cycle and renders the controllably conductive device conductive after the first offset time period $T_{OS1}$ in the other half-cycle of the line cycle as measured from the end of the reference edge time period $T_{REF}$ in the previous half-cycle, such that the control-hot voltage $V_{CH}$ generated by the digital ballast controller has at least one timing edge in each half-cycle of the AC power source 102. Because the control-hot voltage $V_{CH}$ has at least one timing edge in each half-cycle, the digital dimming ballasts 110 do not have zero-crossing detectors having low voltage thresholds that may be susceptible to noise on the AC mains line voltage, thus causing communication reception errors. Rather, the digital dimming ballasts 110 include the edge detect circuit 380 having the rising threshold $V_{TH-R}$ (i.e., approximately 20 volts), which is large enough, such that the digital dimming ballasts 110 has an enhance noise immunity to typical noise on the AC mains line voltage.

Alternatively, the digital ballast controller 120 could render the controllably conductive device 210 fully conductive (i.e., for approximately the length of each half-cycle) when the digital ballast controller is not transmitting a digital message (i.e., the control-hot voltage $V_{CH}$ is a full-conduction waveform), Accordingly, the control-hot voltage $V_{CH}$ does not have at least one timing edge in each half-cycle when the digital ballast controller is not transmitting a digital message to the digital dimming ballasts 110.

Alternatively, the digital dimming ballasts 110 may be operable to be controlled into an emergency mode in which the ballasts each control the intensity of the respective lamp 104 to the high-end intensity $L_{HE}$. For example, a normally-open bypass switch could be coupled in parallel with the digital ballast controller 120 and could be rendered conductive during an emergency condition, such that a full-conductive waveform is provided to the control-hot terminals CH of the digital dimming ballasts 110. The digital dimming ballasts 110 could each be operable to control the intensity of the respective lamp 104 to the high-end intensities $L_{HE}$ in response to receiving the full-conduction waveform at the control-hot terminal CH.

Figure 7:
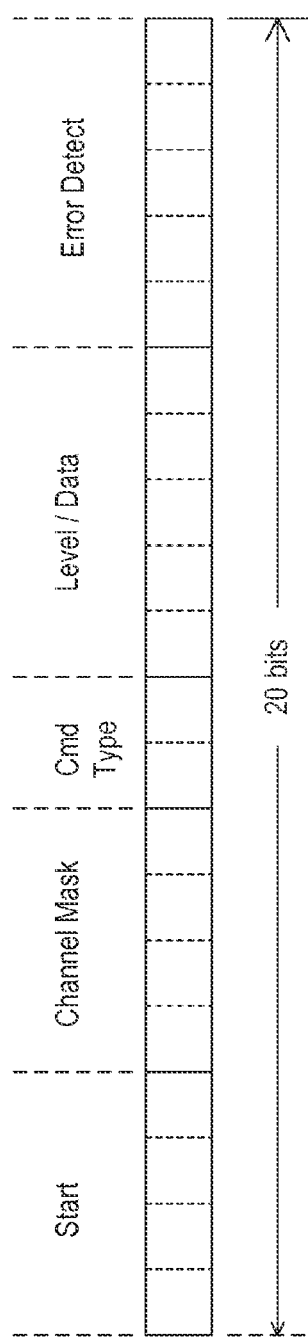
FIG. 7 is an example diagram of a message structure for a digital message transmitted by a digital ballast controller to a digital dimming ballast.

FIG. 7 is a simple diagram of a message structure for a digital message transmitted by a digital ballast controller (e.g., the digital ballast controller 120 of the load control system shown in FIG. 1). Each digital message comprises a total number $N_{DM}$ of bits (e.g., 20 bits). The first four bits comprises a start pattern, which includes a unique start symbol as will be described in greater detail below with reference to FIG. 8. A channel mask of each digital message includes four bits, each of which may be set to indicate the channels of the ballasts 110 that should respond to the digital message. For example, if the ballasts 110 that have control channel 1 should respond to the digital message, the first bit of the channel mask will be a logic one value. The channel mask is followed by two bits that determine a command type of the digital message and five bits that include an intensity level for the fluorescent lamps 104 or data for the ballasts 110. Finally, each digital message concludes with five bits that are used to determine if an error occurred during transmission and reception of the digital message (e.g., a checksum). Accordingly, each digital messages transmitted by the ballast controller 120 is transmitted across a predetermined (i.e., fixed) number of consecutive line cycles, e.g., ten line cycles.

Figure 8:
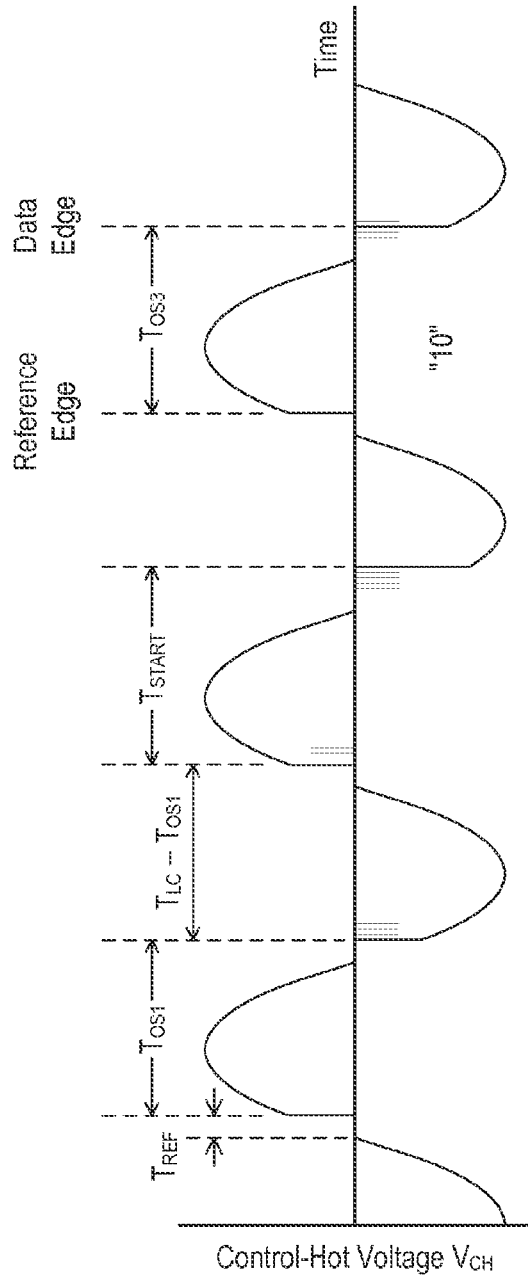
FIG. 8 is an example timing diagram of a control-hot voltage showing a start pattern including a unique start symbol generated by a digital ballast controller for starting a digital message transmitted to a digital dimming ballasts.

FIG. 8 is a simple timing diagram of a control-hot voltage $V_{CH}$ showing a start pattern used to start a digital message transmitted by a digital ballast controller (e.g., the digital ballast controller 120 of the load control system shown in FIG. 1). To transmit the start pattern, the digital ballast controller 120 transmits bits "00" during a first line cycle and then transmits the unique start symbol during a second subsequent line cycle by rendering the controllably conductive device 210 conductive after a start symbol time period $T_{START}$ after the reference edge in the previous half-cycle. The start symbol time period $T_{START}$ is unique from the offset time periods $T_{OS1}$-$T_{OS4}$ used to transmit data to the digital dimming ballasts 110 and may be longer than the offset times, for example, approximately 8.73 milliseconds.

The ballasts 110 continuously monitor the control-hot voltage $V_{CH}$ to determine if the digital ballast controller has transmitted a start pattern including the unique start symbol. Specifically, the microprocessor 360 of each digital dimming ballast 110 measures time periods $T_R E$ between the rising edges in each consecutive half-cycle and stores these times in the memory 362. The microprocessor 360 looks for three consecutive measured time periods $T_1$, $T_2$, $T_3$ stored in the memory 362 that have values corresponding to the start pattern as shown in FIG. 8, i.e., $T_1 = T_{OS1}$, $T_2 = T_{LC} - T_{OS1}$, and $T_3 = T_{START}$, where $T_{LC}$ is the line-cycle time period, which represents the length of each line cycle of the AC power source 102. As mentioned above, the line-cycle time $T_{LC}$ period is measured by the microprocessor 360 (i.e., the time period between every other zero-crossing of the AC power source 102). Alternatively, the line-cycle time $T_{LC}$ period may be a fixed value stored in the memory 362 (e.g., approximately 16.66 milliseconds). Because the start symbol time period $T_{START}$ is unique from the offset time periods $T_{OS1}$-$T_{OS4}$ used to transmit data to the digital dimming ballasts 110, the digital ballast controller 120 is able to interrupt a first digital message that is being transmitted in order to transmit a second digital message to the ballasts 110 by transmitting the start symbol before the end of the first digital message.

Since the second time period $T_2$ of the three consecutive measured time periods is a function of the line-cycle time period $T_{LC}$, which may vary depending upon characteristics the load control system 100 that are not controlled by the digital ballast controller 120, the microprocessor 360 determines if the second time period $T_2$ is equal to the line-cycle time period $T_{LC}$ minus the first offset time period $T_{OS1}$ within a widened tolerance $\Delta T_{OS-W}$, which is greater than the default tolerance $\Delta T_{OS}$, for example, approximately 100 microseconds. Because the digital ballast controller 120 requires four half-cycles to transmit the start pattern, the start pattern takes up 4 bits of each digital message as shown in FIG. 7. After transmitting the start pattern, the digital ballast controller 120 is operable to immediately begin transmitting data in the next line cycle by generating a reference edge in the next half-cycle and a data edge in the subsequent half-cycle as shown in FIG. 8.

Figure 9:
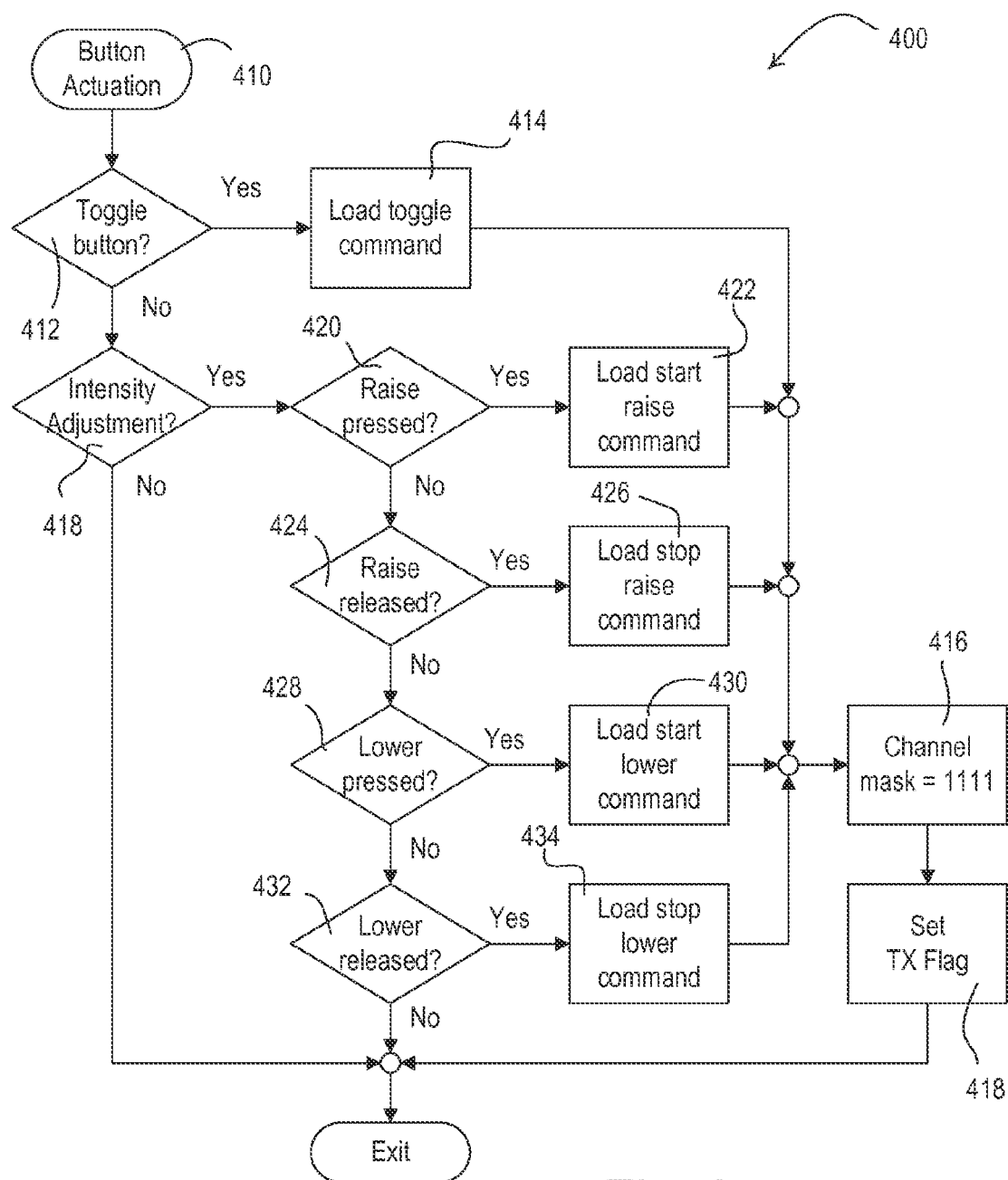
FIG. 9 is a simplified flowchart of a button procedure executed by a digital ballast controller in response to an actuation of an actuator of the digital ballast controller.

FIGS. 9-13 show example flowcharts executed by a control circuit of a digital ballast controller (e.g., the microprocessor 214 of the digital ballast controller 120, 200). Specifically, FIG. 9 is a simplified flowchart of a button procedure 400 executed by the microprocessor 214 of the digital ballast controller 120 in response to an actuation of one of the actuators of the user interface at step 410 in, for example, the example installations 160, 160' of FIGS. 4A and 4B. The microprocessor 214 uses a transmit (TX) buffer to store digital messages to transmit to the digital dimming ballasts 110. If the toggle actuator 124 was actuated at step 412, the microprocessor 214 loads a digital message having a toggle command into the TX buffer at step 414, and sets the channel mask of the digital message equal to "1111" at step 416. The microprocessor 214 then sets a TX Flag to indicate that the digital ballast controller 120 is presently transmitting a digital message to the digital dimming ballasts 110 at step 418, before the button procedure 400 exits. Accordingly, all of the digital dimming ballasts 110 will toggle the controlled lamps 104 (from off to on or from on to off) in response to receiving the transmitted digital message.

If the toggle actuator 124 was not actuated at step 412, but the intensity adjustment actuator 126 was actuated at step 418, the microprocessor 214 determines if the upper portion 126A or the lower portion 126B of the intensity adjustment actuator was just pressed or released. If the upper portion 126A of the intensity adjustment actuator 126 was pressed at step 420, the microprocessor 214 loads a digital message having a start raise command into the TX buffer at step 422, and sets the channel mask of the digital message equal to "1111" at step 416 before the button procedure 400 exits. If the upper portion 126A of the intensity adjustment actuator 126 was released at step 424, the microprocessor 214 loads a digital message having a stop raise command into the TX buffer at step 426. If the lower portion 126B of the intensity adjustment actuator 126 was pressed at step 428, the microprocessor 214 loads a digital message having a start lower command into the TX buffer at step 430. If the lower portion 126B of the intensity adjustment actuator 126 was released at step 432, the microprocessor 214 loads a digital message having a stop lower command into the TX buffer at step 434.

Figure 10A:
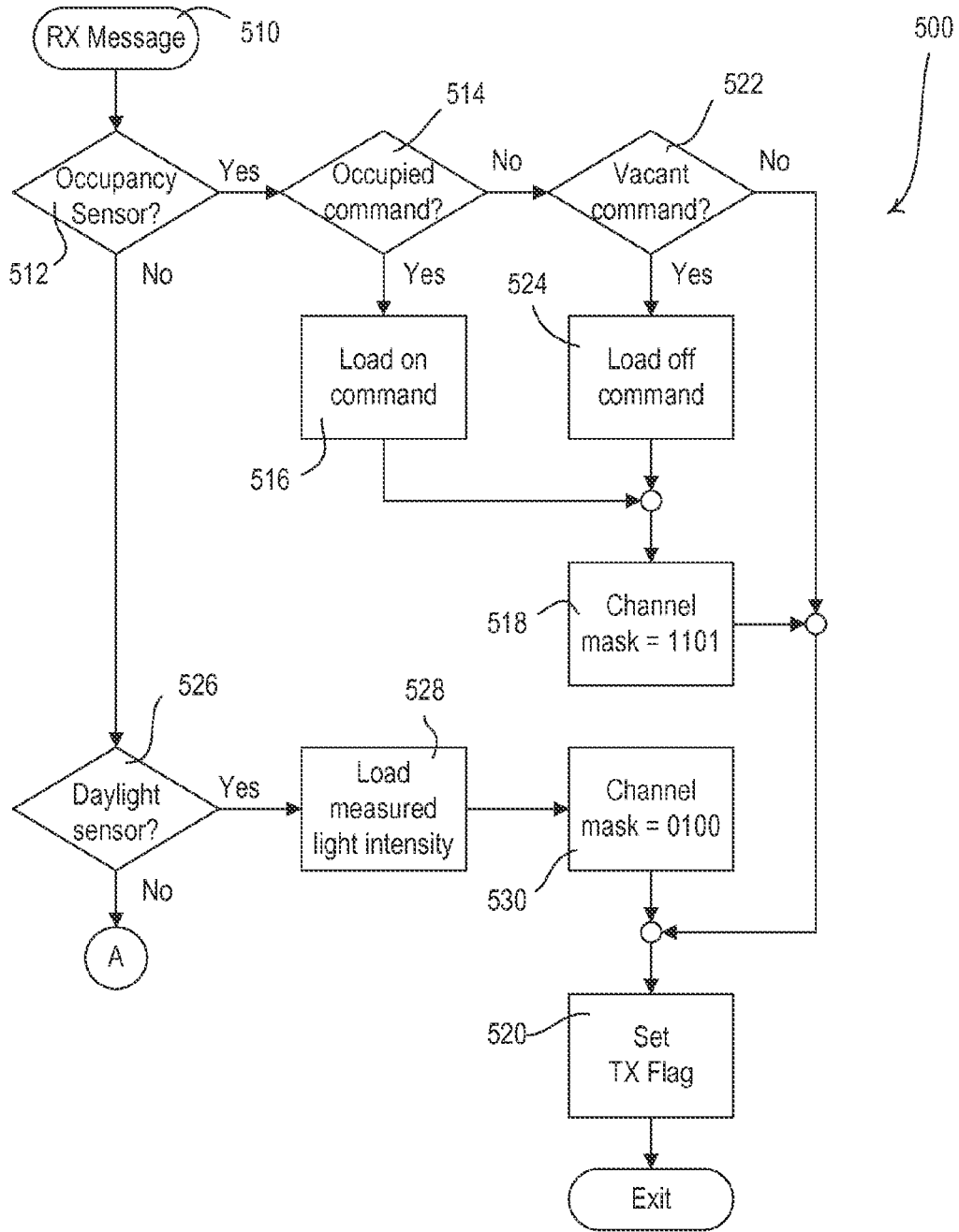
FIGS. 10A and 10B are simplified flowcharts of a radio-frequency (RF) message procedure executed by a digital ballast controller when a digital message is received from an RF transmitter.
Figure 10B:
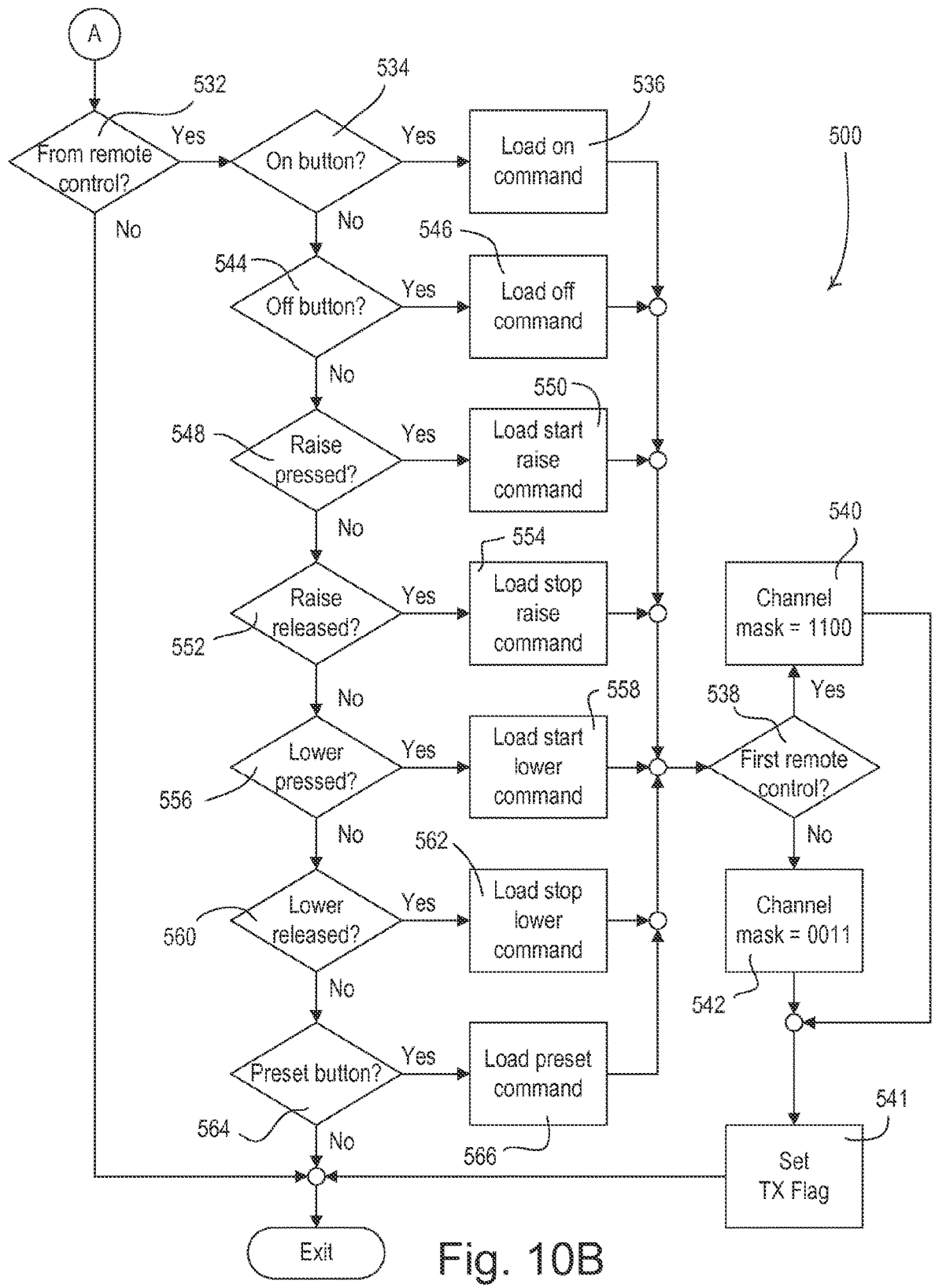

FIGS. 10A and 10B are simplified flowcharts of an RF message procedure 500 executed by the microprocessor 214 of the digital ballast controller 120 when digital message is received from one of the occupancy sensor 130, the daylight sensor 140, and the remote control 150 via the RF signals 106 at step 510. If the received digital message is from the occupancy sensor 130 at step 512 and includes an occupied command at step 514, the microprocessor 214 loads a digital message having an on command into the TX buffer at step 516, sets the channel mask of the digital message equal to "1101" at step 518, and sets the TX Flag at step 520, before the RF message procedure 500 exits. If the received digital message includes a vacant command at step 522, the microprocessor 214 loads a digital message having an off command into the TX buffer at step 524, sets the channel mask equal to "1101" at step 518, and sets the TX Flag at step 520. If the received digital message is not from the occupancy sensor 130 at step 512, but is from the daylight sensor 140 at step 526, the microprocessor 214 loads a digital message including the total light intensity $L_{T\text{-}SNSR}$ measured by the daylight sensor 140 into the TX buffer at step 528, sets the channel mask equal to "0100" at step 530, and sets the TX Flag at step 520, before the RF message procedure 500 exits.

Referring to FIG. 10B, if the received digital message is from one of the remote controls 150A, 150B at step 532 and the on button 152 was actuated at step 534, the microprocessor 214 loads a digital message having an on command into the TX buffer at step 536. If the received digital message is from the first remote control 150A at step 538, the microprocessor 214 sets the channel mask of the digital message in the TX buffer equal to "1100" at step 540. The microprocessor 214 then sets the TX Flag at step 541 to indicate that the digital ballast controller 120 is presently transmitting and the RF message procedure 500 exits. However, if the received digital message is from the second remote control 150B at step 538, the microprocessor 214 sets the channel mask of the digital message equal to "0011" at step 542 and sets the TX Flag at step 541, before the RF message procedure 500 exits. If the off button 154 was actuated at step 544, the microprocessor 214 loads a digital message having an off command into the TX buffer at step 546, before setting the channel mask to either "1100" or "0011" at steps 540, 542, respectively, and setting the TX Flag at step 541.

If the raise button 155 was just pressed at step 548, the microprocessor 214 loads a digital message having a start raise command into the TX buffer at step 550. If the raise button 155 was released at step 552, the microprocessor 214 loads a digital message having a stop raise command into the TX buffer at step 554. If the lower button 156 was just pressed at step 556, the microprocessor 214 loads a digital message having a start lower command into the TX buffer at step 558. If the lower button 156 was released at step 560, the microprocessor 214 loads a digital message having a stop lower command into the TX buffer at step 562. Finally, if the preset button 158 was pressed at step 564, the microprocessor 214 loads a digital message having a preset command into the TX buffer at step 566, before the microprocessor sets the channel mask at steps 540, 542 and sets the TX Flag at step 541, and the RF message procedure 500 exits.

Figure 11:
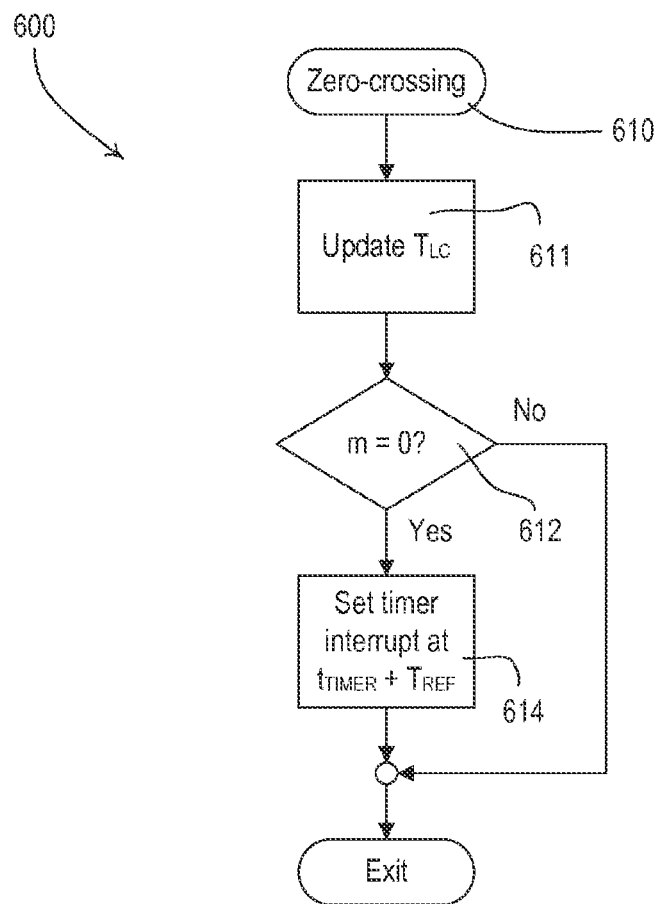
FIG. 11 is a simplified flowchart of a zero-crossing procedure executed by a ballast controller.

FIG. 11 is a simplified flowchart of a zero-crossing procedure 600 executed by the microprocessor 214 of each digital ballast controller 120 periodically, e.g., once every half-cycle at the zero-crossing of the present half-cycle as determined from the zero-crossing detector 216 at step 610. The microprocessor 214 uses a timer that is always increasing in value with respect to time to determine when to render the controllably conductive device 210 conductive to generate the reference edges and the data edges. First, the microprocessor 214 updates the line-cycle time period $T_{LC}$ (for example, by measuring the time period between every other zero-crossing) at step 611.

The microprocessor 214 uses a variable m to keep track of whether the next rising edge of the control-hot voltage $V_{CH}$ is a reference edge (e.g., if the variable m equals zero) or a data edge (e.g., if the variable m equals one). If the variable m is equal to zero at step 612 at the present zero-crossing (i.e., the digital ballast controller 120 should generate a reference edge during the present half-cycle), the microprocessor 214 sets a timer interrupt for an interrupt time equal to a present value $t_{TIMER}$ of the timer plus the reference edge time period $T_{REF}$ at step 614. When the value $t_{TIMER}$ of the timer reaches the set interrupt time for the timer interrupt, the microprocessor 214 will render the controllably conductive device 210 conductive during a timer interrupt procedure 700, which will be described in greater detail below with reference to FIG. 12. If the variable m is equal to one at step 612 (i.e., the digital ballast controller 120 should generate a data edge during the present half-cycle), the zero-crossing procedure 600 simply exits.

Figure 12:
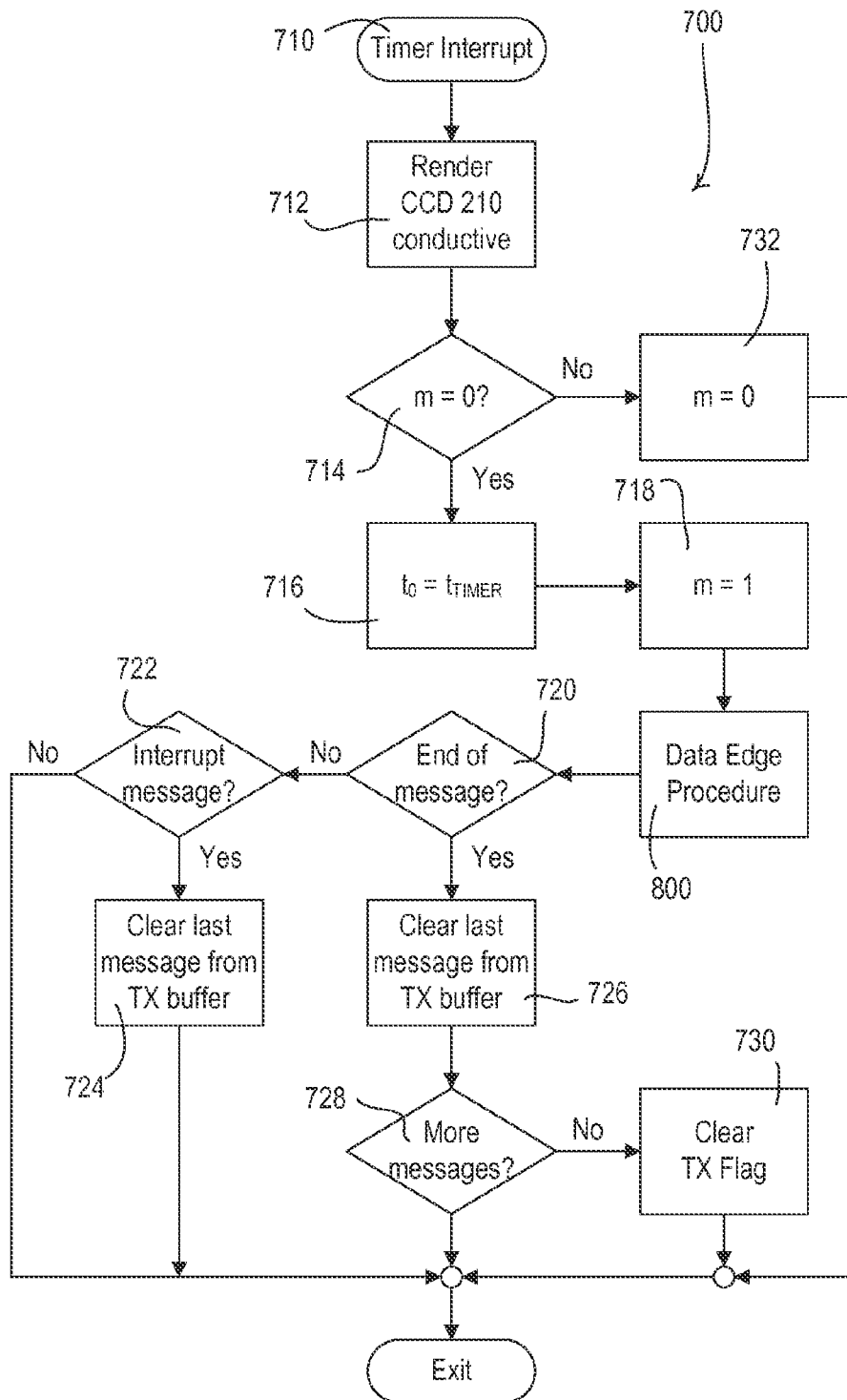
FIG. 12 is a simplified flowchart of a timer interrupt procedure executed by a digital ballast controller.

FIG. 12 is a simplified flowchart of the timer interrupt procedure 700 that is executed by the microprocessor 214 of each digital ballast controller 120 to generate the reference and data edges of the transmitted digital messages. The microprocessor 214 executes the timer interrupt procedure 700 when the value of the timer equals the set interrupt time at step 710, for example, as set during the zero-crossing procedure 600. The microprocessor 214 first renders the controllably conductive device 210 conductive at step 712. If the variable m is equal to zero at step 714 (i.e., a reference edge was generated at step 712), the microprocessor 214 sets a base time to equal to the present value of the timer (i.e., the time at which the reference edge was generated) at step 716. The microprocessor 214 then prepares to generate a data edge in the next half-cycle by setting the variable m to one at step 718 and executing a data edge procedure 800, which will be described in greater detail below with reference to FIG. 13. The microprocessor 214 uses the base time to of the reference edge during the data edge procedure 800 to accurately set up a timer interrupt for generating the data edge in the next half-cycle.

If the microprocessor 214 has not reached the end of the present forward digital message at step 720, the microprocessor determines if there is a higher priority message to transmit at step 722. If the microprocessor 214 does not have a higher priority message to transmit and should not interrupt the forward digital message that is presently being transmitted at step 722, the timer interrupt procedure 700 simply exits. However, if the microprocessor 214 should interrupt the digital message presently being transmitted at step 722, the microprocessor clears the last digital message out of the TX buffer at step 724, before the timer interrupt procedure 700 exits. If the microprocessor 214 has reached the end of the present forward digital message at step 720, the microprocessor clears the last message from the TX buffer at step 726. If there are more forward digital messages to transmit in the TX buffer at step 728, the timer interrupt procedure 700 simply exits. However, if there are not more forward digital messages to transmit at step 728, the microprocessor 214 clears the TX Flag at step 730, before the timer interrupt procedure 700 exits.

If the variable m is equal to one at step 714 (i.e., a data edge was generated at step 712), the microprocessor 214 sets the variable m to zero at step 732 and the timer interrupt procedure 700 exits, such that the microprocessor will generate a reference edge during the next half-cycle.

Figure 13:
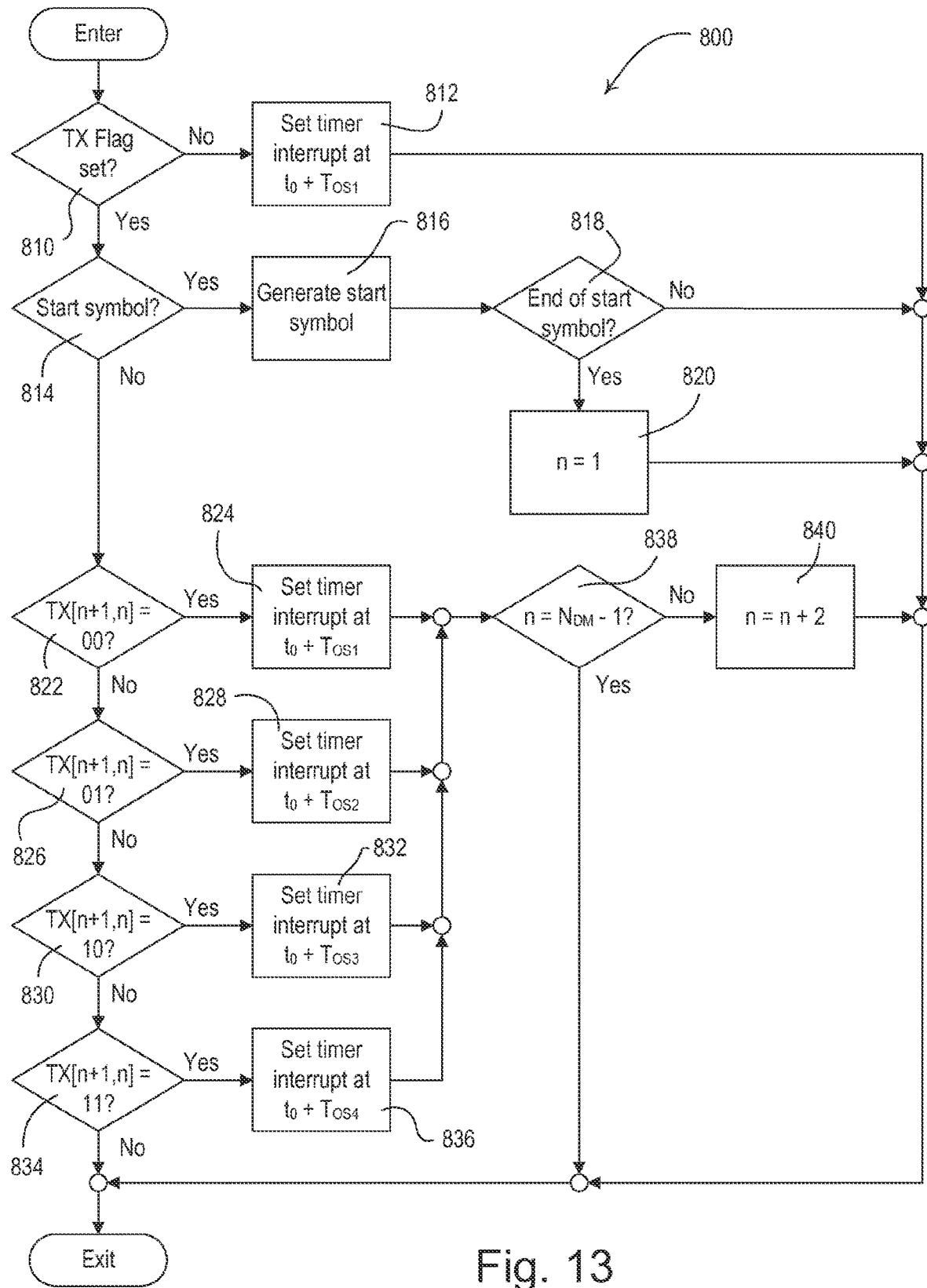
FIG. 13 is a simplified flowchart of a data edge procedure executed by a digital ballast controller.

FIG. 13 is a simplified flowchart of the data edge procedure 800, which is executed during the timer interrupt procedure 700 in order to set up a timer interrupt to generate the data edges of the control-hot voltage $V_{CH}$. If the microprocessor 214 is not presently transmitting a digital message to the digital dimming ballasts 110 at step 810, the microprocessor sets the interrupt time of the next timer interrupt equal to the base time to (as determined at step 716 of the timer interrupt procedure 700) plus the first offset time period $T_{OS1}$ at step 812, before the data edge procedure 800 exits. The microprocessor 214 continues to render the controllably conductive device 210 conductive as if the microprocessor was continuously transmitting bits "00" while the microprocessor is not transmitting digital messages to the digital dimming ballasts 110 (i.e., the load control system 100 is in an idle state).

If the microprocessor 214 is transmitting a digital message to the digital dimming ballasts 110 at step 810, the microprocessor 214 determines if a start pattern is presently being transmitted at step 814. If the microprocessor 214 is presently transmitting a start pattern at step 814, the microprocessor 214 generates the start pattern at step 816. For example, if the microprocessor 214 is presently transmitting the first two bits of the start pattern, the microprocessor 214 sets the interrupt time of the next timer interrupt equal to the base time to plus the first offset time period $T_{OS1}$ at step 816 and the data edge procedure 800 exits. If the microprocessor 214 is presently transmitting the last bit of the start pattern, the microprocessor 214 sets a timer interrupt for the interrupt time of the next timer interrupt equal to the base time to plus the start symbol time period $T_{START}$ at step 816 and sets a variable n to one at step 820, before the data edge procedure 800 exits. The microprocessor 214 uses the variable n to keep track of which bits of the present digital message in the TX buffer are presently being transmitted, where a value of one for the variable n represents the first bit and a value equal to the total number $N_{DM}$ of bits of the digital message represents the last bit of the digital message.

If the microprocessor 214 is transmitting a digital message to the digital dimming ballasts 110 at step 810, but is not transmitting a start symbol at step 814, the microprocessor transmits the data patterns of the digital message. If the next two bits TX[n+1,n] of the digital message in the TX buffer are equal to "00" at step 822, the microprocessor 214 sets the interrupt time of the next timer interrupt equal to the base time to plus the first offset time period $T_{OS1}$ at step 824. If the next two bits TX[n+1,n] of the digital message in the TX buffer are equal to "01" at step 826, equal to "10" at step 830, or equal to "11" at step 834, the microprocessor 214 sets the interrupt time of the next timer interrupt equal to the base time to plus the second offset time period $T_{OS2}$ at step 828, the base time to plus the third offset time period $T_{OS3}$ at step 832, or the base time to plus the fourth offset time period $T_{OS4}$ at step 836, respectively.

If the variable n is not equal to the total number $N_{DM}$ of bits of the digital message minus one at step 838, the microprocessor 214 increases the variable n by two at step 840 (since two bits are transmitted each line cycle). If the variable n is equal to the total number $N_{DM}$ of bits of the digital message minus one at step 838 (i.e., the present digital message is complete), the data edge procedure 800 simply exits.

Figure 14:
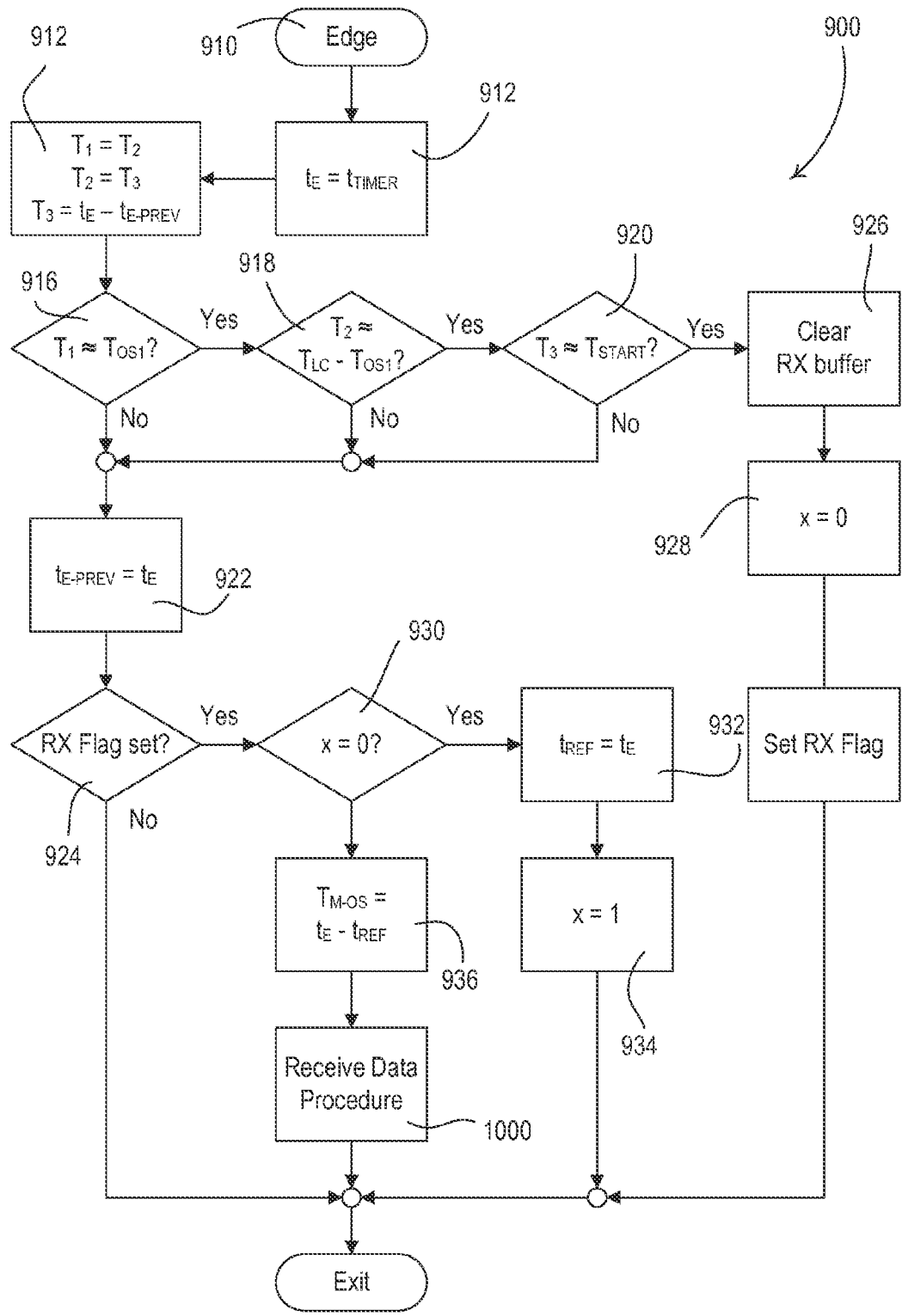
FIG. 14 is a simplified flowchart of a receiving procedure executed by a digital dimming ballast to receive a digital message transmitted by a digital ballast controller.
Figure 15:
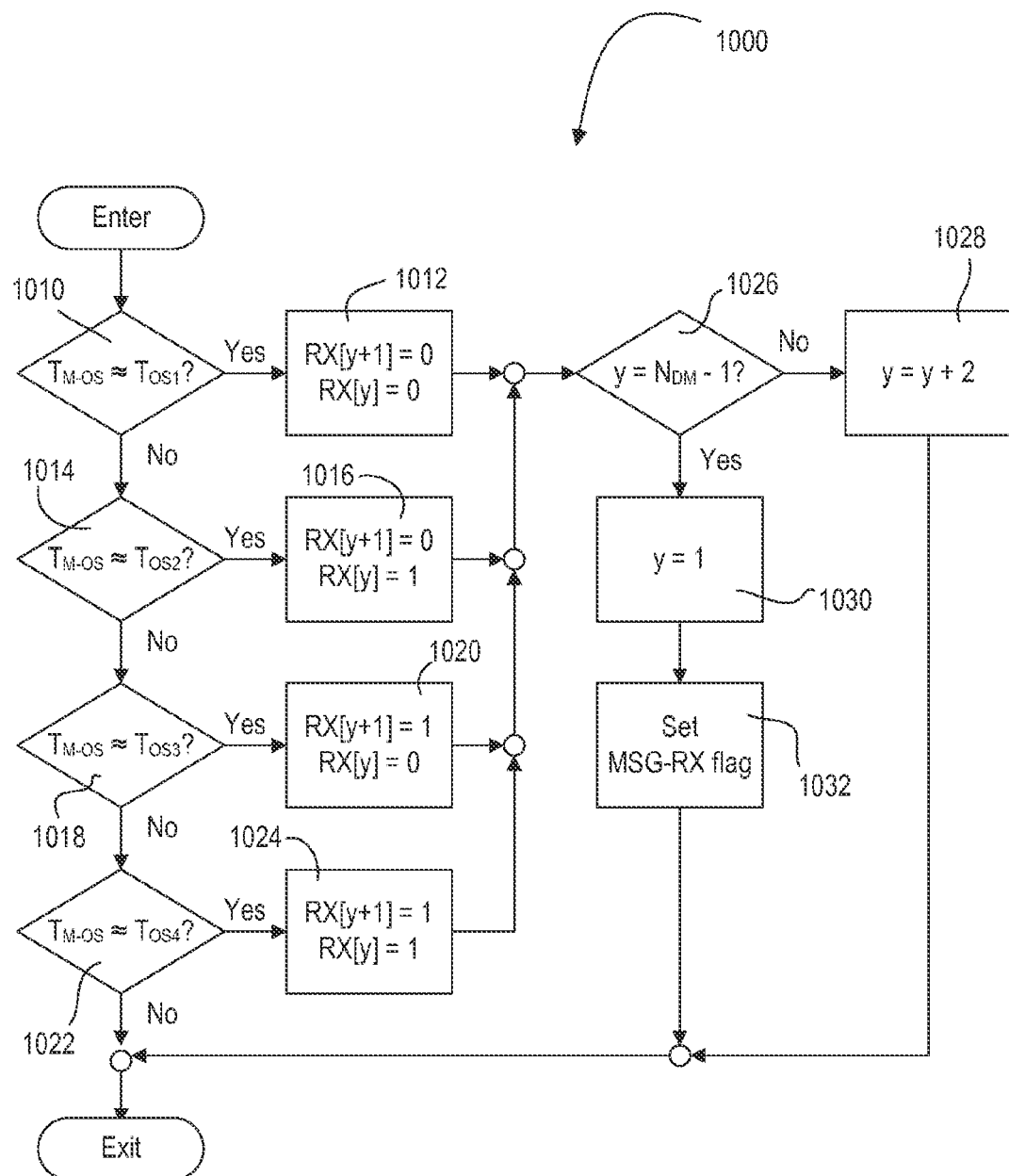
FIG. 15 is a simplified flowchart of a receive data procedure executed by a digital dimming ballast to determine the bits of data of a received digital message.

FIGS. 14 and 15 show example flowcharts executed by a control circuit of a digital dimming ballast (e.g., the microprocessor 360 of one of the digital dimming ballasts 110, 300) to receive digital messages transmitted by a digital ballast controller (e.g., the digital ballast controller 120, 200). Specifically, FIG. 14 is a simplified flowchart of a receiving procedure 900 executed by the microprocessor 360 of each digital dimming ballast 110 periodically (e.g., once every half-cycle) to receive the digital messages transmitted by the connected digital ballast controller 120. Specifically, the transmission procedure 900 is executed when a rising edge of the control-hot voltage $V_{HC}$ (i.e., a reference edge or a data edge) is detected at step 910 (i.e., in response to the edge-detect control signal $V_{ED}$ generated by the edge detect circuit 380). The microprocessor 360 uses a receive (RX) buffer to store the bits of the digital messages as they are being received, so that the digital message can be stored until the microprocessor processes the messages to thus control the fluorescent lamps 104.

As previously mentioned, the microprocessor 360 continually monitors the control-hot voltage $V_{CH}$ to determine if the digital ballast controller 120 has transmitted a start pattern including the unique start symbol by measuring the time period between the times of the rising edges in each consecutive half-cycle and storing these time periods in the memory 362. Specifically, the microprocessor 360 sets a rising edge time $t_E$ equal to the present value $t_{TIMER}$ of the timer at step 912, and then determines the last three time periods $T_1$, $T_2$, $T_3$ between the rising edges of the control-hot voltage $V_{CH}$ at step 914 by setting the first time period $T_1$ equal to the previous second time period $T_2$, setting the second time period $T_2$ equal to the previous third time period $T_3$, and setting the third time period $T_3$ equal to the rising edge time $t_E$ minus a previous rising edge time $t_{E-REV}$.

Next, the microprocessor 360 determines if the last three time periods $T_1$, $T_2$, $T_3$ between the rising edges of the control-hot voltage $V_{CH}$ are approximately equal to time periods $T_{OS1}$, $T_{LC}-T_{OS1}$, and $T_{START}$, respectively. At step 916, the microprocessor 360 determines if the first period $T_1$ is equal to the first offset time period $T_{OS1}$ within the default tolerance $\Delta T_{OS}$, i.e., $$\text{if } (T_{OS1}-\Delta T_{OS}) < T_1 \le (T_{OS1}+\Delta T_{OS}).$$

At step 918, the microprocessor 360 determines if the second period $T_2$ is equal to the line cycle period $T_{LC}$ minus the first offset time period $T_{OS1}$ within the widened tolerance $\Delta T_{OS-W}$, i.e., $$\text{if } ([T_{LC}-T_{OS1}]-\Delta T_{OS-W}) < T_2 \le ([T_{LC}-T_{OS1}]+\Delta T_{OS-W}).$$

At step 920, the microprocessor 360 determines if the third period $T_3$ is equal to the start symbol offset time period $T_{START}$ within the default tolerance $\Delta T_{OS}$, i.e., $$\text{if } (T_{START}-\Delta T_{OS}) < T_3 \le (T_{START}+\Delta T_{OS}).$$

If a start pattern was not received at step 916, 918, 920, the microprocessor 360 sets the previous rising edge time $t_{E-PREV}$ equal to the present rising edge time $t_E$ at step 922. If the microprocessor 360 is not presently receiving a digital message at step 924, the receiving procedure 900 simply exits. If the microprocessor 360 received a start pattern at step 918, 920, 922, the microprocessor gets ready to receive the data patterns of the digital message by clearing the RX buffer at step 926 and setting a variable x to zero at step 928, before the receiving procedure 900 exits. The microprocessor 360 uses the variable x to keep track of whether the next received edge will be a reference edge (i.e., if the variable x is equal to zero) or a data edge (i.e., if the variable x is equal to one). Accordingly, the microprocessor 360 will expect a reference edge during the next half-cycle after setting the variable x equal to zero at step 928.

If the microprocessor 360 is presently receiving a digital message at step 924 and the variable x equals zero at step 930, the microprocessor 360 determines that the rising edge that was just received at step 910 is a reference edge of a data pattern. Specifically, the microprocessor 360 sets a reference edge time $t_{REF-E}$ equal to the rising edge time $t_E$ (from step 912) at step 932 and sets the variable x equal to one at step 934, before the receiving procedure 900 exits. If the microprocessor 360 is presently receiving a digital message at step 912 and the variable x does not equal zero at step 930, the microprocessor 360 determines that the rising edge that was just received at step 910 is a data edge of a data pattern. The microprocessor 360 sets a measured offset time $T_{M-OS}$ equal to rising edge time $t_E$ minus the reference edge time $T_{REF-E}$ at step 936, i.e., $$T_{M-OS}=t_E-t_{REF-E}.$$

The microprocessor 360 then executes a receive data procedure 1000 to determine the bits of data that are encoded in the measured offset time $T_{M-OS}$ calculated at step 938, and the receiving procedure 900 exits.

FIG. 15 is a simplified flowchart of the receive data procedure 1000 executed by the microprocessor 360 to determine the bits of data that are encoded in the measured offset time period $T_{M-OS}$ from the receiving procedure 900. The microprocessor 360 uses a variable y to keep track of which bits of the digital message are presently being received, where a value of one for the variable y represents the first bit and a value equal to the total number $N_{DM}$ of bits of the digital message represents the last bit of the digital message. The microprocessor 360 first determines if the measured offset time period $T_{M-OS}$ is equal to one of the offset time periods $T_{OS1}$, $T_{OS2}$, $T_{OS3}$, $T_{OS4}$ within the default tolerance $\Delta T_{OS}$. Specifically, if the measured offset time period $T_{M-OS}$ is approximately equal to the first offset time $T_{OS1}$ at step 1010, i.e., $$\text{if } (T_{OS1}-\Delta T_{OS}) < T_{M-OS} \leq (T_{OS1}+\Delta T_{OS}),$$

the microprocessor 360 sets the next two bits of the digital message in the RX buffer RX[y+1,y] equal to "00" at step 1012. Similarly, if the measured offset time period $T_{M-OS}$ is approximately equal to the second offset time period $T_{OS2}$ at step 1014, the third offset time period $T_{OS3}$ at step 1018, or the fourth offset time period $T_{OS4}$ at step 1022, the microprocessor 360 sets the next two bits of the digital message in the RX buffer RX[y+1,y] equal to "01" at step 1016, to "10" at step 1020, or to "11" at step 1024, respectively.

If the variable y is not equal to the total number $N_{DM}$ of bits of the digital message minus one at step 1026, the microprocessor 360 increases the variable y by two at step 1028 and the receive data procedure 1000 exits. If the variable y is equal to the total number $N_{DM}$ of bits of the digital message minus one at step 1026 (i.e., the digital message presently being received is complete), the microprocessor 360 sets the variable y to one at step 1030 and sets a message-received (MSG-RX) flag at step 1032, such that the microprocessor will process the received digital message after the receive data procedure 1000 exits. In addition, the microprocessor 360 will begin to once again continually monitor the control-hot voltage $V_{CH}$ to determine if the digital ballast controller has transmitted a start symbol.

FIG. 16 is an alternative example timing diagram of a control-hot voltage $V_{CH}$ generated by a digital ballast controller (e.g., the digital ballast controller 120 of the load control system 100 shown in FIG. 1). As shown in FIG. 16, each data pattern has a half-cycle having a reference edge and a number $N_{DP}$ of subsequent half-cycles having data edges. For example, there may be two data edges per reference edge as shown in FIG. 16. The digital ballast controller 120 is operable to generate a reference edge during a first half-cycle and then to generate data edges in each of the next two half-cycles. Accordingly, the digital ballast controller 120 is operable to transmit four bits of data every three half-cycles (i.e., every 1.5 line cycles). The value of the data represented by the data edge in the second half-cycle is dependent upon the offset time $T_{OS}$ between the data edge and the reference edge in the first half-cycle. The value of the data represented by the data edge in the third half-cycle is dependent upon the offset time $T_{OS}$ between the data edge in the third half-cycle and the time in the second half-cycle that is the first offset time period $T_{OS1}$ from the reference edge in the first half-cycle. In other words, the value of the data represented by the data edge in the third half-cycle is dependent upon the offset time period $T_{OS}$ between the data edge in the third half-cycle and the reference edge in the first half-cycle minus the first offset time period $T_{OS1}$.

FIG. 17 is an alternative example timing diagram of a control-hot voltage $V_{CH}$ showing a start pattern used to start a digital message transmitted by a digital ballast controller (e.g., the digital ballast controller 120 of the load control system 100 shown in FIG. 1). The digital ballast controller 120 is operable to transmit the start pattern by generating a reference edge during a first half-cycle, rendering the controllably conductive device 210 conductive in a second subsequent half-cycle at the first offset period $T_{OS1}$ from the reference edge in the first half-cycle (i.e., transmitting bits "00"), and then rendering the controllably conductive device conductive after the start symbol time period $T_{START}$ after the firing time in the previous half-cycle. The start symbol time period $T_{START}$ is unique from and longer than the offset time periods $T_{OS1}$-$T_{OS4}$ used to transmit data to the digital dimming ballasts 110 (i.e., approximately 8.73 milliseconds). After transmitting the start pattern, the digital ballast controller 120 is operable to immediately begin transmitting data in the next line cycle by generating a reference edge in the next half-cycle and data edges in the subsequent half-cycles as shown in FIG. 17.

Figure 18:
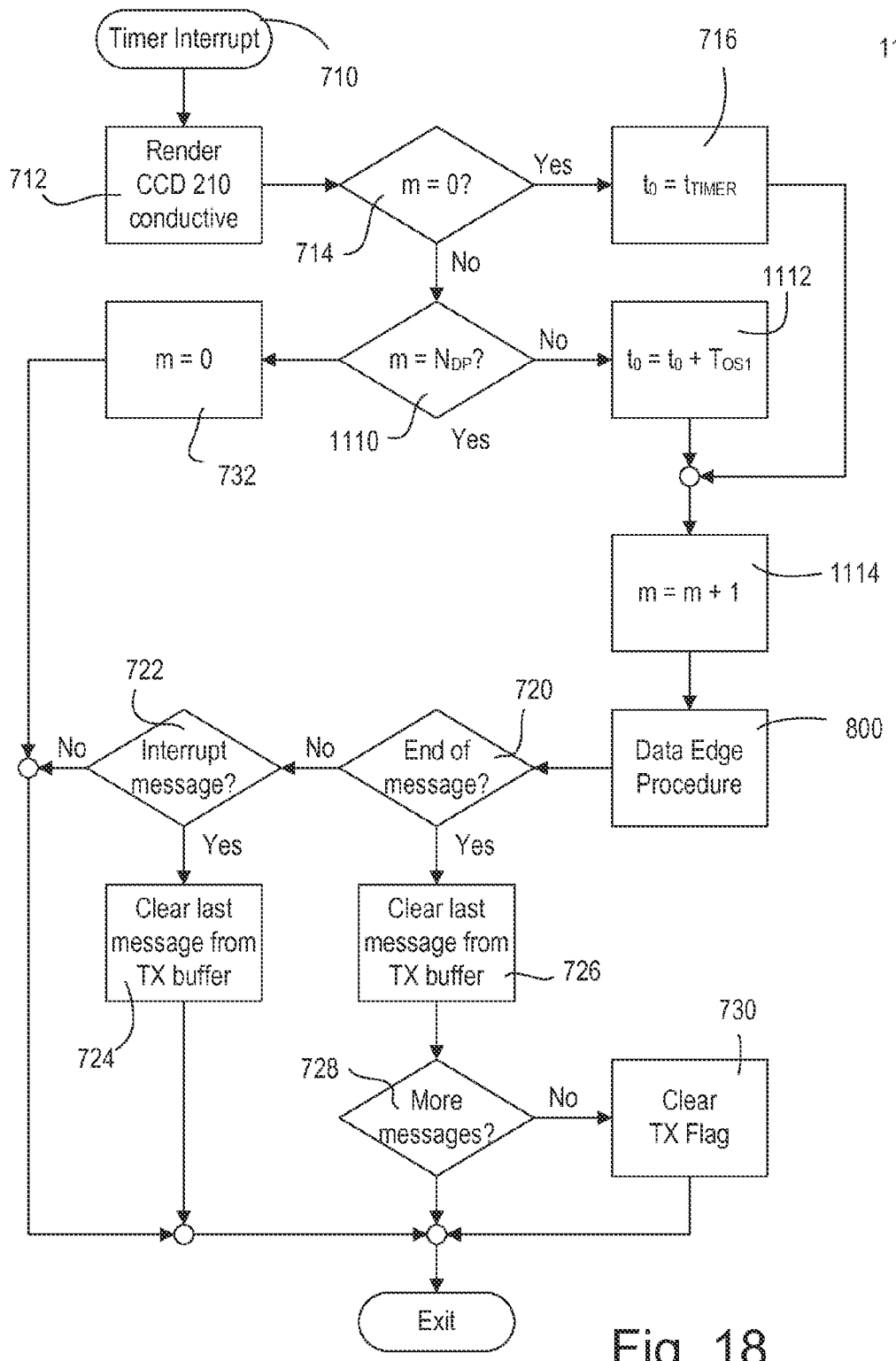
FIG. 18 is a simplified flowchart of a timer interrupt procedure executed by a digital ballast controller to generate reference and data edges of a transmitted digital message.

FIG. 18 is an example flowchart of a timer interrupt procedure 1100 that is executed by a control circuit of a digital ballast controller (e.g., the microprocessor 214 of the digital ballast controller 120, 200) to transmit a digital message having two data edges for each reference edge (e.g., as shown in FIG. 16). The timer interrupt procedure 1100 is executed by the microprocessor 214 when the value of the timer equals the set interrupt time, and is very similar to the timer interrupt procedure 700 shown in FIG. 12. However, when the variable m is not equal to zero at step 714 and is not equal to the number $N_{DP}$ of data edges in each data pattern (e.g., two) at step 1110, the microprocessor 214 sets the base time to equal to the base time to from the previous half-cycle plus the first offset time period $T_{OS1}$ at step 1112, before increasing the variable m by one at step 1114 and executing a data edge procedure (e.g., the data edge procedure 800 shown in FIG. 13). During the data edge procedure 800, the microprocessor 214 sets the interrupt time of the next timer interrupt equal to the base time to plus the first offset time period $T_{OS1}$ at step 816 if the microprocessor 214 is presently transmitting the first bit of the start pattern, and sets a timer interrupt for the interrupt time of the next timer interrupt equal to the base time to plus the start symbol time period $T_{START}$ at step 816 if the microprocessor 214 is presently transmitting the last bit of the start pattern. Referring back to FIG. 18, if the variable m is not equal to zero at step 714, but is equal to the number $N_{DP}$ of data edges in each data pattern at step 1110, the microprocessor 214 sets the variable m to zero at step 720 and the timer interrupt procedure 1100 exits.

Figure 19:
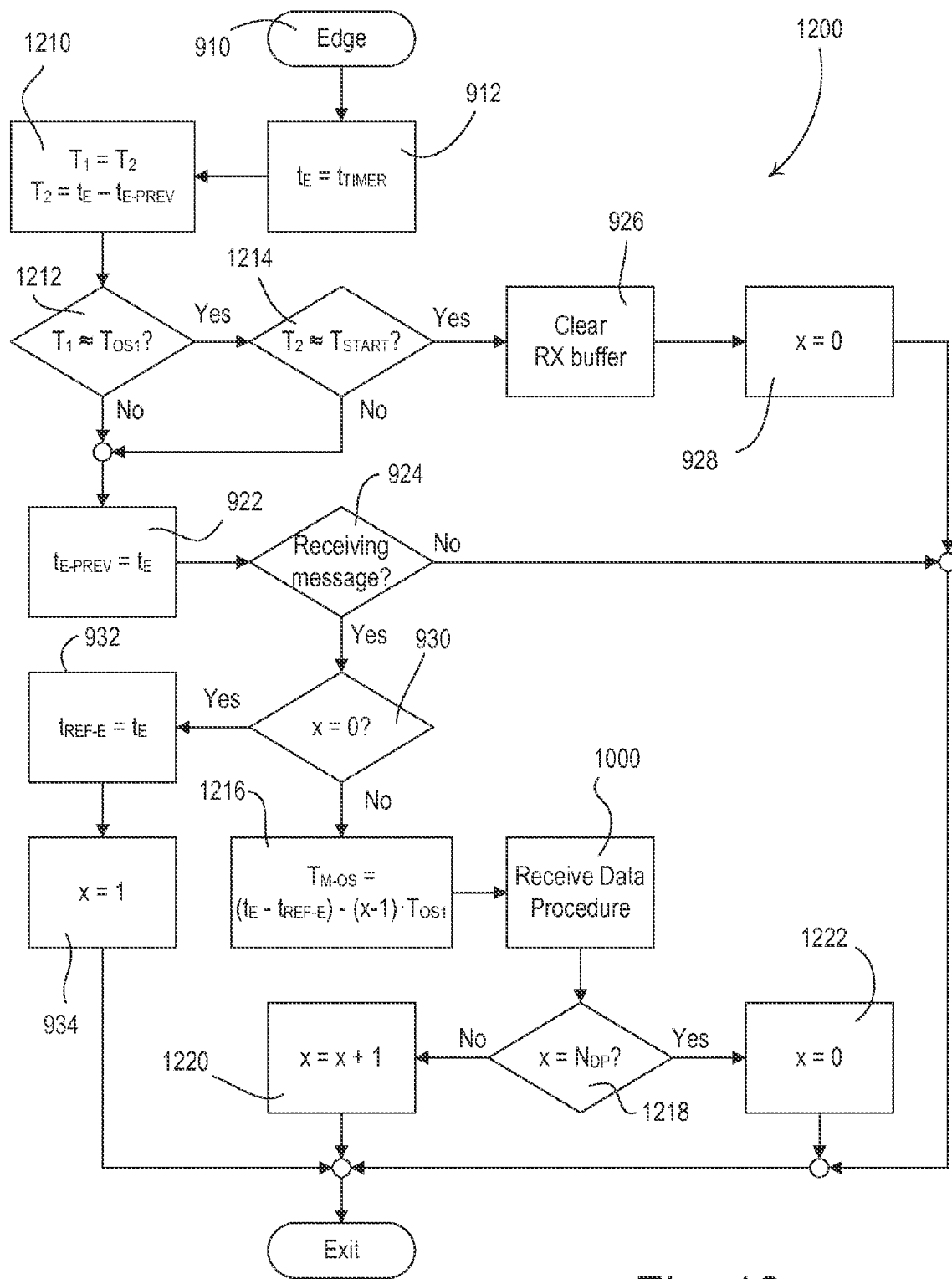
FIG. 19 is a simplified flowchart of a receiving procedure executed by a digital dimming ballast to receive a digital message from a digital ballast controller.

FIG. 19 is an example flowchart of a receiving procedure 1200 executed by a control circuit of a digital dimming ballast (e.g., the microprocessor 360 of one of the digital dimming ballasts 110 of the load control system 100 shown in FIG. 1) to receive a digital message having two data edges for each reference edge (e.g., as shown in FIG. 16). The microprocessor 360 executes the receiving procedure 1200 periodically (e.g., once every half-cycle) to receive the digital messages from a digital ballast controller (e.g., the digital ballast controller 120 shown in FIG. 1). The receiving procedure 1200 is very similar to the receiving procedure 900 shown in FIG. 14. However, in the receiving procedure 1200 shown in FIG. 19, the microprocessor 360 determines that a start pattern has been received by determining that the time periods $T_1$, $T_2$ between the rising edges in two consecutive half-cycles are equal to the first offset time period $T_{OS1}$ and the start symbol time period $T_{START}$. Specifically, the microprocessor 360 sets the first time period $T_1$ equal to the previous second time period $T_2$ and sets the second time period $T_2$ equal to the rising edge time $t_E$ minus a previous rising edge time $t_{E-PREV}$ at step 1210, and determines that a start pattern has been received if the first period $T_1$ is equal to the first offset time period $T_{OS1}$ within the default tolerance $\Delta T_{OS}$ at step 1212 and the second period $T_2$ is equal to the start symbol time period $T_{START}$ within the default tolerance $\Delta T_{OS}$ at step 1214.

In addition, the microprocessor 360 calculates the measured offset time $T_{M-OS}$ in dependence upon the variable x at step 1216, i.e., $$T_{M-OS}=(t_E-t_{REF-E})-(x-1)\cdot T_{OS1},$$

before executing the receive data procedure 1000 to determine the bits of data that are encoded in the measured offset time $T_{M-OS}$. If the variable x is not equal to the number $N_{DP}$ of data edges in each data pattern at step 1218, the microprocessor 360 increments the variable x by one at step 1220 and the receiving procedure 1200 exits. If the variable x is equal to the number $N_{DP}$ of data edges in each data pattern at step 1218, the microprocessor 360 sets the variable x to zero at step 1222 and the receiving procedure 1200 exits.

Alternatively, the digital ballast controller 120 could transmit and the digital ballasts 110 could receive more than two data edges per reference edge using the timer interrupt procedure 1100 of FIG. 18 and the receiving procedure 1200 of FIG. 19 if the number $N_{DP}$ of data edges in each data pattern is greater than two.

Figure 20:
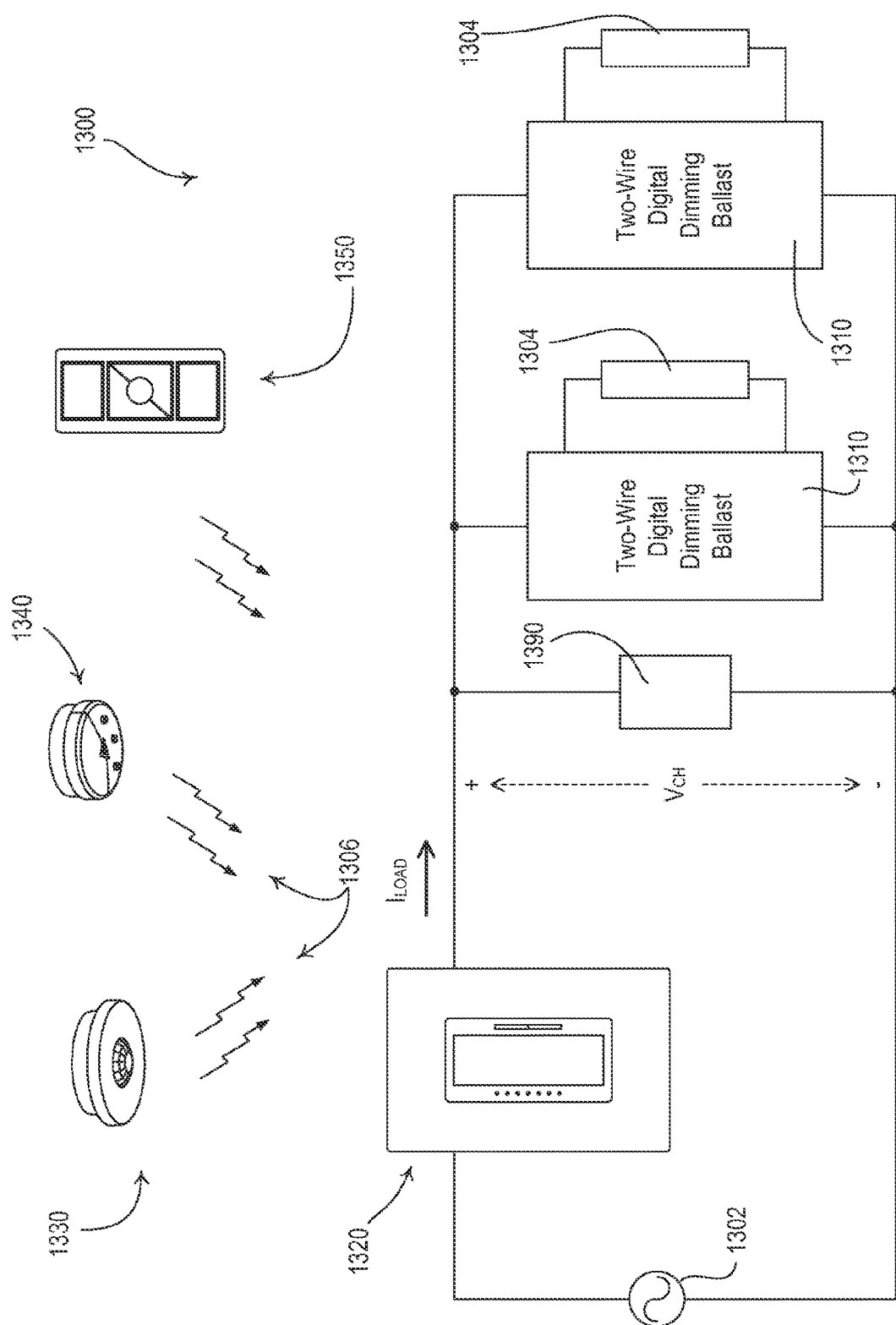
FIG. 20 is a simplified block diagram of a lighting control system comprising a two-wire digital ballast controller that does not require a neutral connection and an active load circuit.

As previously mentioned, in some retrofit applications, the neutral wire coupled to the neutral side of the AC power source 102 may not be available in the wallbox of the digital ballast controllers 120. FIG. 20 is a simplified block diagram of a load control system 1300 comprising a two-wire remote control device, e.g., a two-wire digital ballast controller 1320 that does not require a connection to the neutral side of an AC power source. The digital ballast controller 1320 is adapted to be coupled in series electrical connection between an AC power source 1302 and two-wire digital dimming ballasts 1310 (which may be the same as the digital dimming ballasts 110, 300 shown in FIGS. 1 and 3B) without a connection to the neutral side of the AC power source. The digital ballast controller 1320 is operable to transmit digital messages to the digital dimming ballast 1310 in response to RF signals 1306 transmitted by wireless control devices, e.g., a wireless occupancy sensor 1330, a wireless daylight sensor 1340, and a battery-powered remote control 1350 (which may be the same as the wireless occupancy sensor 130, the wireless daylight sensor 140, and the battery-powered remote control 150 of the load control system 100 shown in FIG. 1).

The load control system 1300 further comprises an active load circuit 1390 that is coupled in parallel with the two-wire digital dimming ballasts 1310 for providing a path for a charging current of a power supply 1420 (FIG. 21) of the digital ballast controller 1320 to be conducted as will be described in greater detail below. For example, the active load circuit 1390 may be housed in an enclosure and wired to the circuit wiring in one of the lighting fixtures with one of the ballasts 1310 of the load control system 1300. In addition, the active load circuit 1390 could be included as part of a retrofit kit (e.g., the retrofit kit 180 shown in FIG. 5). Alternatively, the active load circuit 1390 could be included in each of the ballasts 1310 of the load control system 1300, e.g., coupled between the control-hot terminal CH and the neutral terminal N.

Figure 21:
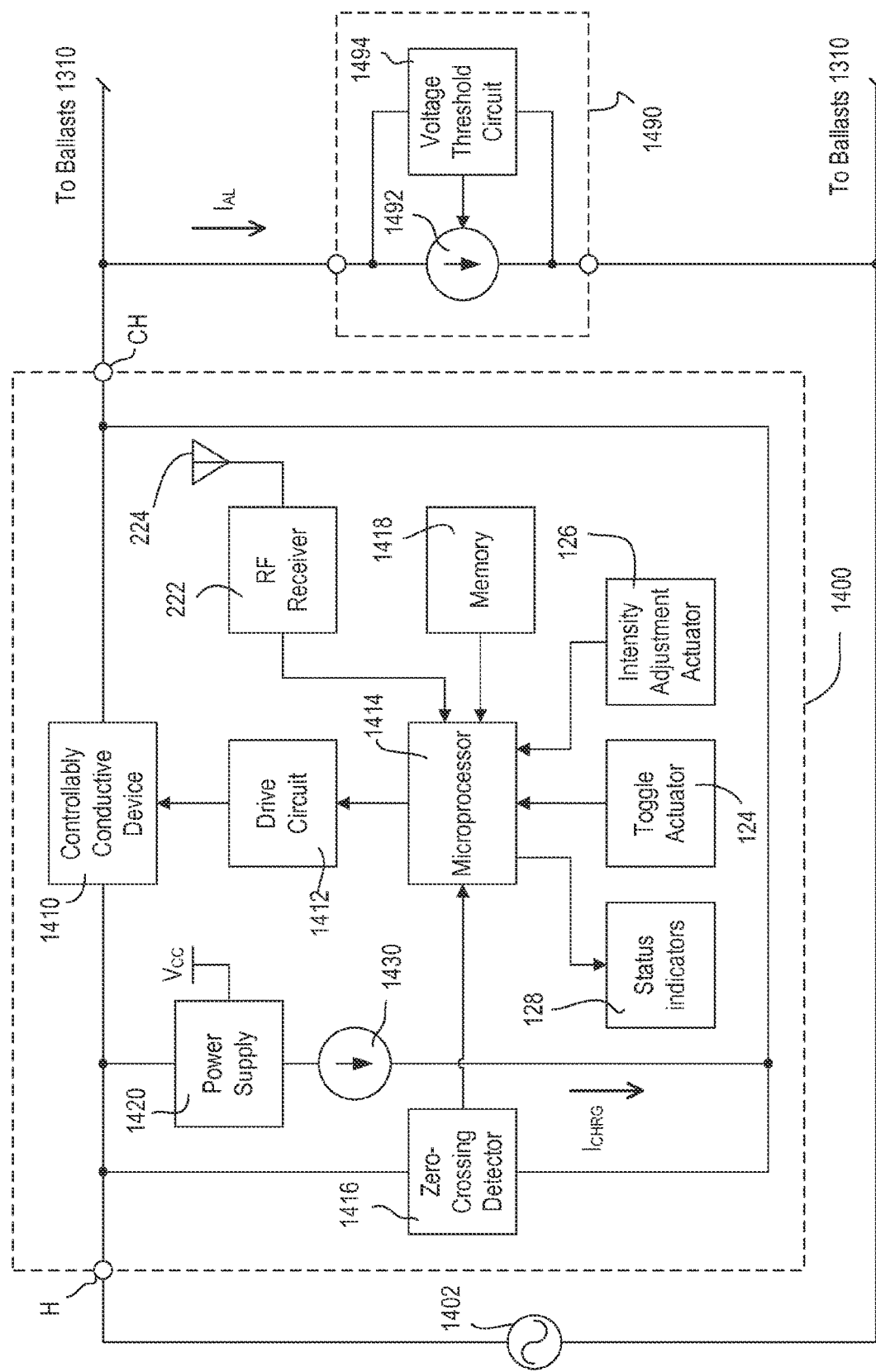
FIG. 21 is a simplified block diagram of a digital ballast controller and an active load circuit.

FIG. 21 is a simplified block diagram of a digital ballast controller 1400 and an active load circuit 1490 (e.g., the digital ballast controller 1320 and the active load circuit 1390, respectively, of the load control system 1300 of FIG. 20). The digital ballast controller 1400 is able to transmit digital messages to the digital dimming ballasts using any of the communication techniques discussed above with reference to FIGS. 1-19. The digital ballast controller 1400 further comprise a zero-crossing detector 1416 that is coupled in parallel with a controllably conductive device 1410 for determining the zero-crossings of the AC power source 1302. In addition, the power supply 1420 is also coupled in parallel with the controllably conductive device 1410 and is operable to conduct a charging current $I_{CHRG}$ to generate a DC supply voltage $V_{CC}$ for powering a microprocessor 1414, a memory 1418, and other low-voltage circuitry of the digital ballast controller 1400. The power supply 1420 is operable to charge when the controllably conductive device 1410 is non-conductive at the beginning of each half-cycle of an AC power source 1402.

When the controllably conductive device 1410 is non-conductive, the power supply 1420 is coupled in series with the ballasts 1310 across the AC power source 1402, such that the AC source voltage of the AC power source 1402 is split between the power supply and the ballasts, and the magnitude of the control-hot voltage $V_{CH}$ across the ballasts depends upon the relative impedance of the ballasts and the power supply. It is important to keep the magnitude of the control-hot voltage $V_{CH}$ across the ballasts 1310 well below the rising threshold $V_{TH-R}$ of an edge detect circuit (e.g., the edge detect circuit 380) of the ballasts during the time that the controllably conductive device 1410 is non-conductive. To meet this need, the impedance between the control-hot terminal CH of the digital ballast controller 1320 and the neutral side of the AC power source 1402 (i.e., across the ballasts 1310) must be lower than the impedance between the hot terminal H and the control-hot terminal CH of the digital ballast controller 1320 during the time that the controllably conductive device 1410 is non-conductive.

Accordingly, the two-wire digital ballast controller 1320 shown in FIG. 21 comprises a current limit circuit 1430 in series electrical connection with the power supply 1420 to limit the magnitude of the charging current $I_{CHRC}$ to be equal to or less than a first current limit $I_{LIMIT1}$. The value of the first current limit $I_{LIMIT1}$ depends on the current requirements of the power supply 1420 and is chosen so that the power supply can fully recharge during the time that the controllably conductive device 1410 is non-conductive each half-cycle.

The active load circuit 1490 conducts an active load current $I_{AL}$ having a magnitude that is approximately equal to the magnitude of the charging current $I_{CHRC}$ of the power supply 1420 of the digital ballast controller 1320 when the controllably conductive device 1410 is non-conductive each half-cycle. The active load circuit 1490 comprises a current limit circuit 1492 that operates to ensure that the magnitude of the active load current $I_{AL}$ is maintained equal to or less than a second current limit $I_{LIMIT2}$, which is selected to be greater than the first current limit $I_{LIMIT1}$ of the digital ballast controller 1320. For example, the magnitude of the second current limit $I_{LIMIT2}$ may be approximately 1.2 times greater than the magnitude of the first current limit $I_{LIMIT1}$. As long as the magnitude of the first current limit $I_{LIMIT1}$ is lower than the magnitude of the second current limit $I_{LIMIT2}$, the magnitude of the control-hot voltage $V_{CH}$ across the ballasts 1310 (i.e., across the active load circuit 1490) will be approximately zero volts during the time that the controllably conductive device 1410 is non-conductive each half-cycle.

When the controllably conductive device 1410 becomes conductive, the current available will be much greater than second current limit $I_{LIMIT2}$, so the magnitude of the control-hot voltage $V_{CH}$ across the ballasts 1310 will be able to increase up towards the magnitude of the AC source voltage of the AC power source 1402. To prevent unnecessary power dissipation, the active load circuit 1490 comprises a voltage threshold circuit 1494 that is coupled in parallel with the current limit circuit 1492 and operates to disable the current limit circuit when the magnitude of the control-hot voltage $V_{CH}$ across the active load circuit 1490 exceeds an active-load-disable threshold $V_{TH-ALD}$ (e.g., approximately 30 volts). The voltage threshold circuit 1494 has a time delay that requires the magnitude of the control-hot voltage $V_{CH}$ across the active load circuit 1490 to be below the active-load-disable threshold $V_{TH-ALD}$ for a period of time, e.g. approximately 400 microseconds, before re-enabling the current limit circuit 1492. This time delay significantly reduces the amount of current drawn by the active load circuit 1490 near the end of each line half-cycle as the magnitude of the control-hot voltage $V_{CH}$ approaches zero volts.

Figure 22:
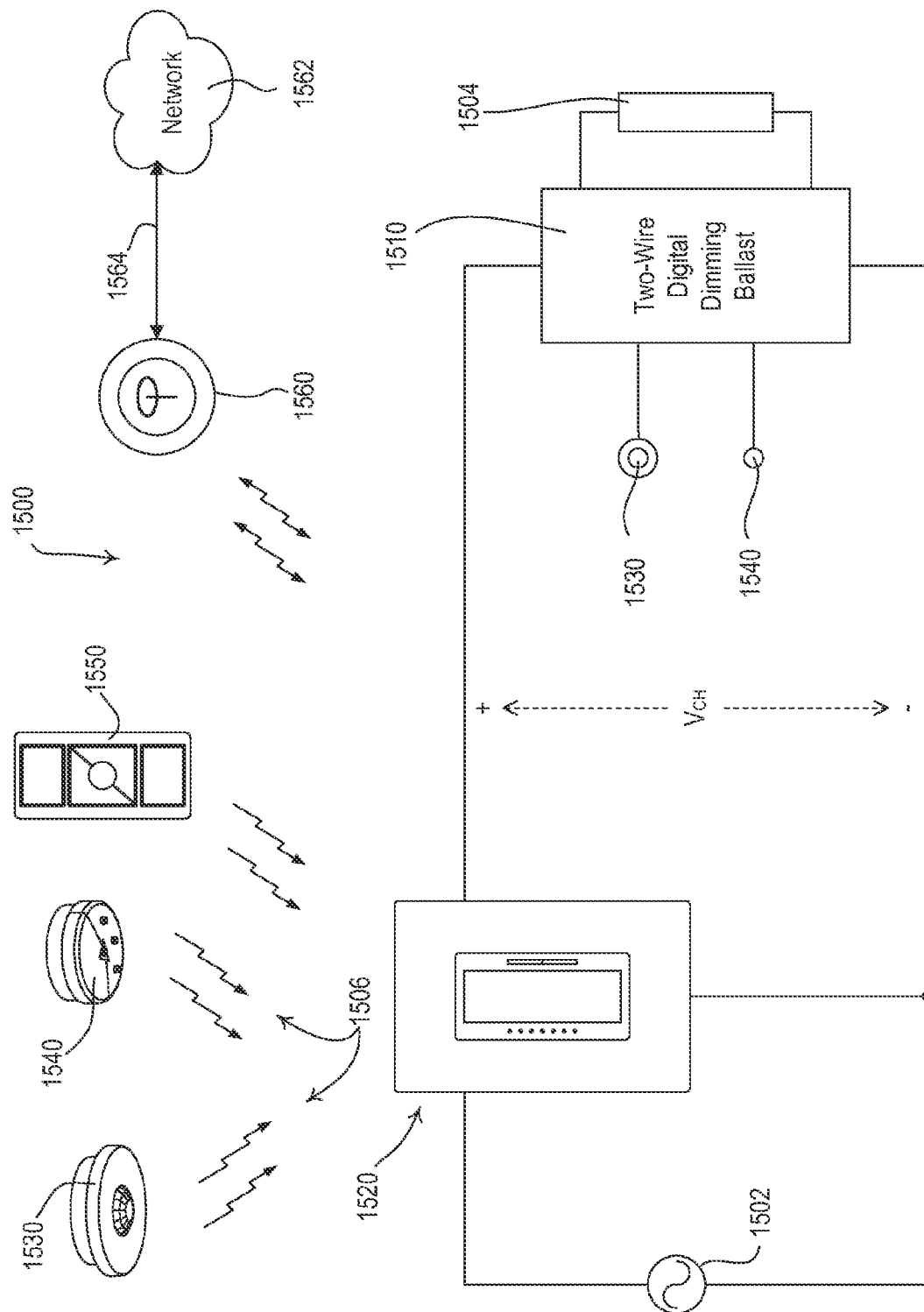
FIG. 22 is a simplified block diagram of a lighting control system comprising a digital dimming ballast that is directly connected to one or more input devices.

FIG. 22 is a simplified block diagram of a lighting control system 1500 comprising a digital dimming ballast 1510 that is directly connected to one or more input devices, such as an occupancy sensor 1530 and a daylight sensor 1540. The occupancy sensor 1530 and the daylight sensor 1540 may be mounted to the lighting fixture in which the digital dimming ballast 1510 is installed, and may be included as part of a retrofit kit including the digital dimming ballast 1510. The digital dimming ballast 1510 is adapted to operate as a "mini-system" to control the intensity of a connected lamp 1504 in response to the occupancy sensor 1530 and the daylight sensor 1540. Dimming ballasts adapted to be directly connected to one or more input devices, such as sensors, are described in greater detail in previously-referenced U.S. Pat. No. 7,619,539.

The digital dimming ballast 1510 is also operable to control the intensity of the connected lamp 1504 in response to "broadcast" commands transmitted by the digital ballast controller 1520 via the control-hot voltage $V_{CH}$. The digital ballast controller 1520 is operable to transmit the broadcast commands to the digital dimming ballast 1510 in response to RF signals 106 transmitted by a broadcast controller 1560 (i.e., a central controller) of the load control system 1500. The broadcast controller 1560 is connected to a network 1562 (e.g., a local area network or the Internet) via a network communication link 1564 (e.g., an Ethernet link) for receiving the broadcast commands to transmit to the digital dimming ballast 1510. The broadcast commands may comprise, for example, at least one of a timeclock command, a load shed command, or a demand response command. The digital ballast controller 1520 is operable to transmit information, such as the status and energy consumption of the controlled loads, back to the broadcast controller 1560, which may share the information with other control devices coupled on the network 1562. The broadcast controller 1560 is described in greater detail in commonly-assigned U.S. patent application Ser. No. 13/725,105 filed Dec. 21, 2012, entitled LOAD CONTROL SYSTEM HAVING INDEPENDENTLY-CONTROLLED UNITS RESPONSIVE TO A BROADCAST CONTROLLER, the entire disclosure of which is hereby incorporated by reference.

The digital ballast controller 1520 is also operable to transmit digital messages to the digital dimming ballast 1510 in response to RF signals 1506 transmitted by wireless control devices, e.g., a wireless occupancy sensor 1530, a wireless daylight sensor 1540, and a battery-powered remote control 1550 (which may be the same as the wireless occupancy sensor 130, the wireless daylight sensor 140, and the battery-powered remote control 150 of the load control system 100 shown in FIG. 1). In addition, the digital ballast controller 1520 may be directly connected to one or more input devices, such as the occupancy sensor 1530 and the daylight sensor 1540.

Figure 23:
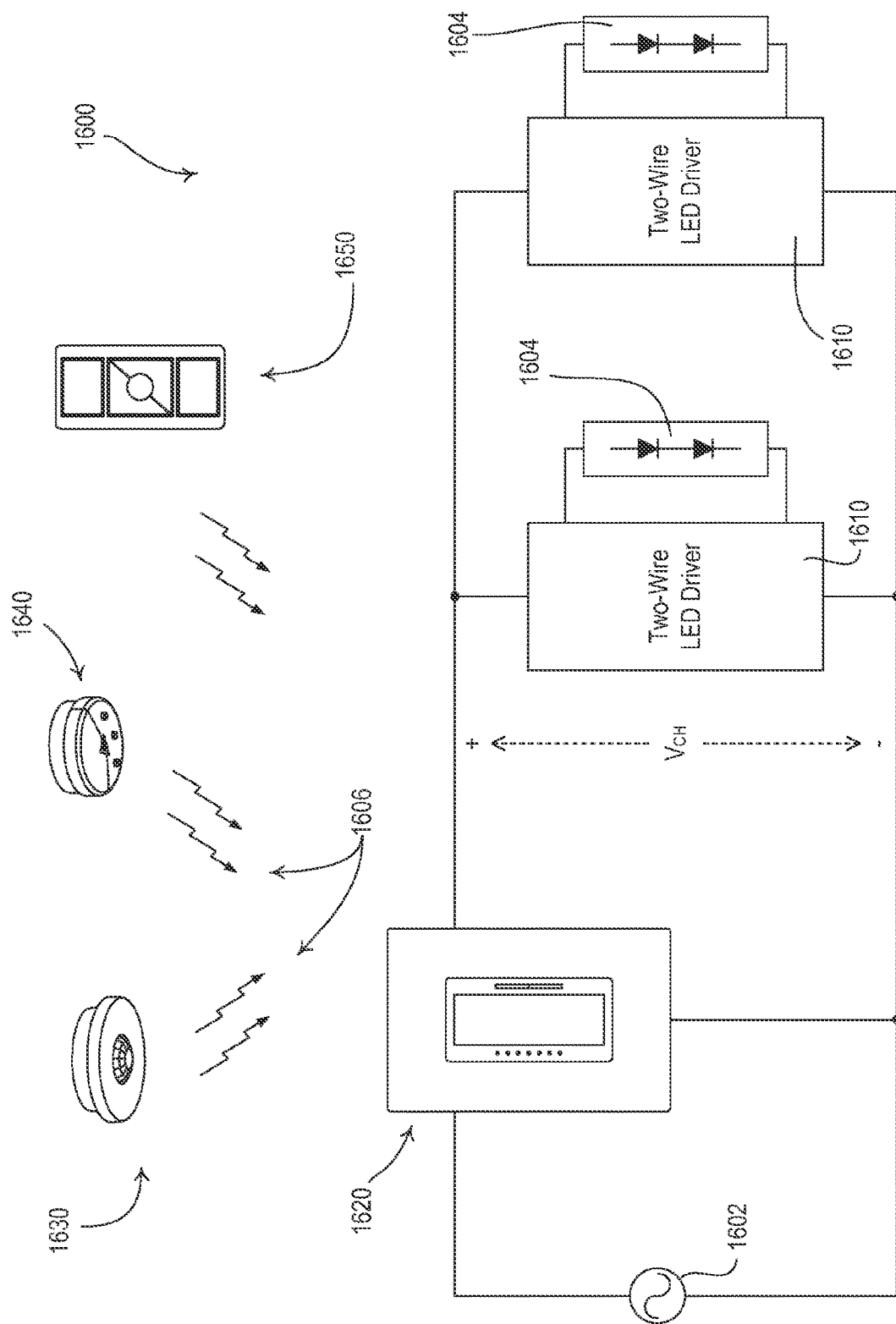
FIG. 23 is a simple wiring diagram of a lighting control system having a plurality of two-wire LED drivers and a digital LED controller.

FIG. 23 is a simple wiring diagram of a load control system 1600 having a digital LED controller 1620 and a plurality of two-wire LED drivers 1610 for controlling the intensity of respective LED light sources 1604 (i.e., LED light engines). The digital LED controller 1620 may be identical to the digital ballast controller 120, 200 shown in FIGS. 1 and 3A, and may be able to transmit digital messages to the LED drivers 1610 using the communication techniques described above. For example, the digital LED controller 1620 may transmit digital messages including commands to turn the LED light sources 1604 on and off, to control the intensity of each of the LED light sources, and to adjust the color temperature (i.e., the color) of each of the LED light sources. In addition, the digital LED controller 1620 may have a connection to the neutral side of an AC power source 1602 as shown in FIG. 22 or may alternatively be a two-wire device (e.g., the digital ballast controller 1320 shown in FIG. 21). The digital LED controller 1620 is also operable to transmit digital messages to the LED drivers 1610 in response to RF signals 1606 transmitted by wireless control devices, e.g., a wireless occupancy sensor 1630, a wireless daylight sensor 1640, and a battery-powered remote control 1650 (which may be the same as the wireless occupancy sensor 130, the wireless daylight sensor 140, and the battery-powered remote control 150 of the load control system 100 shown in FIG. 1). Examples of LED drivers are described in greater detail in co-pending, commonly-assigned U.S. patent application Ser. No. 12/813,908, filed Jun. 11, 2010, entitled LOAD CONTROL DEVICE FOR A LIGHT-EMITTING DIODE LIGHT SOURCE, the entire disclosure of which is hereby incorporated by reference. Alternatively, both digital dimming ballasts 110, 300 and LED drivers 1610 could be coupled to a single digital ballast controller 120, 200, 1620, such that the digital ballast controller is able to control multiple load types in a single load control system.

The digital ballast controllers 120, 200, 1320, 1400 and LED controllers 1620 as described herein generate the control-hot voltage $V_{CH}$ such that the control-hot voltage resembles a forward phase-control voltage, i.e., the controllably conductive device of the digital ballast controller is rendered conductive at a firing time each half-cycle and the data is encoded in time periods between the timing edges (i.e., rising edges) of the control-hot voltage. Alternatively, the digital ballast controllers 120, 200, 1320, 1400 and LED controllers 1620 could render the controllably conductive device non-conductive at some time each half-cycle, such that the control-hot voltage $V_{CH}$ resembles a reverse phase-control voltage and the data is encoded in time periods between the timing edges (i.e., falling edges) of the control-hot voltage. In addition, the control-hot voltage $V_{CH}$ could comprise a center phase-control voltage having both a rising edge towards the beginning of a half-cycle and a falling edge towards the end of the half-cycle. When the control-hot voltage $V_{CH}$ is a reverse phase-control voltage or a center phase-control voltage, the controllably conductive device may be implemented as, for example, two FETs in anti-series connection.

Figure 24:
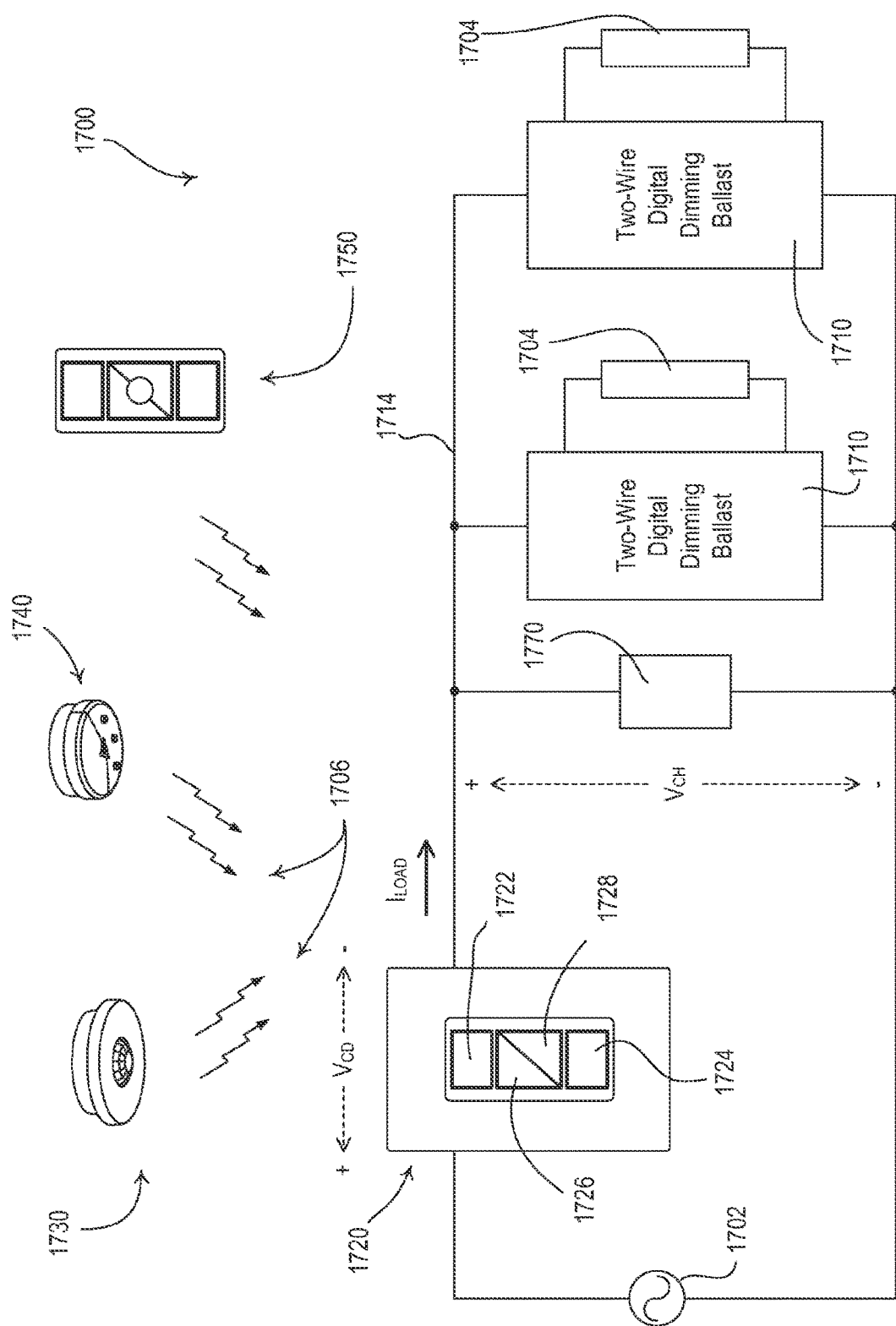
FIG. 24 is a simple wiring diagram of a two-way load control system having a plurality of two-wire power devices (e.g., digital dimming ballasts and input devices) and a digital power device controller.

FIG. 24 is a simple wiring diagram of a two-way load control system 1700 having a plurality of two-wire power devices that may comprise, for example, two-wire load control devices, such as two-wire digital dimming ballasts 1710 for controlling respective fluorescent lamps 1704, and two-wire input devices, such as a two-wire line-voltage occupancy sensor 1770. In addition, the power devices of the load control system 1700 may comprise additional types of two-wire load control devices, such as, for example, light-emitting diode (LED) drivers for driving LED light sources; screw-in luminaires having integral light sources and load control circuits; dimming circuits for controlling the intensity of lighting loads; interface devices (e.g., a device that is operable to receive a control-hot voltage signal $V_{CH}$ and accordingly control a power device for example, by providing a 0-10V signal), electronic switches, controllable circuit breakers, or other switching devices for turning electrical loads or appliances on and off; plug-in load control devices, controllable electrical receptacles, or controllable power strips for controlling plug-in electrical loads (such as coffee pots and space heaters); motor control units for controlling motor loads, such as ceiling fans or exhaust fans; drive units for controlling motorized window treatments or projection screens; motorized interior or exterior shutters; thermostats for heating and/or cooling systems; temperature control devices for controlling heating, ventilation, and air conditioning systems; air conditioners; compressors; electric baseboard heater controllers; controllable dampers; humidity control units; dehumidifiers; water heaters; pool pumps; refrigerators; freezers; televisions or computer monitors; power supplies; audio systems and amplifiers; generators; electric chargers, such as electric vehicle chargers; and alternative energy controllers (e.g., solar, wind, or thermal energy controllers). Further, the power devices of the load control system 1700 may comprise additional types of two-wire input devices, such as, for example, a vacancy sensor, a daylight sensor, a temperature sensor, a humidity sensor, a pressure sensor, a security sensor, a proximity sensor, a smoke detector, a carbon monoxide detector, a wall-mounted keypad, a remote control keypad, a key fob, a cell phone, a smart phone, a tablet, a personal digital assistant (PDA), a personal computer, a timeclock, an audio-visual control, a safety device (such as a fire protection, water protection, medical emergency device), a power monitoring device (such as a power meter, an energy meter, a utility submeter, and a utility rate meter), one or more partition switches, a central control transmitter, or any residential, commercial, or industrial controller.

A digital power device controller 1720 (i.e., a remote control device) is adapted to be coupled in series electrical connection between an AC power source 1702 and the parallel combination of the power devices (i.e., the digital dimming ballasts 1710 and the line-voltage occupancy sensor 1770) via a circuit wiring 1714. The digital power device controller 1720 may be a wallbox device that is able to replace a standard mechanical switch. As shown in FIG. 24, the power device controller 1720 does not require a connection to the neutral side of the AC power source 1702. The digital power device controller 1720 is able to communicate with the digital dimming ballasts 1710 to cause the fluorescent lamps 1704 to turn on in response to an actuation of an on button 1722 and to cause the fluorescent lamps to turn off in response to an actuation of an off button 1724. The digital power device controller 1720 is also able to cause the digital dimming ballasts 1710 to raise the intensity of the fluorescent lamps 1704 (e.g., by an increment) in response to an actuation of a raise button 1726 and to cause the digital dimming ballasts to lower the intensity of the fluorescent lamps in response to an actuation of a lower button 1728. Alternatively, the digital ballast controller 1720 may comprise different user interfaces and form factors as shown in FIG. 2B.

The digital power device controller 1720 may be configured to cause the digital dimming ballasts 1710 to control the intensities of the fluorescent lamps 1704 to a predetermined intensity level (e.g., a preset, an emergency level, etc). The digital power device controller 1720 may be configured to cause the digital dimming ballasts 1710 to "fade" the intensities of the fluorescent lamps 1704 (e.g., slowly adjust the intensities over a predetermined period of time or at a predetermined fade rate). For example, the digital dimming ballasts 1710 may be configured to fade the intensities of the fluorescent lamps 1704 over a predetermined number of half-cycles, and may keep track of the fade time in terms of a number of half-cycles.

The power devices of FIG. 24 are operable to both transmit and receive digital messages with the digital power device controller 1720 via phase-control voltages on the circuit wiring 1714 (e.g., providing two-way communication) as will be described in greater detail below. The digital power device controller 1720 is also responsive to digital messages received via RF signals 1706 from wireless input devices, e.g., an occupancy sensor 1730, a daylight sensor 1740, and a battery-powered remote control 1750, which may operate in a similar manner as the occupancy sensor 130, the daylight sensor 140, and the battery-powered remote control 150 shown in FIG. 1. The digital power device controller 1720 may also be directly connected to one or more input devices (such as the occupancy sensor 1530 and the daylight sensor 1540 shown in FIG. 22). In addition, the digital power controller 1720 may be operable to transmit RF signals 1706 to other digital power device controllers. The load control system 1700 is able to provide all of the advantages of a load control system having a two-way digital communication link without requiring any additional wiring. This means that the load control system 1700 appears the same as the prior art digital load control systems during programming and normal operation, but is vastly easier to install.

The digital power device controller 1720 generates a control-hot voltage $V_{CH}$ (i.e., a phase-control voltage), which is coupled across and is received by the power devices. A controller-drop voltage $V_{CD}$ is generated across the digital power device controller 1720 and is the difference between the AC mains line voltage and the control-hot voltage $V_{CH}$. The digital power device controller 1720 is operable to transmit a "forward" digital message to the power devices by encoding digital information in the firing times of the timing edges of the control-hot voltage $V_{CH}$ as described above with reference to FIGS. 1-23. To allow for two-way communication, the power devices are operable to transmit a "reverse" digital message to the digital power device controller 1720 by encoding digital information in the controller-drop voltage $V_{CD}$ developed across the digital power device controller as will be described in greater detail below. Particularly, the power devices are operable to transmit a reverse digital message to the digital power device controller 1720 in response to receiving a forward digital message from the digital power device controller. In addition, the power devices are operable to transmit acknowledgements to the digital power device controller 1720 after receiving a forward digital message, such that the digital power device controller is operable to determine if all of the power devices have successfully received the digital message. As used herein, "forward" communication refers to digital messages transmitted from the digital power device controller 1720 and "reverse" communication refers to digital messages transmitted from the power devices (e.g., the two-wire digital dimming ballasts 1710 and the two-wire line-voltage occupancy sensor 1770). Forward communication is very similar to the communication technique as described above in regards to FIGS. 1-23.

Each power device may have a serial number (e.g., a 24-bit unique number) stored in memory, for example, during the manufacturing process of the power device. During a commissioning procedure of the two-way load control system 1700, the digital power device controller 1720 may be put into an addressing mode (e.g., in response to the actuation of one or more of the on button 1722, the off button 1724, the raise button 1726, and the lower button 1728). In the addressing mode, the digital power device controller 1720 is operable to assign a unique identifier (e.g., a link or short address) to each of the power devices coupled to the digital power device controller. The link address may be smaller than the serial number (e.g., 6 bits), such that there may be up to 64 power devices coupled to the digital power device controller 1720. The digital power device controller 1720 may use the link addresses to transmit forward digital messages directly to specific power devices. In addition, the digital power device controller 1720 may be operable to transmit broadcast messages to all of the power devices (e.g., the digital dimming ballasts 1710 and the line-voltage occupancy sensor 1770) or to a subset (e.g., a group) of the power devices.

Since the power devices are each assigned a link address during the addressing mode, the power devices do not require DIP switches, rotary encoders, jumpers, or other hardware means for setting the address (or control channel). Therefore, because the digital dimming ballasts 1710 of FIG. 24 does not have DIP switches (or other structures) that need to be physically adjusted during installation of the ballast, the ballast may be installed just like a prior art non-dim ballast (particularly when the ballast is included in a retrofit kit having dimmable lamp sockets). Accordingly, the load control system 1700 can be configured during the commissioning procedure without accessing (i.e., making physical contact with) the power devices (or the electrical loads controlled by the load control devices), which may be remotely located and not easily accessible. In addition, the load control system 1700 can be re-configured after commissioning to provide for different functionality of the system without accessing the power devices or the electrical loads.

Because the power devices are each assigned a link address, the digital power device controller 1720 is operable to assign the power devices to one or more zones (i.e., groups) and then transmit forward digital messages to control only the power devices of one of the zones. For example, the digital power device controller 1720 could assign all of the digital dimming ballasts 1710 to the same zone, such that all of the digital dimming ballasts 1710 will be responsive to the occupancy sensors 1730, 1770 and the remote control 1750. Alternatively, some of the digital dimming ballast 1710 could be assigned to a first zone, which is responsive to the daylight sensor 1740, while the other digital dimming ballasts could be assigned to a second zone, which is not responsive to the daylight sensor. Methods of assigning digital dimming ballasts to groups are described in greater detail in commonly-assigned U.S. Patent Application Publication No. 2004/0217718, published Nov. 4, 2004, entitled DIGITAL ADDRESSABLE ELECTRONIC BALLAST AND CONTROL UNIT, and U.S. Pat. No. 7,391,297, issued Jun. 24, 2008, entitled HANDHELD PROGRAMMER FOR LIGHTING CONTROL SYSTEM, the entire disclosures of which are hereby incorporated by reference. Prior to being assigned a link address, each power device could be operable to work out-of-box as a single group. Specifically, the power devices could be operable to respond to a predetermined default group, for example, to be responsive to the occupancy sensors 1730, 1770 and the remote control 1750, but not to the daylight sensor 1740.

During the commissioning procedure, the digital power device controller 1720 may be put into a grouping mode (e.g., in response to the actuation of one or more of the on button 1722, the off button 1724, the raise button 1726, and the lower button 1728). The user may then actuate an actuator on one of the input devices (e.g., one of the occupancy sensors 1730, 1770, the daylight sensor 1740, and the remote control 1750) to create a zone that is responsive to that input device. The digital power device controller 1720 may then cause one of the digital dimming ballasts 1710 to flash the respective lamp 1704. The user may actuate actuators on the input device to assign the digital dimming ballast 1710 of the flashing lamp to the zone or to cause another digital dimming ballast to flash the respective lamp. The user may step through each digital dimming ballast 1710 and assign the appropriate ballasts to the zone until all desired lamps 1704 are assigned to the zone.

Because the power devices are able to transmit the reverse digital messages in response to receiving forward digital messages, the digital power device controller 1720 can receive feedback information from the power devices. For example, each digital dimming ballasts 1710 could transmit information regarding lamp status information (such as indications of missing or failed lamps) to the digital power device controller 1720 in response to a forward digital message having a query for lamp status information. Methods of determining if a fluorescent lamp is missing or failed are described in greater detail in commonly-assigned U.S. Patent Application Publication No. 2006/0244395, published Nov. 2, 2006, entitled ELECTRONIC BALLAST HAVING MISSING LAMP DETECTION, and U.S. Patent Application Publication No. 2012/0043900, published Feb. 23, 2012, entitled METHOD AND APPARATUS FOR MEASURING OPERATING CHARACTERISTICS IN A LOAD CONTROL DEVICE, the entire disclosures of which are hereby incorporated by reference.

In addition, the line-voltage occupancy sensor 1770 may be operable to transmit information regarding occupancy and vacancy conditions detected by the occupancy sensor in response to a forward digital message having a query for such information. The digital power device controller 1720 may be operable to transmit the feedback information received from the digital dimming ballasts 1710 and the line-voltage occupancy sensor 1770 to an external device, such as the broadcast controller 1560 shown in FIG. 22, which may share the information with other control devices coupled on the network 1562.

As previously mentioned, the power devices may be two-wire load control devices and two-wire input devices. The two-wire load control devices are operable to control respective electrical loads in response to the forward digital messages received from the digital power device controllers 1720. For example, the digital dimming ballasts 1710 are operable to adjust the intensities of the lamps 1704 in response to the forward digital messages received from the digital power device controller 1720. The digital power device controller 1720 is operable to transmit forward digital messages to all of the power devices (e.g., a broadcast message), to a subset (e.g., a group) of the power devices (e.g., the two-wire load control devices), or to individual power devices.

Each two-wire input device is operable to transmit a reverse digital message to the digital power device controller 1720 and the other power devices in response to received inputs. The two-wire input devices may be operable to transmit each reverse digital message in response to receiving a forward digital message from the digital power device controller 1720 (e.g., a query message). For example, the two-wire line-voltage occupancy sensor 1770 may be operable to transmit a reverse digital message including occupancy or vacancy information to the digital power device controller 1720 in response to detecting an occupancy or vacancy condition in the space and receiving a query message from the digital power device controller. The digital power device controller 1720 may then transmit a forward digital message to the digital dimming ballast 1710 to thus control the intensities of the lamps 1704 in response to the occupancy or vacancy information received from the line-voltage occupancy sensor 1770. Alternatively, each digital dimming ballast 1710 may be operable to receive the reverse digital message including the occupancy and vacancy information directly from the line-voltage occupancy sensor 1770 and to automatically control the intensity of the respective lamp 1704 in response to the occupancy and vacancy information. The two-wire input devices may be operable to transmit reverse digital messages directly to one or more of the other power devices. Since the two-wire load control devices and the two-wire input devices are all coupled to the circuit wiring 1714, these power devices may easily be installed in the same location. For example, the two-wire line-voltage occupancy sensor 1770 may easily be integrated into the lighting fixture in which one of the digital dimming ballasts 1710 is installed. In addition, a retrofit kit including one of the two-wire digital dimming ballasts 1710 may also include the two-wire line-voltage occupancy sensor 1770.

Alternatively, the ballasts 1710 could comprise digital switching ballasts that are responsive to the digital messages transmitted by the digital ballast controller 1720, but only to commands to turn the respective lamps on and off. In addition, the ballasts 1710 could also alternatively comprise digital bi-level switching ballasts that are able to individually control (e.g., turn off and on) a plurality of lamps (e.g., two or three lamps per ballast) to provide a few discrete dimmed levels (e.g., as described above with reference to FIG. 1). Further, the ballasts 1710 could alternatively comprise emergency ballasts. In addition, the load control system 1700 could comprise two-wire digital LED drivers for controlling respective LED light sources rather than the digital dimming ballasts 1710.

The load control system 1700 may comprise multiple types of two-wire load control devices coupled to a single digital power device controller 1720. For example, the power devices coupled to the digital power device controller 1720 may comprise at least one two-wire digital dimming ballast and as least one two-wire digital LED driver.

Because the power devices are operable to transmit acknowledgements to the digital power device controller 1720, the digital power device controller is operable to transmit new values of operating settings to the power devices and receive confirmation that the new values were received by the power devices. For example, the digital power device controller 1720 may be operable to transmit new values for the low-end intensity $L_{LE}$, the high-end intensity $L_{HE}$, a ballast factor, or a demand response setting to the digital dimming ballasts 1710. Also the digital power device controller 1720 may be operable to transmit new values of operating settings (such as timeout period, sensitivity, etc) to the occupancy sensor 1770. The digital power device controller 1720 may maintain a record in memory of the present operational settings of the power devices. The digital power device controller 1720 may also be operable to download new firmware to the power devices. This allows the load control system to adapt to new types of power devices and to change the functionality of the power devices after installation.

The digital power device controller 1720 is operable to automatically identify power devices that are missing and new power devices that have been coupled to the digital power device controller. Since the digital power device controller 1720 is able to keep track of the present operational settings of the power devices in memory, the missing or failed power devices may be easily replaced and reprogrammed in the load control system 1700. For example, if one of the digital dimming ballasts 1710 has failed and a new ballast is installed, the digital power device controller 1720 is able to determine which of the digital dimming ballasts is missing. The digital power device controller 1720 can then assign the new ballast a link address and then transmit the operational settings of the failed ballast to the new ballast. Methods of replacing digital dimming ballasts in a lighting control system are described in greater detail in commonly-assigned U.S. Patent Application Publication No. 2009/0273433, published Nov. 5, 2009, entitled METHOD OF AUTOMATICALLY PROGRAMMING A NEW BALLAST ON A DIGITAL BALLAST COMMUNICATION LINK; U.S. Patent Application Publication No. 2010/0241255, published Sep. 23, 2010, entitled METHOD OF SEMI-AUTOMATIC BALLAST REPLACEMENT; and U.S. Patent Application Publication No. 2011/0115293, published May 19, 2011, entitled METHOD FOR REPLAC- ING A LOAD CONTROL DEVICE OF A LOAD CONTROL SYSTEM; the entire disclosures of which are hereby incorporated by reference.

The digital power device controller 1720 may also be configured to assign a circuit address to each of the power devices that are connected to that digital power device controller 1720 via the circuit wiring 1714. For example, the power devices on the circuit wiring 1714 may all save the exact same circuit address in memory. The digital power device controller 1720 may transmit the circuit address to each power device at the same time that the digital power device controller transmits the link address to the power device (during the commissioning procedure). The digital power device controller 1720 is configured to periodically transmit out broadcast messages including the circuit address. If a power device having a circuit address is ever disconnected from the circuit wiring 1714 connected to the digital power device controller 1720 and then connected to another different digital power device controller, the power device will receive a broadcast message including a different circuit address and will reset its circuit address, link address, and other configuration information after receiving the broadcast message including the different circuit address a predetermined number of times. The power device can then obtain a circuit address and a new link address from the different digital power device controller.

Figure 25:
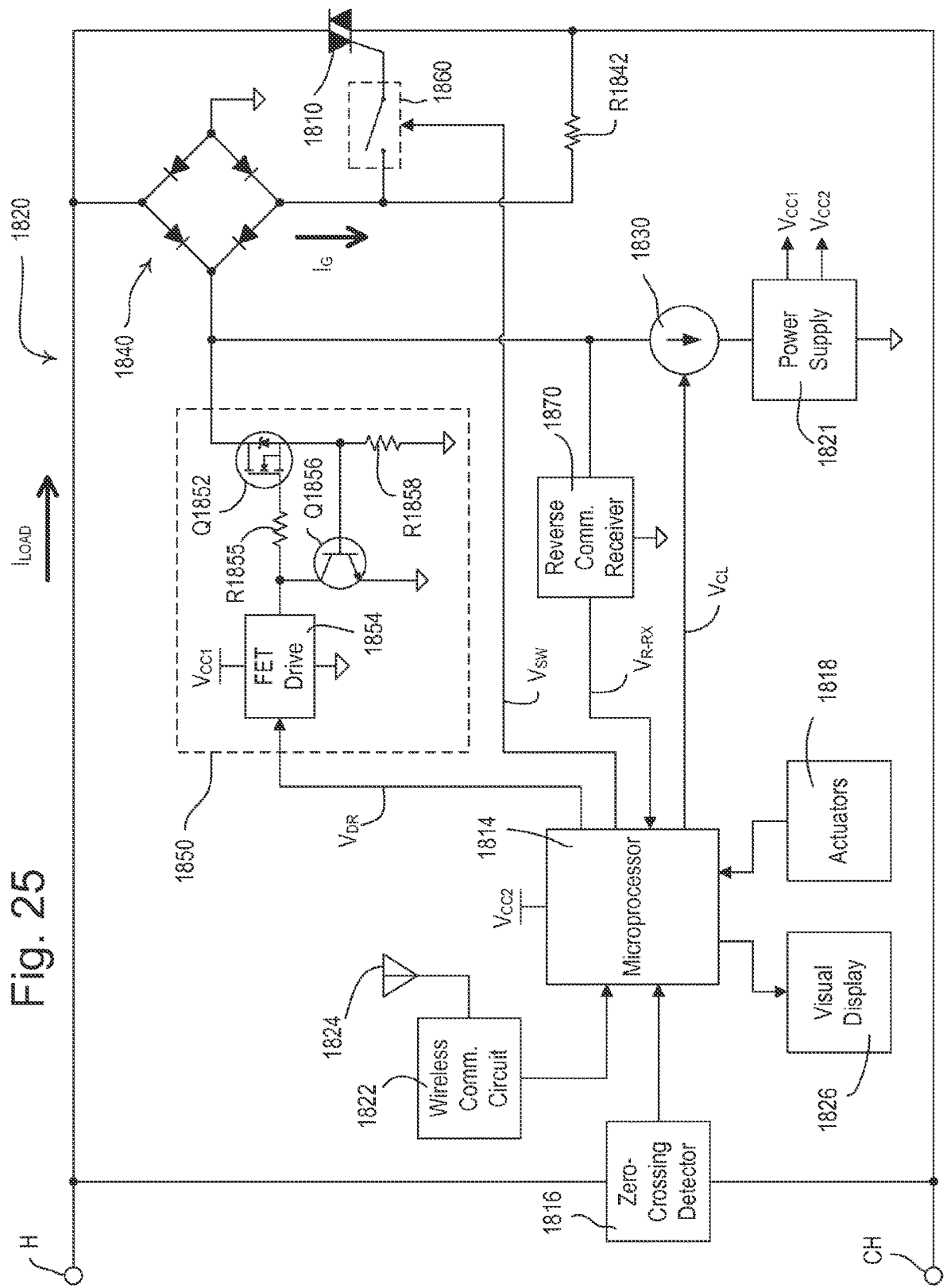
FIG. 25 is a simplified block diagram of a digital power device controller.

FIG. 25 is a simplified block diagram of an example digital power device controller 1820 (e.g., the digital power device controller 1720) that is able to transmit forward digital messages to and receive reverse digital messages from one or more power devices (e.g., the power devices of the load control system 1700 of FIG. 24). The digital power device controller 1820 comprises a hot terminal H adapted to be coupled to the AC power source 1702 and a control-hot terminal CH adapted to be coupled to the power devices. The digital power device controller 1820 could alternatively comprise a neutral terminal adapted to be coupled to the neutral side of the AC power source 1702 (as with the digital ballast controller 120 shown in FIG. 1).

The digital power device controller 1820 comprises a controllably conductive device, e.g., a triac 1810 as shown in FIG. 25, adapted to be coupled in series electrical connection between the AC power source 1702 and the power devices for generating a control-hot voltage $V_{CH}$. The triac 1810 is operable to conduct a load current $I_{LOAD}$ of all of the power devices coupled to the digital power device controller 1820. Since the triac 1810 is coupled between the AC power source 1702 and the power devices, the control-hot voltage $V_{CH}$ may only exist on the circuit wiring 1714 between the digital power device controller 1820 and the power devices (i.e., the digital power device controller operates to "swallow" the forward and reverse digital messages). Accordingly, the control-hot voltage $V_{CH}$ does not interfere with other control devices that may be coupled to the AC power source 1702.

The digital power device controller 1820 further comprises a microprocessor 1814 that generates a drive voltage $V_{DR}$ for rendering the triac 1810 conductive to thus generate the control-hot voltage $V_{CH}$ at the control-hot terminal CH. The microprocessor 1814 may alternatively comprise, for example, a microcontroller, a programmable logic device (PLD), an application specific integrated circuit (ASIC), a field-programmable gate array (FPGA), or any suitable processing device, controller, or control circuit. The microprocessor 1814 receives inputs from a zero-crossing detector 1816 (which may be the same as the zero-crossing detector 216 of the digital ballast controller 200 shown in FIG. 3A) and one or more actuators 1818 (e.g., the on button 1722, the off button 1724, the raise button 1726, and the lower button 1728 of the digital power device controller 1720 shown in FIG. 24). The microprocessor 1814 may also be coupled to a wireless communication circuit, e.g., an RF transceiver 1822, which is coupled to an antenna 1824 for transmitting and receiving the RF signals 1706. Alternatively, the wireless communication circuit may comprises an RF transmitter for transmitting RF signals, an RF receiver for receiving RF signals, or an infrared (IR) receiver for receiving IR signals. The microprocessor 1814 may further be coupled to a visual display 1826 (which may comprise, for example, the status indicators 128 of the digital ballast controller 120 shown in FIG. 1). The microprocessor 1814 may also store operational characteristics and information in a memory (not shown), which may be an external IC or an internal circuit of the microprocessor.

The digital power device controller 1820 comprises a full-wave rectifier bridge 1840 having AC terminals that are coupled in series with a resistor R1842 across the triac 1810. The digital power device controller 1820 also includes a gate coupling circuit 1850 that is coupled across the DC terminals of the rectifier bridge 1840. The gate coupling circuit 1850 comprises a voltage-controlled controllably conductive device, such as a MOS-gated transistor, e.g., a FET Q1852. The gate coupling circuit 1850 receives the drive voltage $V_{DR}$ from the microprocessor 1814 for rendering the FET Q1852 conductive and non-conductive. Specifically, the drive voltage $V_{DR}$ is coupled to a gate of the FET Q1852 through a FET drive circuit 1854 and a gate resistor R1855. The gate coupling circuit 1850 also comprises a current limit circuit including an NPN bipolar junction transistor Q1856 and a sense resistor R1858, which is coupled in series with the FET Q1852. The base of the transistor Q1856 is coupled to the junction of the FET Q1852 and the sense resistor R1858. Accordingly, in the event of an overcurrent condition (i.e., when the magnitude of the voltage across the sense resistor R1858 exceeds the rated base-emitter voltage of the transistor Q1856), the transistor Q1856 is rendered conductive, thus pulling the gate of the FET Q1852 down towards circuit common and rendering the FET non-conductive.

The digital power device controller 1820 also comprises a controllable switching circuit 1860 coupled between the gate of the triac 1810 and the junction of the rectifier bridge 1840 and the resistor 1842. Accordingly, the controllable switching circuit 1860 is operatively coupled in series between the gate coupling circuit 1850 and the gate of the triac 1810. The microprocessor 1814 generates a switch control voltage $V_{SW}$ for rendering the controllable switching circuit 1860 conductive and non-conductive. When the controllable switching circuit 1860 is conductive, the FET Q1852 of the gate coupling circuit 1850 is able to conduct a gate current IG through the gate of the triac 1810 to render the triac conductive to generate the control-hot voltage $V_{CH}$.

The digital power device controller 1820 also includes a power supply 1821 that is coupled in series with a current-limit circuit 1830 across the DC terminals of the rectifier bridge 1840. The power supply 1821 is operable to generate a first DC supply voltage $V_{CC1}$ for driving the FET Q1852 of the gate coupling circuit 1850 and a second DC supply voltage $V_{CC2}$ for powering the microprocessor 1814 and other low-voltage circuitry of the digital power device controller. The power supply 1821 is operable to charge by conducting a charging current $I_{CHRG}$ through the control-hot terminal CH when the triac 1810 is non-conductive at the beginning of each half-cycle of the AC power source 1702. The current limit circuit 1830 limits the magnitude of the charging current $I_{CHRC}$ to be equal to or less than a first current limit $I_{LIMIT1}$, e.g., approximately 150 milliamps. The microprocessor 1814 generates a current-limit control signal $V_{CL}$ that is coupled to the current-limit circuit 1830, such that the microprocessor is able to render the current-limit circuit 1830 non-conductive to stop the power supply 1821 from charging as will be described in greater detail below.

The digital power device controller 1820 also comprises a reverse communication receiving circuit 1870 that is coupled across the DC terminals of the rectifier bridge 1840, such that the reverse communication receiving circuit 1870 is responsive to the controller-drop voltage $V_{CD}$ developed across the digital power device controller. The reverse communication receiving circuit 1870 provides a reverse communication receive signal $V_{R\text{-}RX}$ to the microprocessor 1814, such that the microprocessor is able to decode the digital information encoded in the controller-drop voltage $V_{CD}$ by the power devices as will be described in greater detail below.

Figure 26:
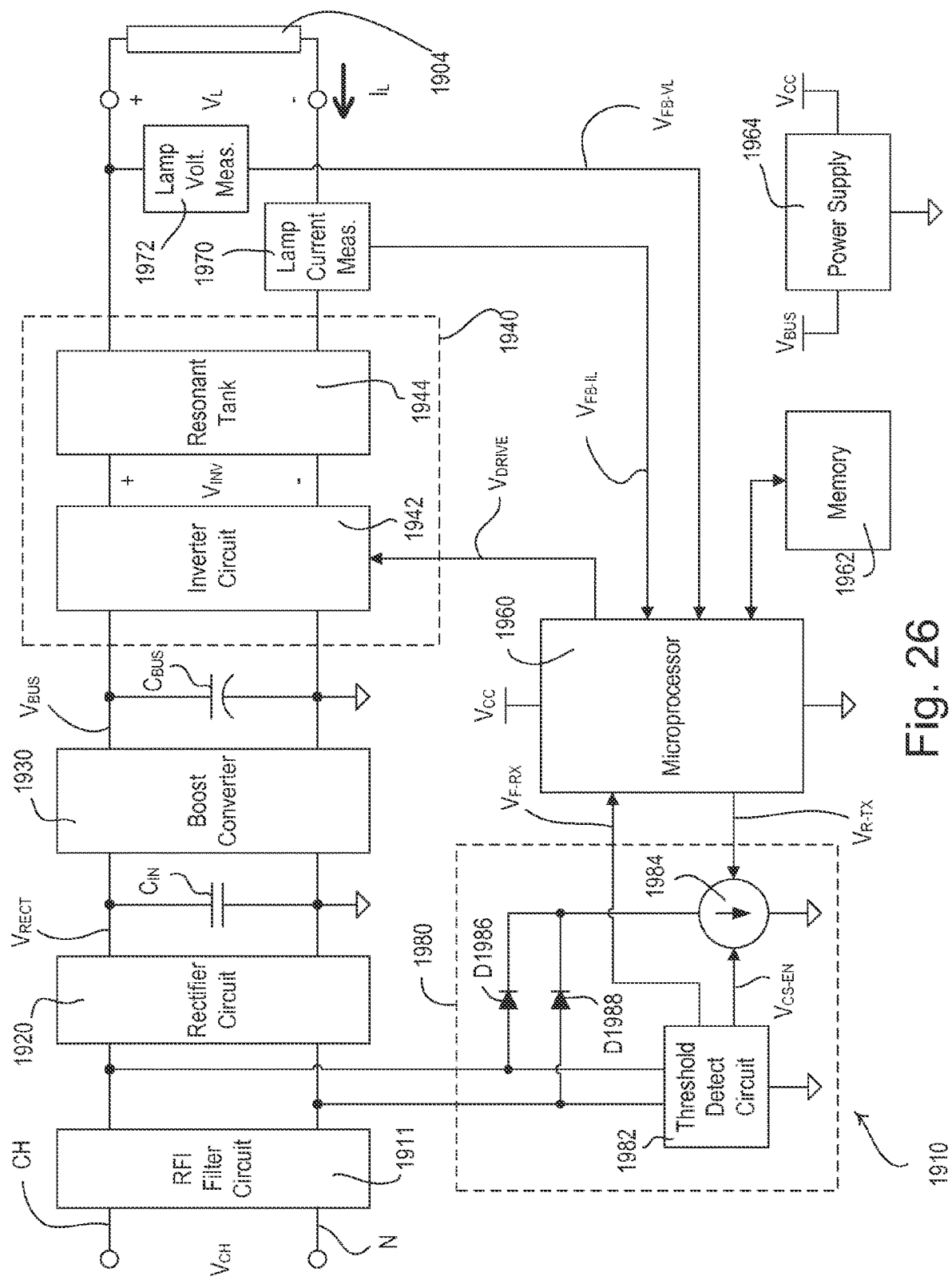
FIG. 26 is a simplified block diagram of a digital dimming ballast.

FIG. 26 is a simplified block diagram of an example digital dimming ballast 1910 (e.g., one of the digital dimming ballasts 1710) that is able to receive forward digital messages from and transmit reverse digital messages to a digital power device controller (e.g., the digital power device controller 1720 of the load control system 1700 of FIG. 24 or the digital power device controller 1820 shown in FIG. 25). The digital dimming ballast 1910 is operable to control the intensity of a fluorescent lamp 1904 to a desired lighting intensity $L_{DES}$ between a low-end intensity $L_{LE}$ and a high-end intensity $L_{HE}$. The digital dimming ballast 1910 comprises an RFI filter circuit 1911 and a rectifier circuit 1920 that operate in a similar manner as the RFI filter circuit 310 and the rectifier circuit 320 of the digital dimming ballast 300 shown in FIG. 3B.

The digital dimming ballast 1910 comprises a power converter, e.g., a boost converter 1930, which has an input for receiving a rectified voltage $V_{RECT}$ from the rectifier circuit 1920. The boost converter 1930 operates to generate a DC bus voltage $V_{BUS}$ across a bus capacitor $C_{BUS}$ and to improve the power factor of the digital dimming ballast 1910 (e.g., as a PFC circuit). The digital dimming ballast 1910 comprises an input capacitor $C_{IN}$ coupled across the input of the boost converter 1930. The digital dimming ballast 1910 also includes a load regulation circuit 1940 comprising an inverter circuit 1942 for converting the DC bus voltage $V_{BUS}$ to a high-frequency AC voltage $V_{INV}$ and a resonant tank circuit 1944 for coupling the high-frequency AC voltage $V_{INV}$ generated by the inverter circuit to filaments of a lamp 1904 (e.g., in a similar manner as the respective circuits of the load regulation circuit 340 of the digital dimming ballast 300 shown in FIG. 3B).

The digital dimming ballast 1910 comprises a control circuit, e.g., a microprocessor 1960, for providing a drive control signal $V_{DRIVE}$ to the inverter circuit 1942 for controlling the magnitude of a lamp voltage $V_L$ generated across the fluorescent lamp 1904 and a lamp current $I_L$ conducted through the lamp in response to a lamp current feedback signal $V_{FB\text{-}IL}$ generated by a lamp current measurement circuit 1970 and a lamp voltage feedback signal $V_{FB\text{-}VL}$ generated by a lamp voltage measurement circuit 1972. The control circuit of the digital dimming ballast 1910 may alternatively comprise, for example, a microcontroller, a programmable logic device (PLD), an application specific integrated circuit (ASIC), a field-programmable gate array (FPGA), or any suitable processing device, controller, or control circuit. The microprocessor 1960 is coupled to a memory 1962 for storage of the control information of the digital dimming ballast 1910. The digital dimming ballast 1910 also comprises a power supply 1964, which receives the bus voltage $V_{BUS}$ and generates a DC supply voltage $V_{CC}$ (e.g., approximately five volts) for powering the microprocessor 1960, the memory 1962, and the other low-voltage circuitry of the ballast.

The digital dimming ballast 1910 also comprises an active load circuit 1980 coupled across the output of the RFI filter circuit 1911. The active load circuit 1980 comprises a threshold detect circuit 1982 and a current sink circuit 1984, which is coupled to the RFI filter circuit 1911 via two diodes D1986, D1988. The active load circuit 1980 operates to provide a path for a charging current of a power supply of a digital power device controller (e.g., the charging current $I_{CHRG}$ of the power supply 1821 of the digital power device controller 1820). The active load circuit 1980 may provide the path for the charging current $I_{CHRG}$ in a similar manner as the active load circuit 1490 shown in FIG. 21. The current sink circuit 1984 limits the magnitude of an active load current conducted through the active load circuit 1980 to less than or equal to a second current limit $I_{LIMIT2}$, which is greater than the first current limit $I_{LIMIT1}$ of the digital ballast controller 1820 (e.g., approximately 200 milliamps).

The threshold detect circuit 1982 provides a current sink enable control signal $V_{CS\text{-}EN}$ to the current sink circuit 1984 for enabling and disabling the current sink circuit in response to the magnitude of the control-hot voltage $V_{CH}$. The threshold detect circuit 1980 is responsive to the differential voltage between the control-hot terminal CH and the neutral terminal N of the digital dimming ballast 1910. The threshold detect circuit 1980 enables the current sink circuit 1984 when the magnitude of the control-hot voltage $V_{CH}$ drops below a falling threshold $V_{TH\text{-}F}$ (e.g., approximately 10 volts), i.e., at the end of each half-cycle. The threshold detect circuit 1982 disables the current sink circuit 1984 when the magnitude of the control-hot voltage $V_{CH}$ rises above a rising threshold $V_{TH\text{-}R}$ (e.g., approximately 20 volts), i.e., when the triac 1810 of the digital power device controller 1820 is rendered conductive. Accordingly, when the triac 1810 of the digital power device controller 1820 is non-conductive and the current sink circuit 1984 is enabled, the active load circuit 1980 is able to conduct the active load current and the magnitude of the control-hot voltage $V_{CH}$ across the power devices is approximately zero volts.

The active load circuit 1980 is also coupled to a control circuit, e.g., a microprocessor 1960, of each digital dimming ballast 1910. The threshold detect circuit 1980 provides a received forward communication signal $V_{F\text{-}RX}$ to the microprocessor 1960, such that the microprocessor is able to decode the digital information stored in the timing edges of the control-hot voltage $V_{CH}$ (as described above with reference to FIGS. 1-23). For example, the threshold detect circuit 1980 may drive the received forward communication signal $V_F$-Rx high when the magnitude of the control-hot voltage $V_{CH}$ rises above the rising threshold $V_{TH\text{-}R}$ (i.e., approximately 20 volts), and drives the received forward communication signal $V_{F\text{-}RX}$ low when the magnitude of the control-hot voltage $V_{CH}$ drops below the falling threshold $V_{TH\text{-}F}$ (i.e., approximately 10 volts).

The microprocessor 1960 is also coupled to the current sink circuit 1984 for overriding the control of the threshold detect circuit 1982 to enable and disable the current sink circuit. Specifically, the microprocessor 1960 generates a transmit reverse communication signal $V_{R\text{-}TX}$, which is representative of the reverse digital messages to be transmitted to the digital power device controller 1720. The microprocessor 1960 is able to enable the current sink circuit 1984 when the triac 1810 of the digital power device controller 1720 is non-conductive to cause the magnitude of the control-hot voltage $V_{CH}$ to be approximately zero volts and the magnitude of the controller-drop voltage $V_{CD}$ to be equal to approximately the magnitude of the AC mains line voltage. The microprocessor 1960 is able to disable the current sink circuit 1984 when the triac 1810 of the digital power device controller 1720 is non-conductive to cause the magnitude of the control-hot voltage $V_{CH}$ to increase above zero volts and the magnitude of the controller-drop voltage $V_{CD}$ to decrease. Accordingly, the microprocessor 1960 is able to control the magnitude of the controller-drop voltage $V_{CD}$ when the triac 1810 of the digital power device controller 1720 is non-conductive to transmit the reverse digital messages to the digital power device controller. As previously mentioned, the triac 1810 of the digital power device controller 1720 operates to swallow the reverse digital messages, such that the reverse digital messages do not interfere with other control devices that may be coupled to the AC power source 102.

Figure 27:
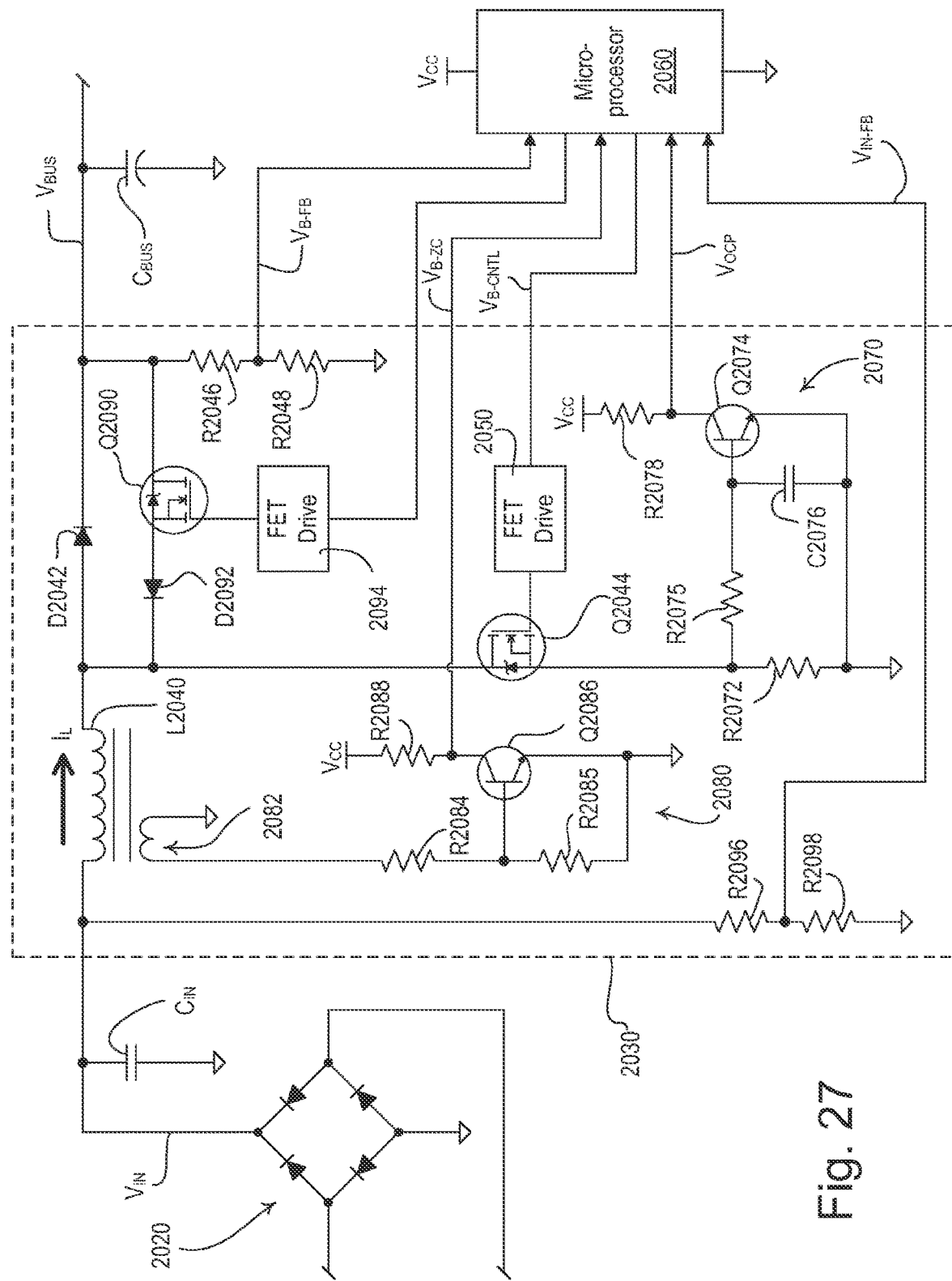
FIG. 27 is a simplified schematic diagram of a power converter for an electronic ballast.

FIG. 27 is a simplified schematic diagram of an example power converter 2030 for an electronic ballast (e.g., the boost converter 1930 of the digital dimming ballast 1910 shown in FIG. 26). The power converter 2030 is controlled by a control circuit, e.g., a microprocessor 2060, which may be the control circuit 1960 of the digital dimming ballast 1910. The boost converter 2030 comprises an input that is coupled to the DC terminals of a rectifier circuit 2020 (e.g., the rectifier circuit 1920) for receiving an input voltage $V_{IN}$ (e.g., the rectified voltage $V_{RECT}$). For example, the rectifier circuit 2020 is shown as a full-wave bridge rectifier in FIG. 27. An input capacitor C is coupled across the input of the boost converter 2030 and may have a capacitance of, for example, approximately 0.22 µF. When the triac of a digital power device controller that is coupled to the digital dimming ballast 1910 (e.g., the triac 1810 of the digital power device controller 1820) is conductive, the power converter 2030 operates in a boost mode to generate a DC bus voltage $V_{BUS}$ from the input voltage $V_{IN}$ (e.g., as a boost converter) and to improve the power factor of the digital dimming ballast 1910 (in a similar manner as the boost converter 330 of the digital dimming ballast 300 shown in FIG. 3B).

The power converter 2030 comprises an inductor L2040, which receives the input voltage $V_{IN}$ from the rectifier circuit 2020, conducts an inductor current $I_L$, and has an inductance $L_{210}$ of, for example, approximately 0.81 mH. The inductor L2040 is coupled to the bus capacitor $C_{BUS}$ via a diode D2042. A power switching device, e.g., a field-effect transistor (FET) Q2044 is coupled in series electrical connection between the junction of the inductor L2040 and the diode D2042 and circuit common, and is controlled to be conductive and non-conductive, so as to generate the bus voltage $V_{BUS}$ across the bus capacitor $C_{BUS}$. The FET Q2044 could alternatively be implemented with a bipolar junction transistor (BJT), an insulated-gate bipolar transistor (IGBT), or any suitable transistor. A resistor divider is coupled across the bus capacitor $C_BUS$ and comprises two resistors R2046, R2048, which have, for example, resistances of approximately 1857 kΩ and 10 kΩ, respectively. The microprocessor 2060 receives a bus voltage feedback signal $V_{B-FB}$, which is generated at the junction of the resistors R2046, R2048 and has a magnitude that is representative of the magnitude of the bus voltage $V_{BUS}$.

The microprocessor 2060 is coupled to the gate of the FET Q2044 of the power converter 2030 for directly controlling the FET Q2044 to be conductive and non-conductive to selectively charge and discharge the inductor L2040 and generate the bus voltage $V_{BUS}$ across the bus capacitor $C_{BUS}$. The power converter 2030 comprises a FET drive circuit 2050, which is coupled to a gate of the FET Q2044 for rendering the FET conductive and non-conductive in response to a bus voltage control signal $V_{B-CNTL}$ received from the microprocessor 2060. The microprocessor 2060 controls the bus voltage control signal $V_{B-CNTL}$ to control how long the FET Q2044 is rendered conductive and thus adjust the magnitude of the bus voltage $V_{BUS}$.

The power converter 2030 also comprises an over-current protection circuit 2070 that generates an over-current protection signal $V_{OCP}$, which is provided to the microprocessor 2060, such that the microprocessor is able to render the FET Q2044 non-conductive in the event of an over-current condition in the FET. The over-current protection circuit 2070 comprises a sense resistor R2072 that is coupled in series with the FET Q2044 and has a resistance of, for example, approximately 0.24Ω. The voltage generated across the sense resistor R2072 is coupled to the base of an NPN bipolar junction transistor Q2074 via a resistor R2075 (e.g., having a resistance of approximately 1 kΩ. The base of the transistor Q2074 is also coupled to circuit common through a capacitor C2076 (e.g., having a capacitance of approximately 470 pF). The collector of the transistor Q2074 is coupled to the DC supply voltage $V_{CC}$ through a resistor R2078 (e.g., having a resistance of approximately 6.34 kΩ. The over-current protection signal $V_{OCP}$ is generated at the junction of the transistor Q2074 and the resistor R2078. When the voltage across the sense resistor R2072 exceeds a predetermined over-current threshold voltage (i.e., as a result of an over-current condition in the FET Q2044, e.g., approximately 10 amps), the transistor Q2074 is rendered conductive, thus pulling the magnitude of the over-current protection signal $V_{OCP}$ down towards circuit common, such that the microprocessor 2060 renders the FET Q2044 non-conductive.

The power converter 2030 further comprises a zero-current detect circuit 2080, which generates a zero-current feedback signal $V_{B-ZC}$ when the magnitude of the voltage induced by the inductor L2040 collapses to approximately zero volts to indicate when the magnitude of the inductor current $I_L$ is approximately zero amps. The zero-current detect circuit 2080 comprises a control winding 2082 that is magnetically coupled to the inductor L2040. The control winding 2082 is coupled in series with two resistors R2084, R2085, which each have, for example, resistances of approximately 22 kΩ. The junction of the resistor R2084, R2085, is coupled to the base of an NPN bipolar junction transistor Q2086. The collector of the transistor 2086 is coupled to the DC supply voltage $V_{CC}$ through a resistor R2088 (e.g., having a resistance of approximately 22 kΩ, such that the zero-current feedback signal $V_{B-ZC}$ is generated at the collector of the transistor. When the voltage across the inductor L2040 is greater than approximately zero volts, a voltage is produced across the control winding 2082 and the transistor Q2086 is rendered conductive, thus driving the zero-current feedback signal $V_{B-ZC}$ down towards circuit common. When the magnitude of the inductor current $I_L$ drops to approximately zero amps, the transistor Q2086 is rendered non-conductive and the zero-current feedback signal $V_{B-ZC}$ is pulled up towards the DC supply voltage $V_{CC}$.

As previously mentioned, the power converter 2030 may be part of the digital dimming ballast 1910, which may be controlled by the digital power device controller 1820 shown in FIG. 25. When the triac 1810 of the digital power device controller 1820 is non-conductive (i.e., the magnitude of the control-hot voltage $V_{CH}$ is approximately zero volts with respect to neutral), the digital dimming ballast 1910 is operable to control the current sink circuit 1984 to control the magnitude of the controller-drop voltage $V_{CD}$ and transmit the reverse digital messages to the digital power device controller. However, if the magnitude of the input voltage $V_{IN}$ across the input capacitor $C_{IN}$ is low (e.g., approximately zero volts) when the microprocessor 1960 is trying to increase the magnitude of the control-hot voltage $V_{CH}$ to thus decrease the magnitude of the controller-drop voltage $V_{CD}$, the magnitude of the control-hot voltage $V_{CH}$ may increase more slowly than desired due to the input capacitor $C_{IN}$ charging. This slow change in the magnitude of the control-hot voltage $V_{CH}$ and thus the controller-drop voltage $V_{CD}$ can cause communication errors, particularly, when there are many digital dimming ballasts connected to the digital power device controller 1820. In addition, if the magnitude of the input voltage $V_{IN}$ across the input capacitor $C_{IN}$ is low (i.e., approximately zero volts) when the digital power device controller 1820 renders the triac 1810 conductive each half-cycle of the control-hot voltage $V_{CH}$, the input capacitor $C_{IN}$ may conduct a charging current having a large magnitude (e.g., approximately one amp), which can cause increased power dissipation (i.e., losses) in the electrical components of the digital power device controller 1820 and the digital dimming ballast 1910.

Therefore, when the magnitude of the control-hot voltage $V_{CH}$ is approximately zero volts each half-cycle (i.e., when the triac 1810 of the digital power device controller 1820 is non-conductive), the microprocessor 2060 is able to control the power converter 2030 to operate in a buck mode to charge the input capacitor $C_{IN}$ from the bus voltage $V_{BUS}$ (e.g., to operate in a reverse direction as a buck converter). Specifically, the power converter 2030 further comprises another FET Q2090 coupled in series with a diode D2092, with the series combination of the FET Q2090 and the diode D2092 coupled in parallel the diode D2042. The microprocessor 2060 is coupled to the gate of the FET Q2090 through a FET drive circuit 2094 for selectively rendering the FET conductive and non-conductive. A resistor divider is coupled across the input capacitor $C_{IN}$ and comprises two resistors R2096, R2098, which have, for example, resistances of approximately 1857 kΩ and 10 kΩ, respectively. The microprocessor 2060 receives an input voltage feedback signal $V_{IN-FB}$, which is generated at the junction of the resistor R2096, R2098 and has a magnitude that is representative of the magnitude of the input voltage $V_{IN}$. The FET drive circuits 2050, 2094 could be implemented as the low-side and high-side drive circuits, respectively, of a single half-bridge driver IC.

When the microprocessor 2060 renders the FET Q2090 conductive, the inductor L2040 conducts the inductor current $I_L$ from the bus capacitor $C_{BUS}$ to the input capacitor $C_{IN}$, and the magnitude of the inductor current $I_L$ increases. When the FET Q2090 is non-conductive, the inductor L2040 continues to conduct the inductor current $I_L$ through the body diode of the FET Q2044, and the magnitude of the inductor current $I_L$ decreases. Accordingly, the microprocessor 2060 is able to control the FET Q2090 to operate the power converter 2030 as a buck converter to charge the input capacitor $C_{IN}$ when the triac 1810 of the digital power device controller 1820 is non-conductive. For example, the microprocessor 2060 may be operable to charge the input capacitor $C_{IN}$, such that the magnitude of the input voltage $V_{IN}$ is approximately equal to the magnitude of the control-hot voltage $V_{CH}$ when the triac 1810 is rendered conductive. Specifically, the microprocessor 2060 may be operable to charge the magnitude of the input voltage $V_{IN}$ to, for example, approximately 100 volts. Accordingly, the difference between the magnitude of the control-hot voltage $V_{CH}$ and the magnitude of the input voltage $V_{IN}$ is minimized, such that the input capacitor $C_{IN}$ does not conduct much charging current when the triac 1810 is rendered conductive. In addition, the microprocessor 2060 may be operable to over-charge the input capacitor $C_{IN}$ while the triac 1810 is non-conductive, such that the magnitude of the input voltage $V_{IN}$ is greater than the magnitude of the control-hot voltage $V_{CH}$ when the triac 1810 is rendered conductive.

While not shown in the figures of the present application, the two-wire line-voltage occupancy sensor 1770 may have similar functional blocks as the digital dimming ballast 1910 shown in FIG. 26. For example, the two-wire line-voltage occupancy sensor 1770 may have a microprocessor and an active load circuit (similar to the active load circuit 1980 of the digital dimming ballast 1910), such that the two-wire line-voltage occupancy sensor is able to receive forward digital messages and transmit reverse digital messages. However, rather than including a load regulation circuit 1940, the two-wire line-voltage occupancy sensor 1770 may comprise an internal occupancy detection circuit for detecting the occupancy and vacancy conditions in the space around the occupancy sensor. The two-wire line-voltage occupancy sensor 1770 may be operable to transmit reverse digital messages including information regarding occupancy and vacancy conditions detected by the occupancy detection circuit. Alternatively, a two-wire line-voltage daylight sensor (not shown) could comprise a microprocessor, an active load circuit, and an internal photosensitive circuit for measuring the total light level around the daylight sensor.

FIG. 28A is a simple diagram of a "forward" digital message 2000 and a "reverse" digital message 2002. For example, the forward digital message 2000 may be transmitted by the digital power device controller 1720 to the power devices of the load control system 1700 of FIG. 24. The reverse digital message 2002 may be transmitted by one of the power devices of the load control system 1700 to the digital power device controller 1720. The forward digital message 2000 may comprise, for example, a command for the digital dimming ballasts 1710 to control the lamps 1704 or a query for the power devices to report a state or level. The reverse digital message 2002 immediately follows the forward digital message 2000 and may comprise, for example, a response or answer to a query from the forward digital message (e.g., a simple 1-bit response, such as, "yes" or "no"). For example, queries transmitted by the digital ballast controller 1720 may comprise yes-or-no questions, such as, "Do you have a lamp fault condition?" (transmitted to the digital dimming ballasts 1710) and "Have you detected an occupied condition?" (transmitted to the two-wire line-voltage occupancy sensor 1770). The forward digital message 2000 may extend, e.g., for approximately 10 line cycles, while the reverse digital message 2002 may extend, e.g., for approximately 1.5 line cycles.

The digital power device controller 1720 may be operable to set the values of the offset time periods $T_{OS1}$, $T_{OS2}$, $T_{OS3}$, $T_{OS4}$ in response to the measured line-voltage time period $T_{LC}$. The digital power device controller 1720 may update the first offset time period $T_{OS1}$ to be equal to half of the measured line-cycle time $T_{LC}$ and the other offset time periods $T_{OS2}$, $T_{OS3}$, $T_{OS4}$ to be longer than the first offset time period $T_{OS1}$ by 100, 200, and 300 microseconds, respectively, i.e., $$T_{OS1} = T_{LC}/2;$$

$$T_{OS2} = T_{OS1} + \Delta T_{OS};$$

$T_{OS3} = T_{OS1} + 2 \cdot \Delta T_{OS}$; and $T_{OS4} = T_{OS1} + 3 \cdot \Delta T_{OS}$ where $\Delta T_{OS}$ is approximately 100 microseconds.

The power devices may be operable to measure the line-voltage time period $T_{LC}$ from the start pattern transmitted by the digital power device controller 1720.

FIG. 28B is a simple timing diagram of a control-hot voltage (e.g., the control-hot voltage $V_{CH}$ generated by the digital power device controller 1720) showing an example start pattern. As shown in FIG. 28B, the digital power device controller 1720 is operable to transmit the start pattern by rendering the triac 1810 conductive to generate a reference edge during a first half-cycle, rendering the triac 1810 conductive in a second subsequent half-cycle at the start symbol time period $T_{START}$ from the reference edge in the first half-cycle, and then rendering the triac conductive after the line-voltage time period $T_{LC}$ from the reference edge in the first half-cycle. The start symbol time period $T_{START}$ is unique from and longer than the offset time periods $T_{OS1}$-$T_{OS4}$ used to transmit data to the power devices (e.g., approximately 8.78 milliseconds given a 60 Hz line frequency). The power devices are operable to measure the line-voltage time period $T_{LC}$ (from the reference edge in the first half-cycle to the edge in the third half-cycle of the start pattern), and to update the offset time periods $T_{OS1}$, $T_{OS2}$, $T_{OS3}$, $T_{OS4}$ from the measured line-voltage time period $T_{LC}$. After transmitting the start pattern, the digital power device controller 1720 is operable to immediately begin transmitting data in the next half-cycle by generating a reference edge in the next half-cycle and data edges in the subsequent half-cycles as shown in FIG. 28B. The power devices are operable to use the updated offset time periods $T_{OS1}$, $T_{OS2}$, $T_{OS3}$, $T_{OS4}$ to decode the data of the forward digital message.

Figure 29A:
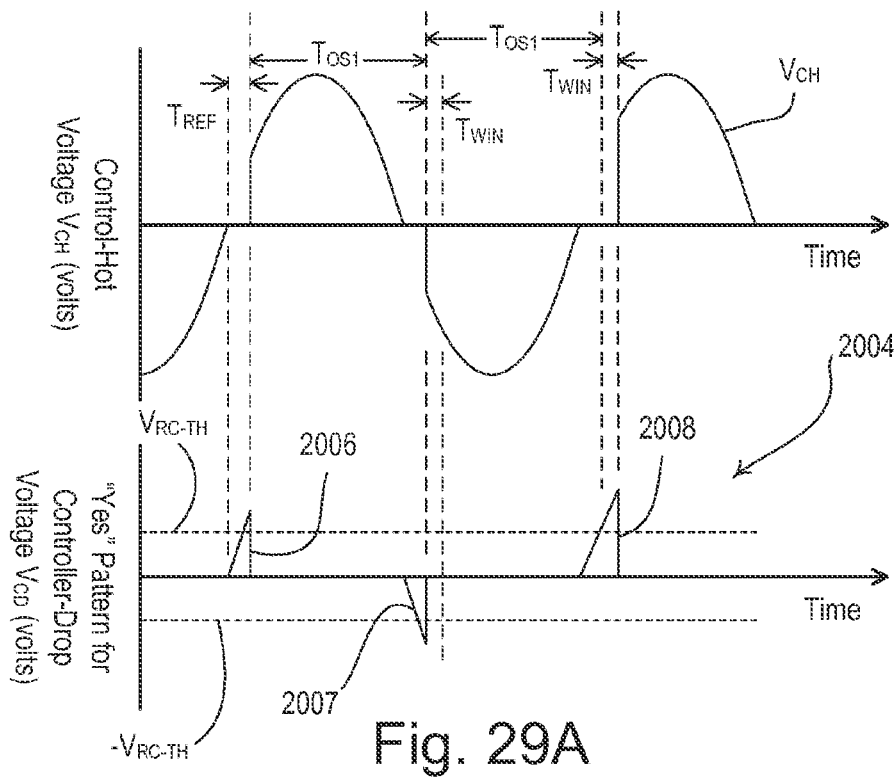
FIGS. 29A and 29B are example timing diagrams of a control-hot voltage and a controller-drop voltage showing example reverse data patterns of the reverse digital messages.
Figure 29B:
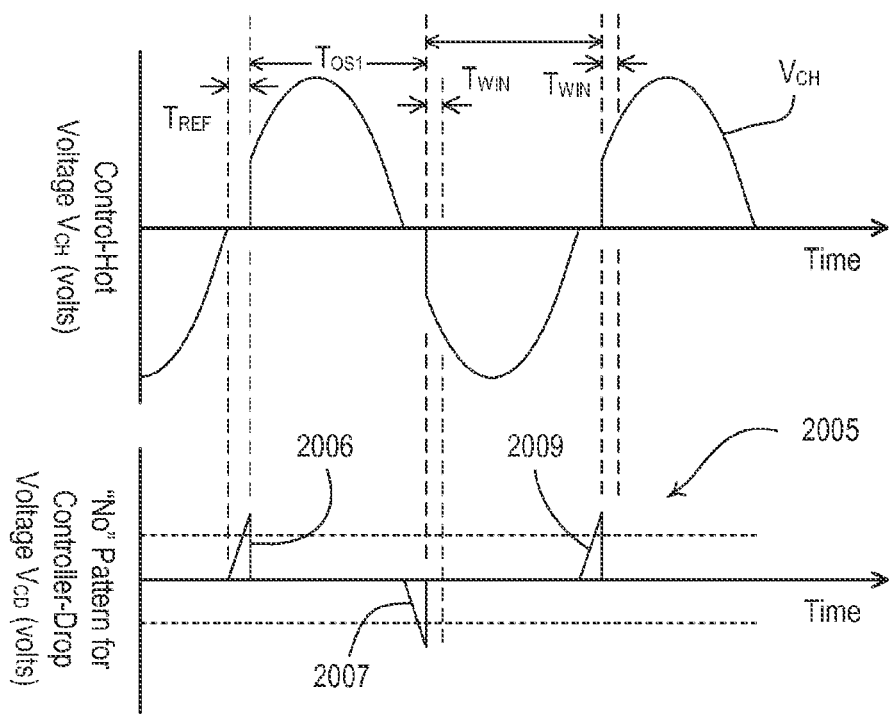

FIGS. 29A and 29B are simple timing diagrams (e.g., of the control-hot voltage $V_{CH}$ and the controller-drop voltage $V_{CD}$ of the load control system 1700 of FIG. 24) showing example reverse data patterns of a reverse digital message. Particularly, the simple reverse digital messages may comprise a simple "yes" pattern 2004 as shown in FIG. 29A and a simple "no" pattern 2005 as shown in FIG. 29B. During the first half-cycle of the reverse digital message, the digital power device controller 1720 first generates a reference edge by rendering the triac 1810 conductive after the reference edge time period $T_{REF}$ since the last zero-crossing. During the time between the zero-crossing and the reference edge, the threshold detect circuit 1982 of the active load circuit 1980 of each of the power devices enables the current sink circuit 1984, such that the magnitude of the controller-drop voltage $V_{CD}$ is approximately equal to the magnitude of the AC mains line voltage, thus creating a reference pulse 2006 across the digital power device controller 1720.

During the second half-cycle of the reverse digital message, the digital power device controller 1720 maintains the triac 1810 non-conductive during a window time period $T_{WIN}$ during which each of the power devices may transmit an ACK pulse 2007 (i.e., an acknowledgement) to signal to the digital power device controller that each power device received the forward digital message that was transmitted just before the reverse digital message. The window time period $T_{WIN}$ starts after the first offset time period $T_{OS1}$ (i.e., the length of one half-cycle) from the reference edge in the first half-cycle of the reverse digital message as shown in FIGS. 29A and 29B. For example, the window time period $T_{WIN}$ may be 400 microseconds long. The triac 1810 is rendered conductive at the end of the window time period $T_{WIN}$.

Specifically, each of the power devices may transmit the ACK pulse 2007 by disabling the current sink circuit 1984 during the window time period $T_{WIN}$, such that the magnitude of the controller-drop voltage $V_{CD}$ remains below a reverse communication threshold $V_{RC-TH}$ and may be, for example, reduced to approximately zero volts as shown in FIGS. 29A and 29B. If all of the power devices receive the forward digital message and disable the current sink circuits 1984 during the window time period $T_{WIN}$ in the second half-cycle of the reverse digital message, the magnitude of the controller-drop voltage $V_{CD}$ remains below the reverse communication threshold $V_{RC-TH}$. However, if even one of the power devices does not receive the forward digital message and does not disable the current sink circuit 1984 during the window time period $T_{WIN}$ (i.e., allows the threshold detect circuit 1980 to keep the current sink circuit enabled), the magnitude of the controller-drop voltage $V_{CD}$ will be greater than the reverse communication threshold $V_{RC-TH}$ when the triac 1810 is rendered conductive at the end of the window time period $T_{WIN}$. Accordingly, the digital power device controller 1720 is operable to determine that all of the power devices did not receive the forward digital message and to retransmit the forward digital message after the end of the present reverse digital message.

During the third half-cycle of the simple reverse digital message, the digital power device controller 1720 once again maintains the triac 1810 non-conductive during the window time period $T_{WIN}$. During the window time period $T_{WIN}$ of the third half-cycle of the simple reverse digital message, each of the power devices may transmit data in the form of a "yes" or "no" answer (e.g., one bit of data) as shown in the "yes" pattern 2004 in FIG. 29A and the "no" pattern 2005 in FIG. 29B. Specifically, each power device may enable the current sink circuit 1984 to transmit a "yes" pulse 2008 and may disable the current sink circuit to transmit a "no" pulse 2009 during the window time period $T_{WIN}$ of the third half-cycle. If only one power device transmits a "yes" pulse 2008, the magnitude of the controller-drop voltage $V_{CD}$ will rise above the reverse communication threshold $V_{RC-TH}$ during the window time period $T_{WIN}$ of the third half-cycle. However, all of the power devices need to transmit "no" pulses 2009 for the magnitude of the controller-drop voltage $V_{CD}$ to remain below the reverse communication threshold $V_{RC\_TH}$ during the window time period $T_{WIN}$ of the third half-cycle. Therefore, the digital power device controller 1720 is only able to determine if all of the power devices transmitted "no" patterns 2005 or at least one of the power devices transmitted a "yes" pattern 2004.

As previously mentioned, the digital power device controller 1720 is operable to assign link addresses to the power devices during the commissioning procedure of the two-way load control system 1700. For example, the digital power device controller 1720 may be operable to transmit a broadcast forward digital message (e.g., having the question "Do you need an address?") to all of the power devices. If at least one of the power devices answers with a "yes" pattern 2004, the digital power device controller 1720 may perform a binary search routine to determine the serial number of the at least one unaddressed power device, and then may assign the unique link address to the power device having that serial number. Alternatively, the power devices may be operable to produce a 24-bit random number (which may be seeded using the serial number) and may use the random number during the binary search routine (rather than the serial number).

During the binary search routine, the digital power device controller 1720 may be operable to transmit a broadcast forward digital message (e.g., having the question "Is your serial number greater than the number $N_{BIN\text{-}SRCH}$?"), and each of the unaddressed ballasts may respond by transmitting "yes" or "no" patterns 2004, 2005. For example, the initial value of the number $N_{BIN\text{-}SRCH}$ may be approximately half of the possible range of serial numbers for the digital power device controller 1720. The digital power device controller 1720 may be operable to transmit the binary search forward digital message (while updating the value of the number $N_{BIN\text{-}SRCH}$) and receive "yes" or "no" patterns 2004, 2005 from the power devices until only one power device is identified. The identified power device can then transmit its serial number to the digital power device controller 1720 and the digital power device controller can transmit the unique link address to the power device. The digital power device controller 1720 can then retransmit the broadcast forward digital message having the question "Do you need an address?" to determine if any more power devices need link addresses, and then perform the binary search routine again if needed. Once all of the power devices have been assigned link addresses, the digital power device controller 1720 is operable to exit the addressing mode, and may then use the assigned link addresses to transmit forward digital messages to the power devices.

FIGS. 30-33 show example flowcharts executed by a control circuit of a digital power device controller (e.g., the microprocessor 1814 of the digital power device controller 1720, 1820) to transmit forward digital messages and receive reverse digital messages. The digital power device controller 1820 may be operable to transmit the forward digital messages to the power devices in a similar manner as described above with reference to FIGS. 16-19, i.e., each forward data pattern has two data edges. The digital power device controller 1820 generates a reference edge at the beginning of each forward data pattern 2000 during forward communication, and at the beginning of each reverse data pattern 2002 during reverse communication. Accordingly, the microprocessor 1814 of the digital power device controller 1820 executes a zero-crossing procedure (e.g., the zero-crossing procedure 600 as described above with reference to FIG. 11) at the zero-crossing of each half-cycle. The microprocessor 1814 sets a timer interrupt for an interrupt time equal to a present value $t_{TIMER}$ of the timer plus the reference time period $T_{REF}$ at step 614 only if the variable m is equal to zero at step 612 at the present zero-crossing to thus generate a reference edge at the timer interrupt in the first half-cycle of each forward and reverse data pattern.

Figure 30:
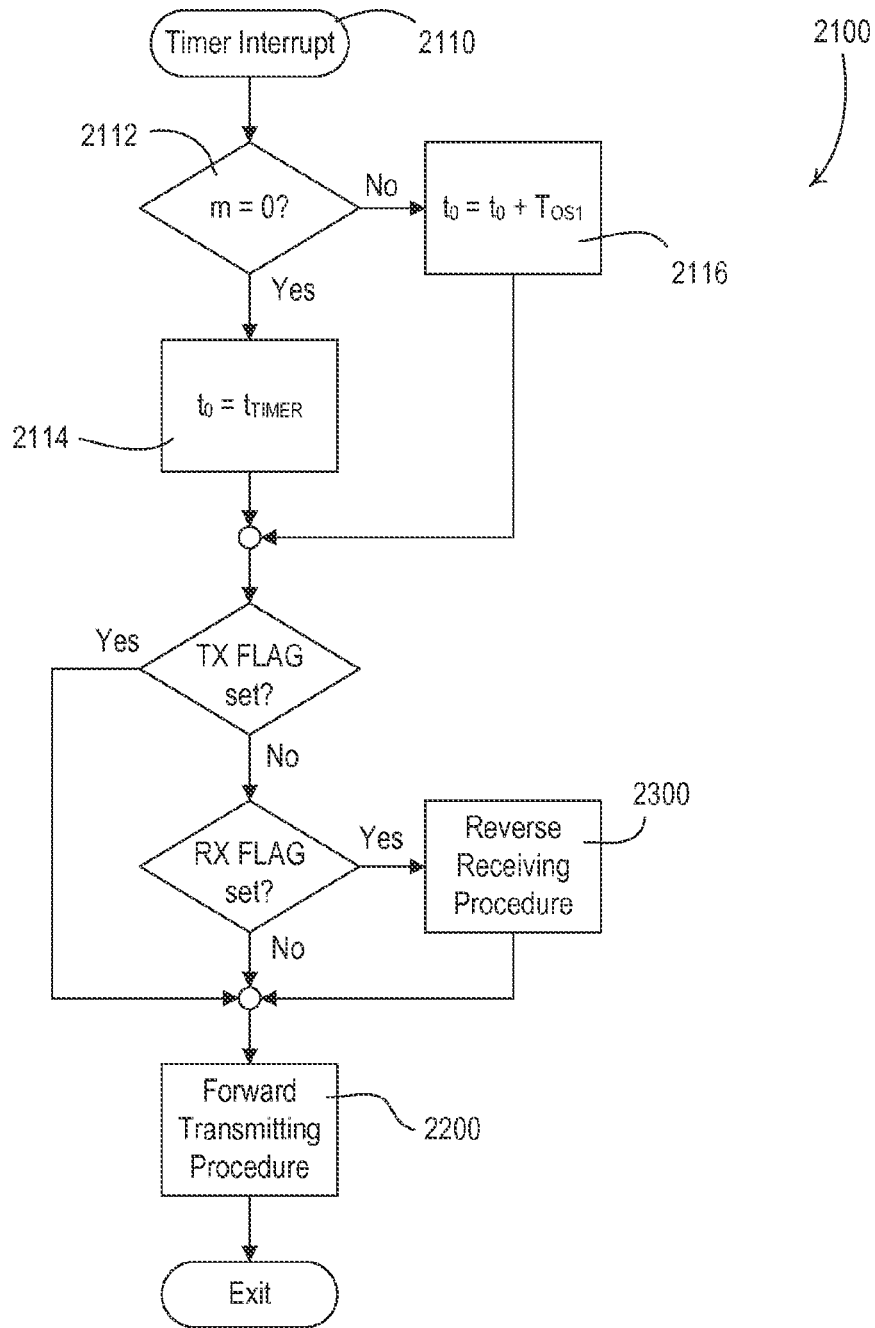
FIG. 30 is a simplified flowchart of a timer interrupt procedure executed by a digital power device controller.

FIG. 30 is a simplified flowchart of a timer interrupt procedure 2100 that is executed by the microprocessor 1814 of the digital power device controller 1820. The microprocessor 1814 may execute the timer interrupt procedure 2100 when the value of the timer equals the set interrupt time at step 2110, for example, as set during the zero-crossing procedure 600. During the timer interrupt procedure 2100, the microprocessor 1814 will execute either a forward transmitting procedure 2200 or a reverse receiving procedure 2300. The microprocessor 1814 uses a TX Flag to keep track of when the digital power device controller 1820 is presently transmitting a forward digital message to the power devices, and uses an RX Flag to keep track of when the digital power device controller is presently receiving a reverse digital message from the power devices.

If the variable m is equal to zero at step 2112 (i.e., a reference edge is to be generated during the present half-cycle), the microprocessor 1814 sets a base time to equal to the present value of the timer at step 2114. If the variable m is not equal to zero at step 2112, the microprocessor 1814 sets the base time to equal to the base time to from the previous half-cycle plus the first offset time period $T_{OS1}$ (i.e., the length of one half-cycle) at step 2116. If the TX Flag is set at step 2118, the microprocessor 1814 executes the forward transmitting procedure 2200, and the timer interrupt procedure 2100 exits. If the RX Flag is set at step 2120, the microprocessor 1814 executes the reverse receiving procedure 2300, before the timer interrupt procedure 2100 exits. If neither the TX Flag nor the RX Flag is set at steps 2118, 2120, the microprocessor 1814 executes the forward transmitting procedure 2200 since the digital power device controller 1820 continues to generate reference and data edges (as if the digital ballast controller was continuously transmitting bits "00") when the digital power device controller is not transmitting or receiving digital messages.

Figure 31:
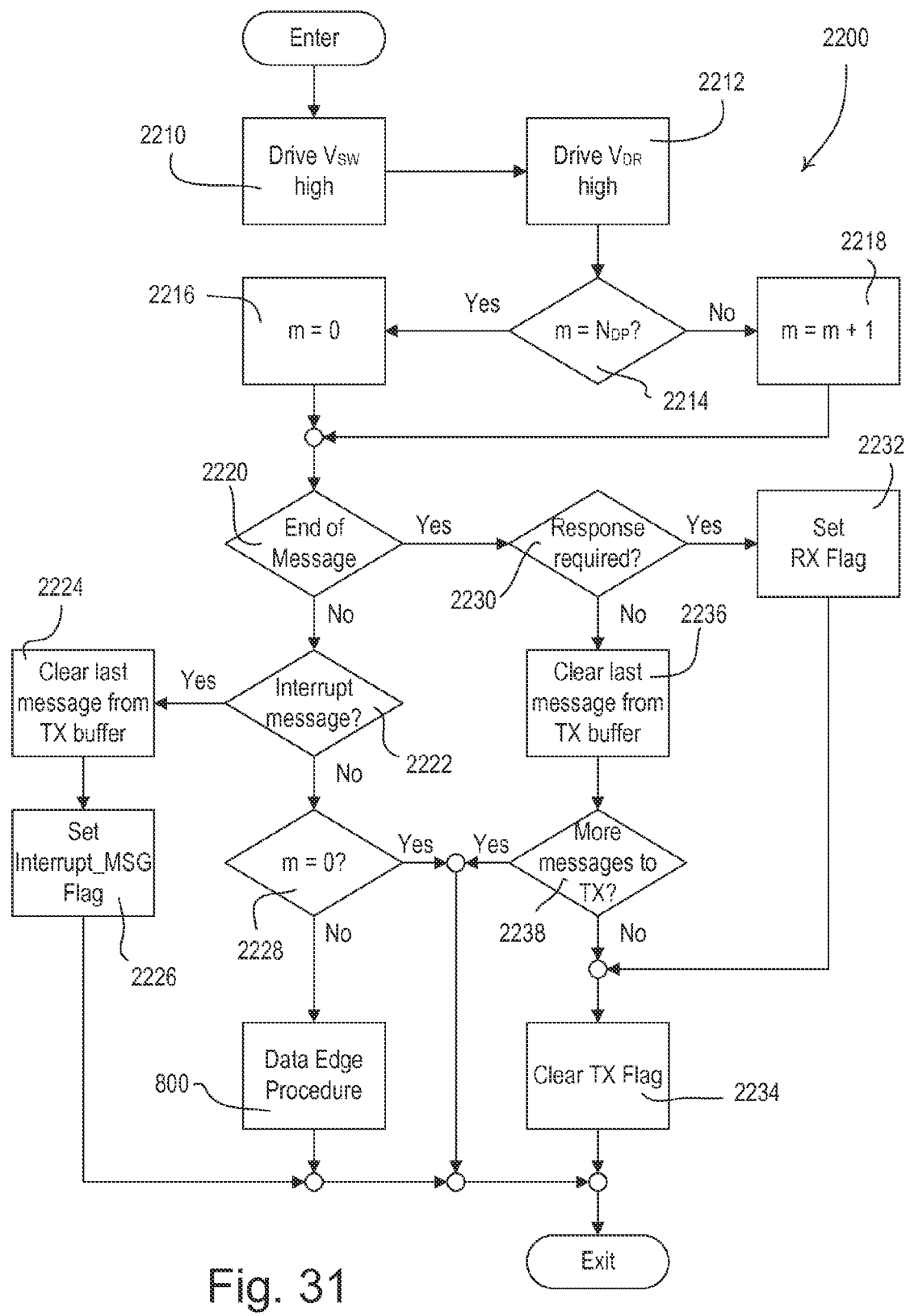
FIG. 31 is a simplified flowchart of a forward transmitting procedure executed by a digital power device controller.

FIG. 31 is a simplified flowchart of the forward transmitting procedure 2200 that is executed by the microprocessor 1814 of the digital power device controller 1820 at the timer interrupts when the TX Flag is set in the timer interrupt procedure 2100. The microprocessor 1814 first drives the switch control voltage $V_{SW}$ high at step 2210 to render the controllable switching circuit 1860 conductive and then drives the drive voltage $V_{DR}$ high at step 2212 to render the FET Q1852 of the gate coupling circuit 1850 conductive to thus render the triac 1810 conductive. If the variable m is equal to the number $N_{DP}$ of data edges in each forward data pattern (i.e., two) indicating the end of the present forward data pattern at step 2214, the microprocessor 1814 sets the variable m equal to zero at step 2216. If the variable m is not equal to the number $N_{DP}$ of data edges in each forward data pattern at step 2214, the microprocessor 1814 increments the variable m by one at step 2218.

If the digital power device controller 1820 is not finished transmitting the present forward digital message at step 2220, the microprocessor 1814 determines if there is a higher priority message to transmit at step 2222. If the microprocessor 1814 has a higher priority message to transmit and should interrupt the digital message that is presently being transmitted at step 2222, the microprocessor clears the last message from the TX buffer at step 2224 and sets an Interrupt_MSG Flag at step 2226, before the forward transmitting procedure 2200 exits. If there is not a higher priority message to transmit at step 2222 and the variable m is not equal to zero at step 2228, the microprocessor 1814 executes a data edge procedure (e.g., the data edge procedure 800 as described above with reference to FIG. 13), before the forward transmitting procedure 2200 exits. During the data edge procedure 800, the microprocessor 1814 sets the interrupt time of the next timer interrupt equal to the base time to plus the start symbol time period $T_{START}$ at step 816 if the microprocessor 1814 is presently transmitting the first bit of a start pattern, and sets a timer interrupt for the interrupt time of the next timer interrupt equal to the base time to plus the first offset time period $T_{OS1}$ at step 816 if the microprocessor 1814 is presently transmitting the second bit of the start pattern. The start symbol time period $T_{START}$ may be equal to approximately 8.68 milliseconds (i.e., 450 microseconds longer than the first offset time period $T_{OS1}$).

However, if the digital power device controller 1820 just transmitted the last two bits of the present forward digital message in the data edge procedure 800 (i.e., it is the end of the forward digital message) at step 2220, the microprocessor 1814 then determines if a response to the forward digital message is required based on the nature of the command or query in the forward digital message at step 2230. If a response is required from the power devices 1710 at step 2230, the microprocessor 1814 sets the RX Flag at step 2232 and clears the TX Flag at step 2234, before the forward transmitting procedure 2200 exits. If a response is not required at step 2230, the microprocessor 1814 clears the last forward digital message from the TX buffer at step 2236. If there are not more forward digital messages in the TX buffer at step 2238, the microprocessor 1814 clears the TX Flag at step 2234 and the forward transmitting procedure 2200 exits.

Figure 32:
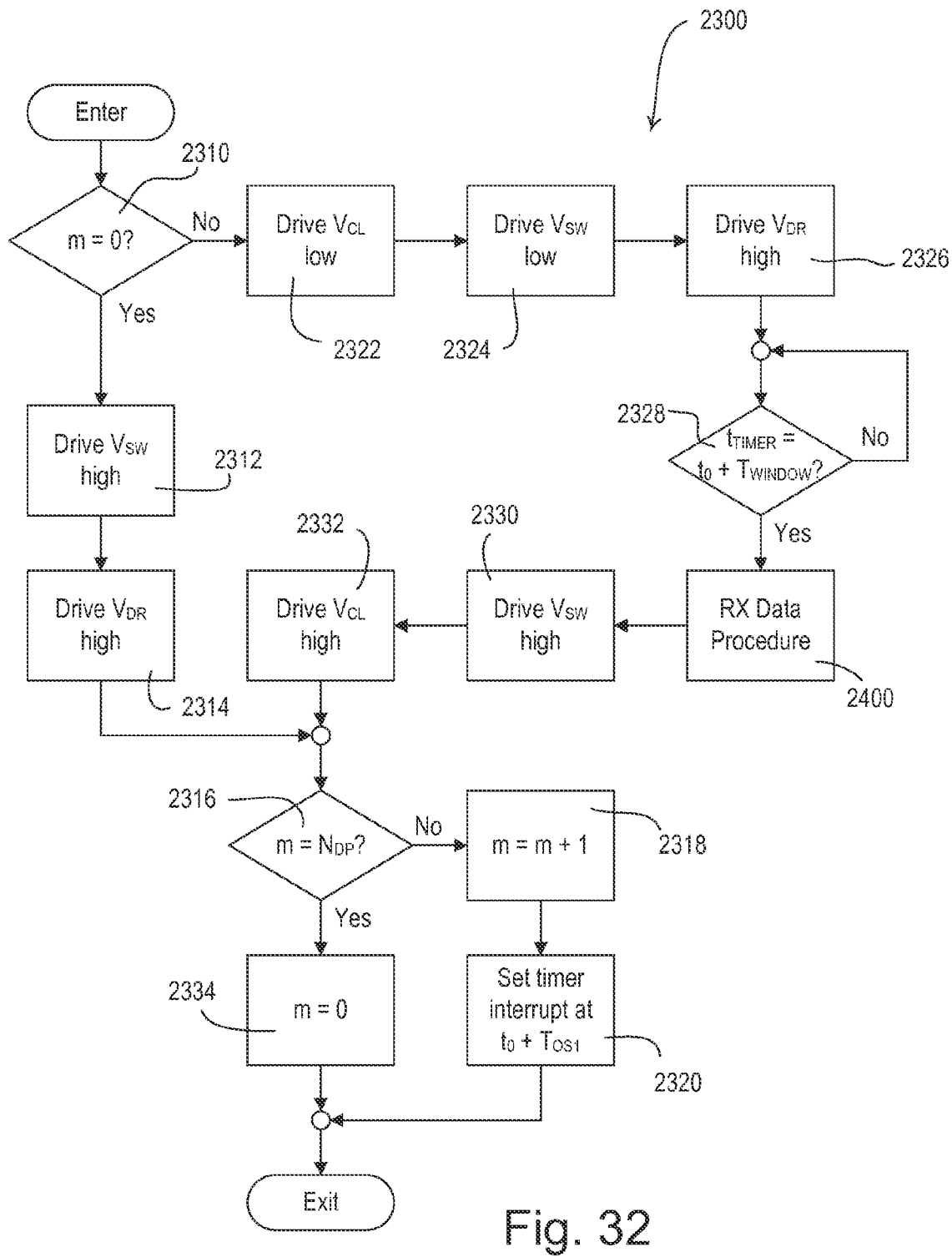
FIG. 32 is a simplified flowchart of a reverse receiving procedure executed by a digital power device controller.

FIG. 32 is a simplified flowchart of the reverse receiving procedure 2300 that is executed by the microprocessor 1814 of the digital power device controller 1820 at the timer interrupts when the RX Flag is set in the timer interrupt procedure 2100. If the variable m is equal to zero at step 2310, the microprocessor 1814 drives the switch control voltage $V_{SW}$ high at step 2312 to render the controllable switching circuit 1860 conductive and then drives the drive voltage $V_{DR}$ high at step 2212 to render the FET Q1852 of the gate coupling circuit 1850 conductive to thus render the triac 1810 conductive. If the variable m is not equal to the number $N_{DP}$ of data edges in each reverse data pattern (i.e., two) at step 2316, the microprocessor 1814 increments the variable m by one at step 2318 and sets the interrupt time of the next timer interrupt equal to the base time to (as determined at step 2114 of the timer interrupt procedure 2100) plus the first offset time period $T_{OS1}$ at step 2320, before the reverse receiving procedure 2300 exits.

When the timer interrupt occurs and the reverse receiving procedure 2300 is executed once again, the variable m will not be equal to one at step 2310 and the microprocessor 1814 prepares to receive data of a reverse digital message from the power devices during the window time period $T_{WIN}$. Specifically, the microprocessor 1814 drives the current-limit control signal $V_{CL}$ low at step 2322 to render the current-limit circuit 1830 non-conductive to prevent the power supply 1821 from charging. The microprocessor 1814 then drives the switch control voltage $V_{SW}$ low at step 2324 to render the controllable switching circuit 1860 non-conductive and then drives the drive voltage $V_{DR}$ high at step 2326 to render the FET Q1852 of the gate coupling circuit 1850 conductive. Since the controllable switching circuit 1860 is non-conductive, the triac 1810 is not rendered conductive. However, the current sink circuit 1984 of each of the power devices is able to conduct the active load current through the FET Q1852.

The microprocessor 1814 then waits until the end of the window time period $T_{WIN}$ at step 2328. When the present value $t_{TIMER}$ of the timer is equal to the base time to plus the length of the window time period $T_{WIN}$ at step 2328, the microprocessor 1814 executes a receive data procedure 2400, which will be explained in greater detail below with reference to FIG. 33. The microprocessor 1814 then drives the switch control voltage $V_{SW}$ high at step 2330 to render the controllable switching circuit 1860 conductive, such that the triac 1810 is rendered conductive at the end of the window time period $T_{WIN}$. The microprocessor 1814 also drives the current-limit control signal $V_{CL}$ high at step 2332, such that the power supply 1821 will be able to begin charging again when the triac 1810 is non-conductive at the beginning of the next half-cycle. If the variable m is not equal to the number $N_{DP}$ of data edges in each reverse data pattern at step 2316, the microprocessor 1814 increments the variable m by one at step 2318 and sets the interrupt time of the next timer interrupt equal to the base time to plus the first offset time period $T_{OS1}$ at step 2320, before the reverse receiving procedure 2300 exits. When the variable m is equal to the number $N_{DP}$ of data edges in each reverse data pattern at step 2316, the microprocessor 1814 sets the variable m equal to zero at step 2334 and the reverse receiving procedure 2300 exits.

Figure 33:
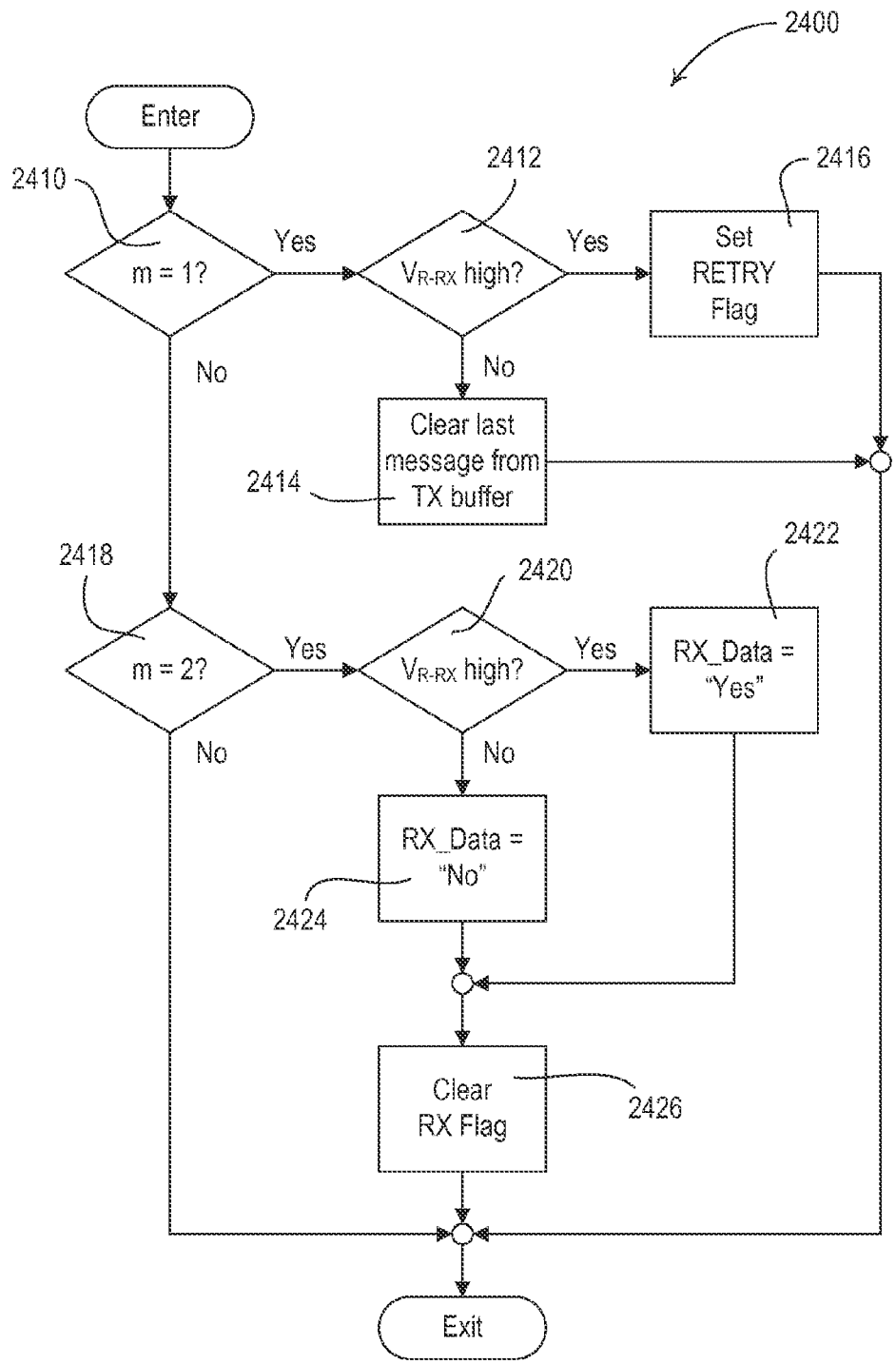
FIG. 33 is a simplified flowchart of a receive data procedure executed by a digital power device controller.

FIG. 33 is a simplified flowchart of the receive data procedure 2400, which is executed by the microprocessor 1814 at the end of the window time period $T_{WIN}$ when the digital power device controller 1820 is receiving a reverse digital message. If the variable m is equal to one at step 2410 (i.e., it is the second half-cycle of the reverse digital message 2002) and the magnitude of the reverse communication receive signal $V_{R\_RX}$ is not high at step 2412 (i.e., indicating that the magnitude of the controller-drop voltage $V_{CD}$ is below the reverse communication threshold $V_{RC-TH}$ at the end of the window time period $T_{WIN}$), the microprocessor 1814 determines that acknowledgements have been received from all of the power devices coupled to the digital power device controller 1820. The microprocessor 1814 then clears the last forward digital message from the TX buffer at step 2414 and the receive data procedure 2400 exits. If the magnitude of the reverse communication receive signal $V_{R-RX}$ is high at step 2412 (i.e., indicating that the magnitude of the controller-drop voltage $V_{CD}$ is above the reverse communication threshold $V_{RC-TH}$ at the end of the window time period $T_{WIN}$), the microprocessor 1814 determines that at least one of the power devices did not transmit an acknowledgement and sets a RETRY Flag at step 2416, before the receive data procedure 2400 exits.

If the variable m is equal to two at step 2418 (i.e., it is the third half-cycle of the reverse digital message 2002) and the magnitude of the reverse communication receive signal $V_{R-RX}$ is high at step 2420, the microprocessor 1814 sets the value of the received data RX_Data equal to "Yes" (or a logic one) at step 2422. If the magnitude of the reverse communication receive signal $V_{R-RX}$ is low at step 2420, the microprocessor 1814 sets the value of the received data RX_Data equal to "No" (or a logic zero) at step 2424. After setting the value of the received data RX_Data at step 2422, 2424, the microprocessor 1814 clears the RX Flag at step 2426 and the receive data procedure 2400 exits.

Figure 34:
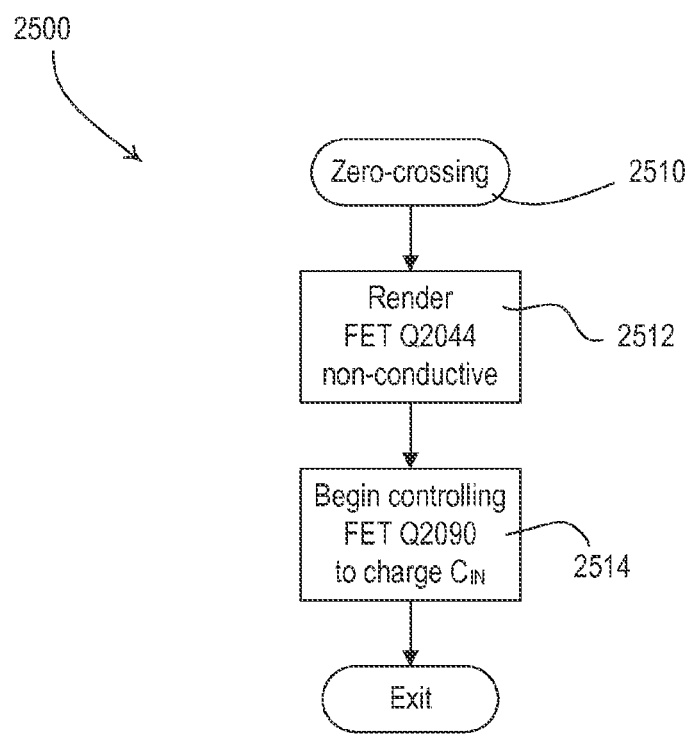
FIG. 34 is a simplified flowchart of a zero-crossing procedure executed by a digital dimming ballast.

FIGS. 34-38 show example flowcharts executed by a control circuit of a power device (e.g., the microprocessor 1960 of the digital dimming ballast 1710, 1910) to receive forward digital messages and transmit reverse digital messages. Specifically, FIG. 34 is a simplified flowchart of a zero-crossing procedure 2500 executed periodically by the microprocessor 1960 of the digital dimming ballast 1710 when the magnitude of the control-hot voltage $V_{CH}$ drops below the falling threshold $V_{TH-F}$ at step 2510, i.e., at the beginning of each half-cycle. During the zero-crossing procedure 2500, the microprocessor 1960 renders the FET Q2044 non-conductive at step 2512 and begins controlling the FET Q2090 to charge the input capacitor $C_{IN}$ from the bus voltage $V_{BUS}$ at step 2514, before the zero-crossing procedure 2500 exits.

Figure 35:
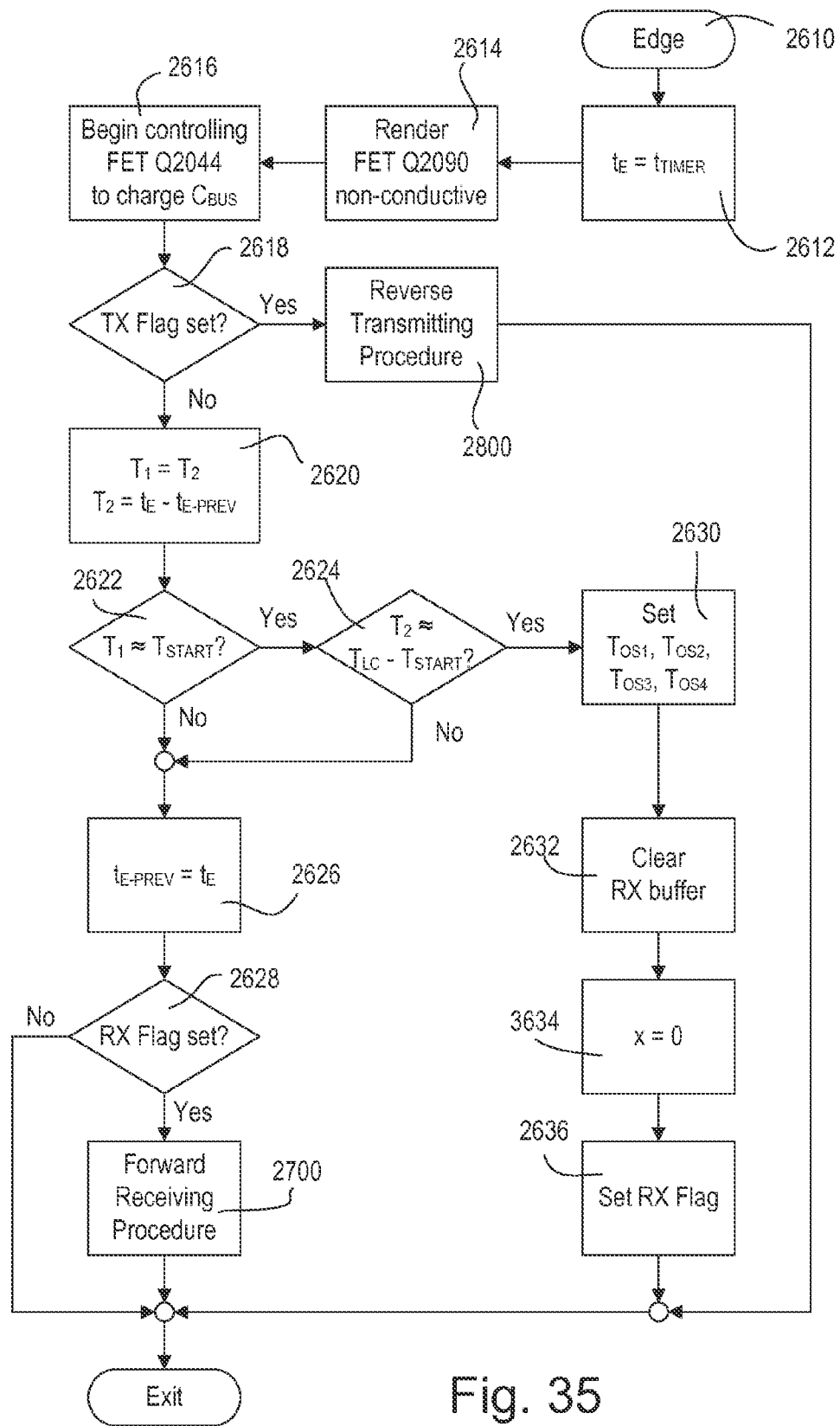
FIG. 35 is a simplified flowchart of a rising edge procedure executed by a digital dimming ballast.

FIG. 35 is a simplified flowchart of a rising edge procedure 2600 executed by the microprocessor 1960 or 2060 of each digital dimming ballast 1910 when the magnitude of the control-hot voltage $V_{CH}$ rises above the rising threshold $V_{TH-R}$ at step 2610. The microprocessor 1960 uses an RX Flag to keep track of when the digital dimming ballast 1910 is presently receiving a forward digital message from the digital power device controller 1820, and uses a TX Flag to keep track of when the digital dimming ballast is presently transmitting a reverse digital message to the digital power device controller. The microprocessor 1960 first sets the rising edge time $t_E$ equal to the present value $t_{TIMER}$ of the timer at step 2612. The microprocessor 1960 then renders the FET Q2090 non-conductive at step 2614 and begin controlling the FET Q2044 to charge the bus capacitor $C_{BUS}$ from the input voltage $V_{IN}$ at step 2616.

If the TX Flag is not set at step 2618, the microprocessor 1960 monitors the control-hot voltage $V_{CH}$ to determine if the digital power device controller 1720 has transmitted a start pattern to start a new forward digital message (as described above). The microprocessor 1960 determines the last two time periods $T_1$, $T_2$ between the rising edges of the control-hot voltage $V_{CH}$ at step 2620 by setting the first time period $T_1$ equal to the previous second time period $T_2$ and setting the second time period $T_2$ equal to the rising edge time $t_E$ minus a previous rising edge time $t_{E\text{-}PREV}$. Next, the microprocessor 1960 determines if the last two time periods $T_1$, $T_2$ between the rising edges of the control-hot voltage $V_{CH}$ are approximately equal to time periods $T_{START}$ and $T_{LC}\text{-}T_{START}$, respectively. Specifically, if the first period $T_1$ is not within the default tolerance $\Delta T_{OS}$ of the start symbol offset time period $T_{START}$ at step 2622, and the second period $T_2$ is not within the default tolerance $\Delta T_{OS}$ of the difference between the line-cycle time period $T_{LC}$ and the start symbol offset time period $T_{START}$ at step 2624, the microprocessor 1960 determines that a start pattern was not received, and sets the previous rising edge time $t_{E\_PREV}$ equal to the present rising edge time $t_E$ at 2626. If the RX Flag is not set at step 2628, the rising edge procedure 2600 simply exits.

If the microprocessor 1960 received a start pattern at steps 2622, 2624, the microprocessor 1960 first sets the new values of the time periods $T_{OS1}$, $T_{OS2}$, $T_{OS3}$, $T_{OS4}$, at step 2630, i.e., $$T_{OS1}=(T_1+T_2)/2;$$

$$T_{OS2}=T_{OS1}+\Delta T_{OS};$$

$$T_{OS3}=T_{OS1}+2\cdot\Delta T_{OS};\text{ and}$$

$$T_{OS4}=T_{OS1}+3\cdot\Delta T_{OS}.$$

The microprocessor 1960 then clears the RX buffer at step 2632, sets the variable x to zero at step 2634, and sets the RF Flag at step 2636, before the rising edge procedure 2600 exits. When the RX Flag is set at step 2628, the microprocessor 1960 executes a forward receiving procedure 2700, which will be described in greater detail below with reference to FIG. 36. When the TX Flag is set at step 2618, the microprocessor 1960 executes a reverse transmitting procedure 2800, which will be described in greater detail below with reference to FIG. 37.

Figure 36:
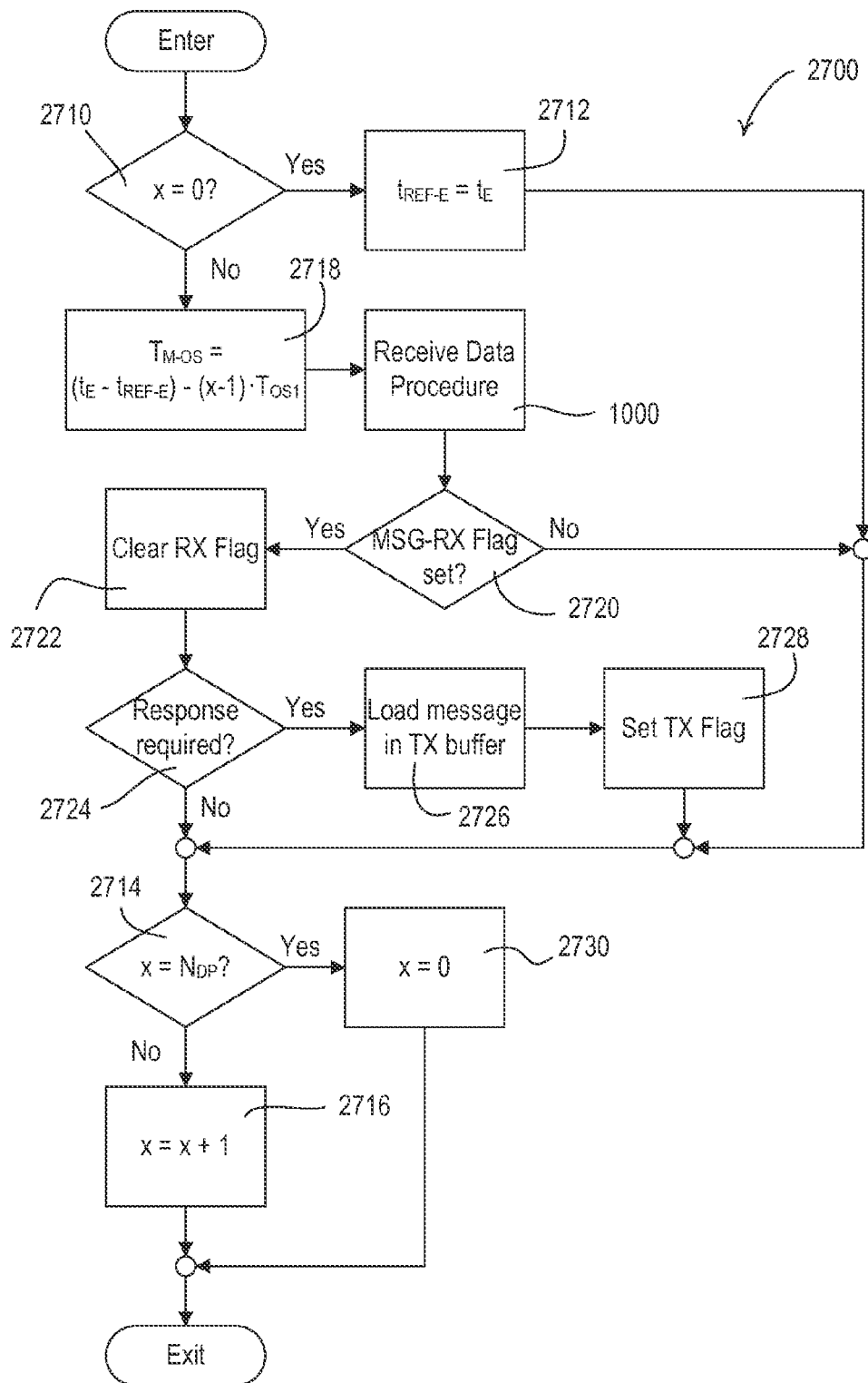
FIG. 36 is a simplified flowchart of a forward receiving procedure executed by a digital dimming ballast.

FIG. 36 is a simplified flowchart of the forward receiving procedure 2700 executed by the microprocessor 1960 of each digital dimming ballast 1710 when the RX Flag is set during the rising edge procedure 2600. If the variable x is equal to zero at step 2710, the microprocessor 1960 determines that the rising edge that was just received is a reference edge of a forward data pattern, and sets a reference edge time $t_{REF\text{-}E}$ equal to the rising edge time $t_E$ (from step 2612 of the rising edge procedure) at step 2712. If the variable x is not equal to the number $N_{DP}$ of data edges in each forward data pattern at step 2714, the microprocessor 1960 increments the variable x by one at step 2716 and the forward receiving procedure 2700 exits. If the variable x is not equal to zero at step 2710, the microprocessor 1960 determines that the rising edge that was just received is a data edge of a forward data pattern, and calculates the measured offset time $T_{M\text{-}OS}$ in dependence upon the variable x at step 2718, i.e., $$T_{M\text{-}OS}=(t_E-t_{REF\text{-}E})-(x-1)\cdot T_{OS1}.$$

The microprocessor 1960 then executes a receive data procedure (e.g., the receive data procedure 1000 as described above with reference to FIG. 15) to determine the bits of data that are encoded in the measured offset time $T_{M\text{-}OS}$.

If the MSG-RX Flag is set at step 2720 indicating that a complete forward digital messages has been received (as set at step 1032 of the receive data procedure 1000), the microprocessor 1960 clears the RX Flag at step 2722. If the received forward digital message requires a response at step 2724, the microprocessor 1960 loads a reverse digital message including an appropriate response to the received forward digital message into the TX buffer at step 2726 and sets the TX Flag at step 2728. If the variable x is equal to the number $N_{DP}$ of data edges in each forward data pattern at step 2714, the microprocessor 1960 sets the variable x equal to zero at step 2730 and the forward receiving procedure 2700 exits.

Figure 37:
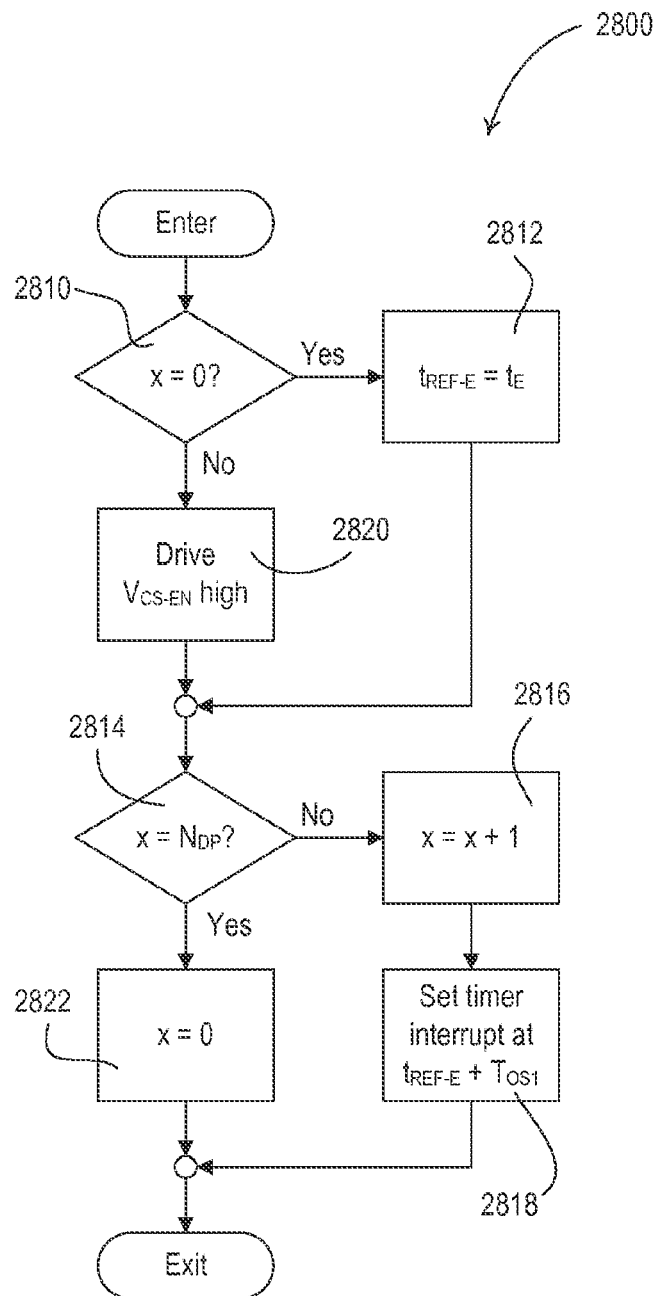
FIG. 37 is a simplified flowchart of a reverse transmitting procedure executed by a digital dimming ballast.

FIG. 37 is a simplified flowchart of the reverse transmitting procedure 2800 executed by the microprocessor 1960 of the digital dimming ballast 1910 when the TX Flag is set during the rising edge procedure 2600. If the variable x is equal to zero at step 2810 (i.e., it is the first half-cycle of the reverse digital message), the microprocessor 1960 sets the reference edge time $t_{REF\text{-}E}$ equal to the to the rising edge time $t_E$ (from step 2612 of the rising edge procedure 2600) at step 2812. If the variable x is not equal to the number $N_{DP}$ of data edges in each reverse data pattern at step 2814, the microprocessor 1960 increments the variable x by one at step 2816 and sets the interrupt time of the next timer interrupt equal to the base time to plus the first offset time period $T_{OS1}$ at step 2818, before the reverse transmitting procedure 2800 exits.

At the timer interrupt, the microprocessor 1960 will execute a reverse transmit data procedure 2900 to transmit an ACK pulse 2007 and a "yes" pulse 2008 or a "no" pulse 2009 as will be described in greater detail below with reference to FIG. 38. The timer interrupt is timed to occur at the beginning of the window time period $T_{WIN}$ in each of the second and third half-cycles of the reverse digital message 2002. During the window time period $T_{WIN}$, the microprocessor 1960 disables the current sink circuit 1984. When the triac 1810 of the digital power device controller 1820 is rendered conductive at the end of the window time period $T_{WIN}$, the microprocessor 1960 will execute the rising edge procedure 2600 and the reverse transmitting procedure 2800. During the reverse transmitting procedure 2800, when the variable x is not equal to zero at step 2810, the microprocessor 1960 drives the current sink enable control signal $V_{CS\text{-}EN}$ high at step 2820 to enable to the current sink circuit 1984. If the variable x is equal to the number $N_{DP}$ of data edges in each reverse data pattern at step 2814, the microprocessor 1960 sets the variable x equal to zero at step 2822 and the reverse transmitting procedure 2800 exits.

Figure 38:
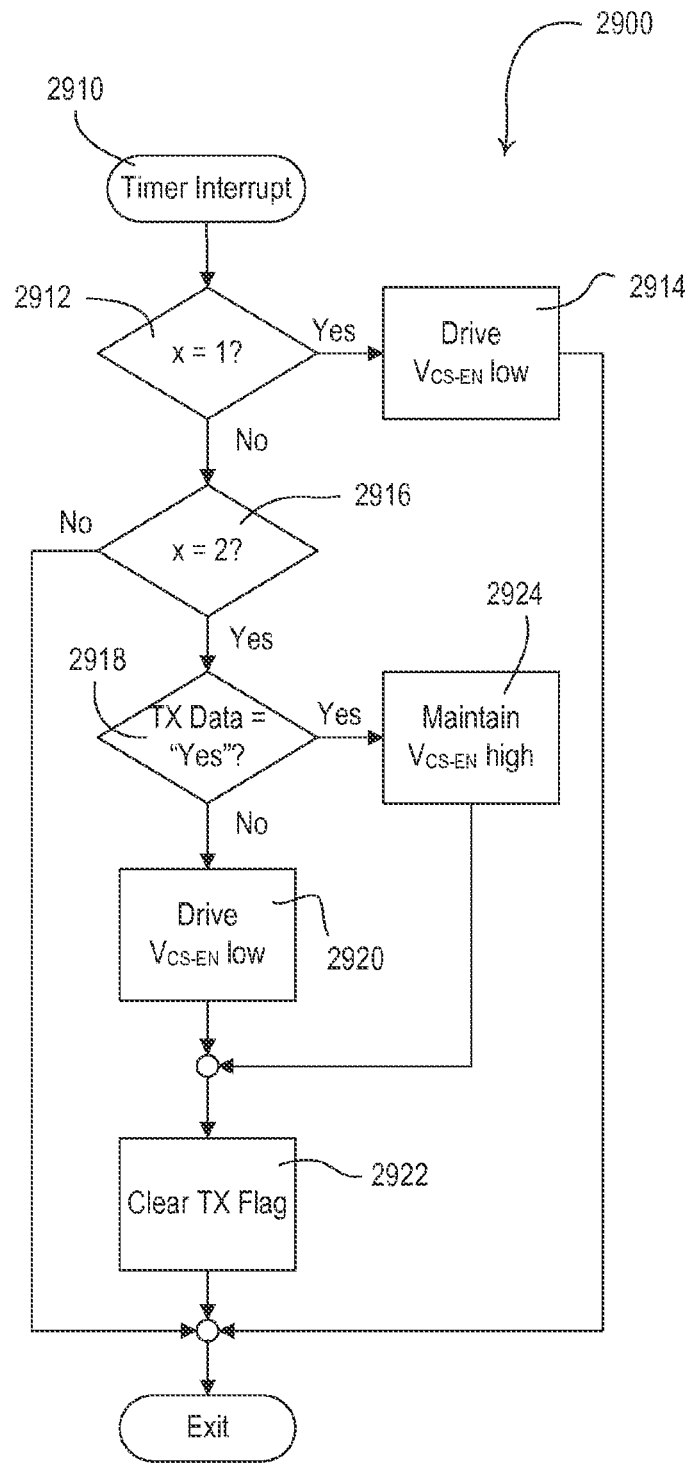
FIG. 38 is a simplified flowchart of a reverse transmit data procedure executed by a digital dimming ballast.

FIG. 38 is a simplified flowchart of the reverse transmit data procedure 2900, which is executed by the microprocessor 1960 of the digital dimming ballast 1910 when the value of the timer equals the set interrupt time at step 2910. If the variable x is equal to one at step 2912 (i.e., it is the second half-cycle of the reverse digital message), the microprocessor 1960 drives the current sink enable control signal $V_{CS\text{-}EN}$ low at step 2914 to disable the current sink circuit 1984 and thus transmit an ACK pulse 2007, before the reverse transmit data procedure 2900. If the variable x is equal to two at step 2916 (i.e., it is the third half-cycle of the reverse digital message), the microprocessor 1960 transmits a "yes" pulse 2008 or a "no" pulse 2009. Specifically, if the transmit data TX_Data is "Yes" (i.e., a logic one) at step 2918, the microprocessor 1960 maintains the current sink enable control signal $V_{CS-EN}$ high at step 2920, and clears the TX Flag at step 2922, before the reverse transmit data procedure 2900 exits. If the transmit data TX_Data is "No" (i.e., a logic zero) at step 2918, the microprocessor 1960 drives the current sink enable control signal $V_{CS-EN}$ low at step 2924, and clears the TX Flag at step 2922, before the reverse transmit data procedure 2900 exits.

Alternatively, the power devices of the load control system 1700 may be operable to transmit reverse digital messages that each have multiple bits of data to the digital power device controller 1720. In addition, the power devices may be able to receive the reverse digital messages transmitted by the other power devices. Therefore, the power devices can transmit more feedback information to the digital power device controller 1720. For example, the digital dimming ballast 1710 may be operable to transmit the present lighting intensity of the controlled lamp 1704 or the present power consumption of the ballast. In addition, a line-voltage daylight sensor coupled to the digital power device controller 1720 could transmit the actual total light level measured by the daylight sensor to the digital power device controller. The digital power device controller 1720 may receive information regarding the reliability and robustness of the communications provided with the power devices across the circuit wiring 1714.

FIG. 39A is an example diagram of a message structure for a forward digital message transmitted by a digital power device controller (e.g., the digital ballast controller 1720 of the load control system shown in FIG. 24). Each forward digital message may comprise a total number $N_{DM}$ of bits (e.g., 26 bits). The first four bits comprises a start pattern, which includes a unique start symbol as will be described in greater detail below with reference to FIG. 8. The start pattern is followed by a payload, which may comprise 17 bits. For example, the payload may comprise the link address of the digital dimming ballast 1710 to which the forward digital messages is being transmitted and an intensity level to which the digital dimming ballast 1710 should control the respective lamp 1704. The payload may also comprise a query type and a query message. If the forward digital message is being transmitted to upgrade settings or firmware of a power device, the payload may simply comprise data. Each digital message concludes with five bits that are used to determine if an error occurred during transmission and reception of the digital message (e.g., a checksum).

FIG. 39B is an example diagram of a forward digital message 3000 and a reverse digital message 3002 having multiple bits of data. For example, the forward digital message 3000 may be transmitted from the digital ballast controller 1720 to the power devices and the reverse digital message 3002 may be transmitted from one of the power devices to the digital ballast controller. The power devices are configured to transmit a reverse digital message 3002 in response to receiving a forward digital message 3000 from the digital power device controller 1720, e.g., immediately following the forward digital messages as shown in FIG. 39B. Each forward digital message 3000 may include a command or a query and have a total number $N_{FM}$ of bits that require a predetermined number of line cycles to transmit. The last half-cycle of the forward digital message 3000 may comprise a window time period $T_{WIN}$ for the power devices to transmit an acknowledgement (as will be described in greater detail below). Each reverse digital message 3002 may comprise, a total number $N_{RM}$ of bits (e.g., 8 bits), and may extend for three line cycles. The power devices may also be configured to transmit a reverse digital message without receiving a forward digital message from the digital power device controller 1720.

Figure 40:
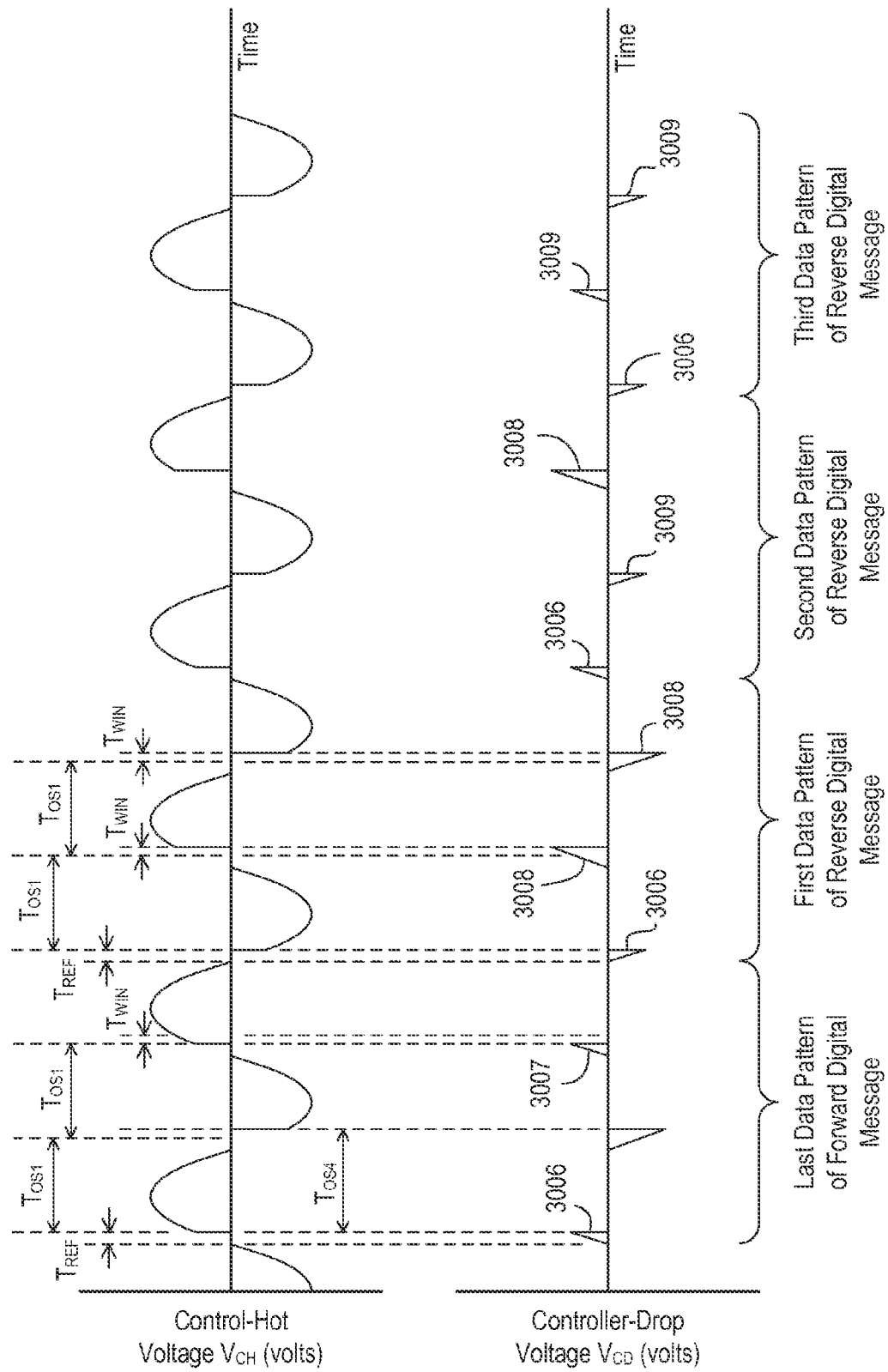
FIG. 40 is a simple timing diagram of a control-hot voltage and a controller-drop voltage showing an example reverse digital message.

FIG. 40 is an example timing diagram (e.g., of the control-hot voltage $V_{CH}$ and the controller-drop voltage $V_{CD}$ of the load control system 1700 of FIG. 24) showing an example reverse digital message. As mentioned above, the power devices are operable to transmit an ACK pulse 3007 during the last half-cycle of the forward digital message 3000 (e.g., such that each forward digital message may require 10.5 line cycles to transmit). The power devices may then immediately begin transmitting data in the first data pattern of the reverse digital message. For example, the power devices may transmit a "logic one" pulse 3008 by enabling the current sink circuit 1984 to allow the magnitude of the controller-drop voltage $V_{CD}$ to increase above the reverse communication threshold $V_{RC-TH}$. In addition, the power devices may transmit a "logic zero" pulse 3009 by disabling the current sink circuit 1984 to control the magnitude of the controller-drop voltage $V_{CD}$ to approximately zero volts.

The power devices may also be operable to receive a reverse digital message (e.g., the reverse digital message shown in FIG. 40) that is transmitted by the other power devices coupled to the digital power device controller 1720. While each power device is transmitting a reverse digital message, the power device is further operable to determine if another power device is also transmitting a reverse digital message at the same time. For example, if the power device is transmitting a "logic zero" pulse 3009, the power device is operable to monitor the magnitude of the control-hot voltage $V_{CH}$ while the power device has disabled the current sink circuit 1984 to determine if another control device is transmitting a "logic one" pulse 3008. If so, the power device ceases transmitting the reverse digital message to allow the other power device to finish transmitting.

The power devices may be operable to transmit reverse digital messages having more than the total number $N_{RM}$ of bits (i.e., 8 bits). For example, the power devices may be operable to transmit the data of a reverse digital message in multiple packets 3002A, 3002B, 3002C as shown in FIG. 39B. After each packet 3002A, 3002B, the digital power device controller 1720 is operable to transmit a continuation pattern (or packet) 3004, which may be a short pattern that may extend for, e.g., three half cycles, i.e., equal to the length of a data pattern, but less than the length of an entire forward digital message. Each of the packets 3002A, 3002B, 3002C may comprise a total number $N_{RM-PKT}$ of bits (e.g., 8 bits). Thus, as shown in FIG. 39B, a total number $N_{RM-TOTAL}$ of bits of each entire reverse digital message having three packets 3002A, 3002B, 3002C may be equal to 24 bits. Alternatively, the reverse digital messages may comprise other numbers of packets, such that the total number $N_{RM-TOTAL}$ of bits of each entire reverse digital message may equal a different number of bits.

The digital power device controller 1720 is operable to transmit the continuation pattern 3004 using an old offset time period $T_{OS1-OLD}$ from the previous packet (e.g., packet 3002A) and a new offset time period $T_{OS1-NEW}$ that will be used in the next packet (e.g., packet 3002B). Specifically, the digital power device controller 1720 transmits the continuation pattern by generating a reference edge during a first half-cycle, rendering the controllably conductive device conductive in a second subsequent half-cycle at the old offset time period $T_{OS1-OLD}$ plus the offset period difference ΔT$_{OS}$ (e.g., approximately 100 microseconds) from the reference edge in the first half-cycle, and then rendering the controllably conductive device conductive after two times the new offset time period T$_{OS1-NEW}$ from the reference edge in the first half-cycle. The continuation pattern allows the power devices to synchronize the values of the offset time periods T$_{OS1}$, T$_{OS2}$, T$_{OS3}$, T$_{OS4}$ with those being used by the digital power device controller 1720. The power devices are operable to measure the line-cycle time period T$_{LC}$ (i.e., two times the new offset time period T$_{OS1-NEW}$) from the continuation pattern and update the values of the offset time periods T$_{OS1}$, T$_{OS2}$, T$_{OS3}$, T$_{OS4}$ using the new offset time period T$_{OS1-NEW}$.

One bit of each packet 3002A, 3002B, 3002C may comprise a parity bit for confirming the integrity of the data of that packet. For example, the parity bit may be set to zero if the number of ones in the packet is an odd number, and may be set to one if the number of zeros in the packet is an even number. If the parity bit of a packet (e.g., the packet 3002A) received by the digital power device controller 1720 indicates that there may be an error in the packet, the digital power device controller 1720 is operable to transmit a retry pattern (or packet) 3009 instead of the continuation pattern 3004 as shown in FIG. 39D. The retry pattern 3009 is a short pattern that may extend for, e.g., three half cycles, i.e., the length of a data pattern, but may be different than the continuation pattern 3004. If a power device receives a retry pattern 3009 after transmitting a packet of a reverse digital message (e.g., the packet 3002A), the power device will retransmit the packet as shown in FIG. 39D. If the second transmission of the packet 3002A is received without error, the digital ballast controller 1720 will transmit the continuation pattern 3004 and the power device will transmit the next packet 3002B.

The digital power device controller 1720 may also be operable to transmit query commands to which all of the power devices connected to the digital power device controller 1720 may respond to individually (i.e., at different times), for example, in sequential order based on their link addresses. For example, the power devices may each be operable to transmit a reverse digital message 3002, 3006, 3008 in response to a single forward digital message 3000 as shown in FIG. 39E. The digital power device controller 1720 may be operable to transmit the continuation pattern 3004 after each reverse digital message 3002, 3006, 3008. If the parity bit of one of the reverse digital messages 3002, 3006, 3008 indicates that there may be an error in the reverse digital message, the digital power device controller 1720 is operable to transmit the retry pattern 3009 instead of the continuation pattern 3004 as shown in FIG. 39F. If a power device receives a retry pattern 3009 after transmitting a reverse digital message (e.g., the reverse digital message 3002 shown in FIG. 39F), the power device will retransmit the reverse digital message. If the second transmission of the reverse digital message 3002 is received without error, the digital ballast controller 1720 will transmit the continuation pattern 3004 and the next power device will transmit the next reverse digital message 3006.

As shown in FIG. 39G, the digital power device controller 1720 may be operable to transmit multiple-packet forward digital messages (e.g., having packets 3000A, 3000B) to the power devices, for example, to transmit a firmware upgrade to the power devices. The digital power device controller 1720 may transmit the continuation pattern 3002 between the packets 3000A, 3000B of the multiple-packet forward digital message.

In addition, the digital power device controller 1720 may be operable to transmit a start pattern immediately following a reverse digital message to start a new forward digital message as shown in FIG. 39H. For example, the digital power device controller 1720 may be operable transmit a new forward digital message 3000C after a first packet 3002A of a reverse digital message (rather than transmitting the continuation pattern 3004 as shown in FIG. 39C). Further, the digital power controller 1720 may be operable to start transmitting bits "00" to cause the power devices to do nothing and return to the idle state.

As previously mentioned, the digital power device controller 1720 is operable to assign link addresses to the power devices during the commissioning procedure of the two-way load control system 1700. The power devices may be operable to randomly generate a random address (which may be the same length as the link addresses). The digital power device controller 1720 may be operable to transmit a broadcast forward digital message (e.g., a query message having the question "What is your random address?") to all of the power devices. The power devices that have not been assigned a link address may respond to the broadcast message by transmitting a reverse digital message including their random address. While transmitting their random address, the power devices are operable to monitor the magnitude of the control-hot voltage V$_{CH}$ to determine if another control device is transmitting its random address. Specifically, if a power device is transmitting a "logic zero" pulse 3009 of its random address, the power device is operable to monitor the magnitude of the control-hot voltage V$_{CH}$ (while the power device has disabled the current sink circuit 1984) to determine if another control device is transmitting a "logic one" pulse 3008. If so, the power device ceases transmitting its random address. Eventually, one power device remains transmitting its random address, which is fully received by the digital power device controller 1720. The digital power device controller 1720 then assigns a new link address to the remaining power device and transmits a forward digital message including the new link address to the power device having the random address that was just received. The digital power device controller 1720 may then assign link addresses to the other power devices by repeating the process, i.e., by transmitting a broadcast forward digital message (e.g., a query message having the question "What is your random address?") to all of the power devices.

Figure 41:
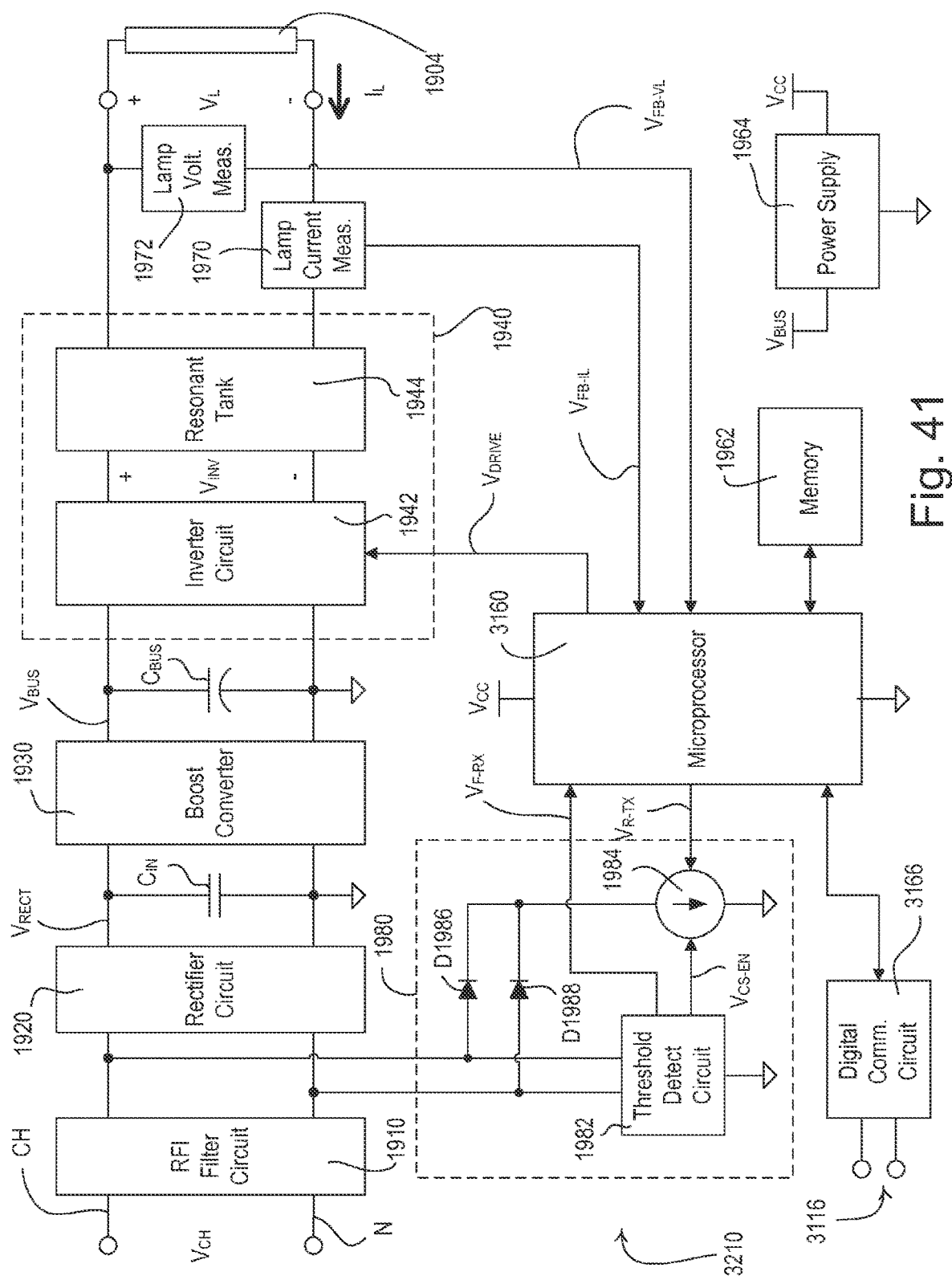
FIG. 41 is a simplified block diagram of an example digital dimming ballast that is able to communicate via a circuit wiring of the load control system, as well as communicate via a wired digital communication link.

FIG. 41 is a simplified block diagram of an example digital dimming ballast 3110 that is able to communicate via a circuit wiring, e.g., the circuit wiring 1714 of the load control system 1700, as well as communicate via a wired digital communication link 3116, such as, for example, a digital addressable lighting interface (DALI) communication link. The digital dimming ballast 3110 shown in FIG. 41 is very similar to the digital dimming ballast 1710 shown in FIG. 26. The digital dimming ballast 3110 comprises a control circuit, e.g., a microprocessor 3160, that is operable to receive the forward digital messages and to transmit the reverse digital messages via the circuit wiring 1714. The digital dimming ballast 3110 also comprises a digital communication circuit 3166 coupled to the microprocessor 3160 for transmitting and receiving digital messages via the wired communication link 3116. The microprocessor 3160 may be operable to automatically detect whether digital messages are being received via the circuit wiring 1714 or the wired communication link 3116 to determine the communication medium on which the digital dimming ballast 3110 will transmit and receive digital messages. Alternatively, both communication mediums could be used to transmit and/or receive digital messages. Additionally or alternatively, the digital communication circuit 3166 could be operable to transmit and receive digital messages via a wireless link (e.g., radio frequency, infra-red, etc).

Figure 42:
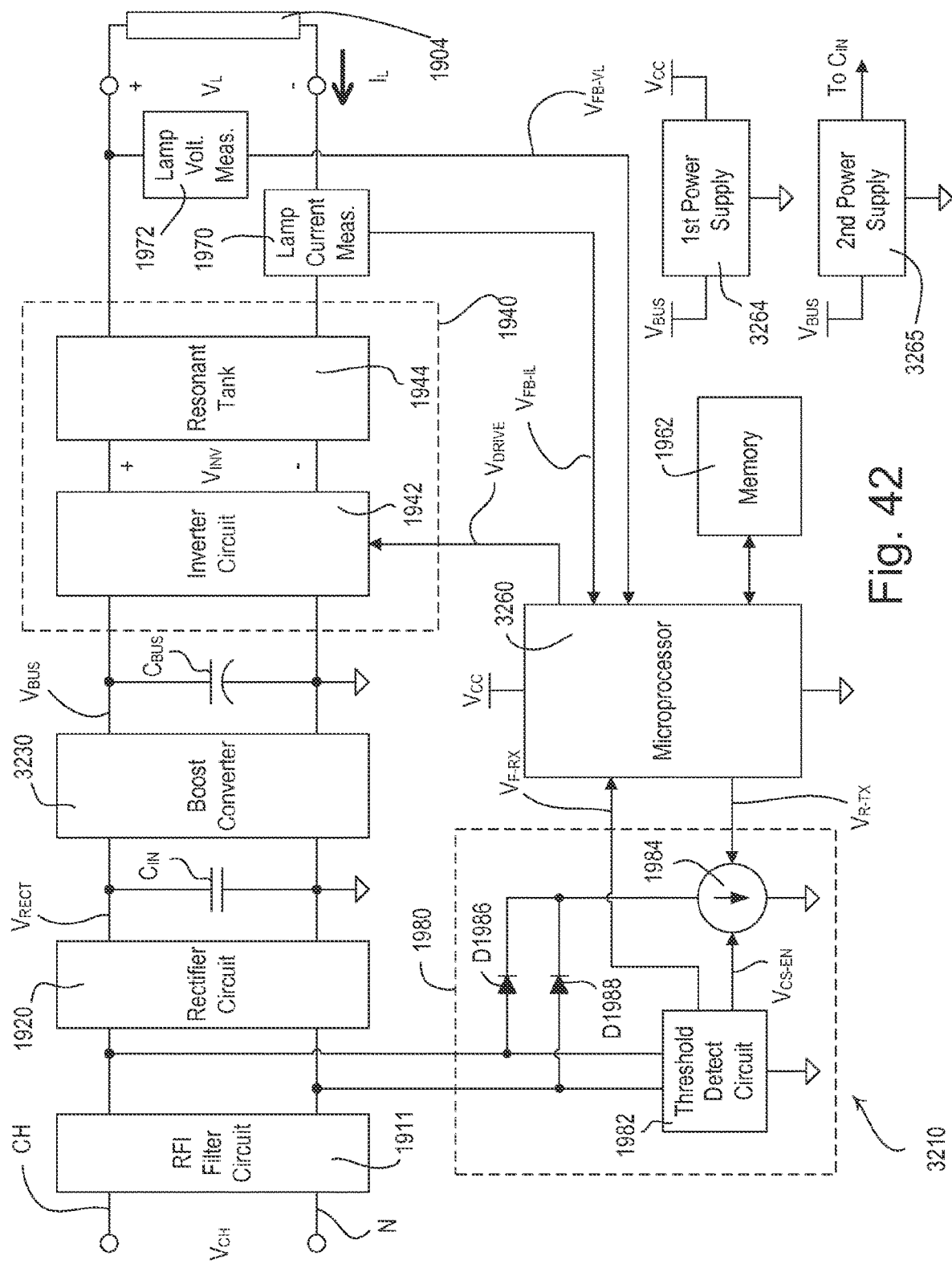
FIG. 42 is a simplified block diagram of an example digital dimming ballast that is able to communicate and receive power via a circuit wiring.

FIG. 42 is a simplified block diagram of an example digital dimming ballast 3210 (e.g., one of the digital dimming ballasts of the load control system 1700 of FIG. 24) that is able to communicate and receive power via a circuit wiring (e.g., the circuit wiring 1714). The digital dimming ballast 3210 shown in FIG. 42 is very similar to the digital dimming ballast 1710 shown in FIG. 26. The digital dimming ballast 3210 comprises a boost converter 3230 that receives a rectified voltage $V_{RECT}$ produced across an input capacitor $C_{IN}$ and generates a bus voltage $V_{BUS}$ across a bus capacitor $C_{BUS}$, where the magnitude of the bus voltage $V_{BUS}$ is greater than the peak magnitude of the rectified voltage $V_{RECT}$. The digital dimming ballast 3210 comprises a first power supply 3264 (e.g., a buck converter) configured to receive the bus voltage $V_{BUS}$ and generate a DC supply voltage $V_{CC}$ for powering a control circuit (e.g., a microprocessor 3260) and the other low-voltage circuitry of the ballast. The digital dimming ballast 3210 also comprises a second, separate power supply 3265 (e.g., a buck converter) that also receives the bus voltage $V_{BUS}$, but is coupled to the input capacitor $C_{IN}$ of the boost converter 3230 (i.e., to the rectified voltage $V_{RECT}$) for charging the input capacitor $C_{IN}$ when the magnitude of the control-hot voltage $V_{CH}$ is approximately zero volts each half-cycle (e.g., when the triac 1810 of the digital power device controller 1820 is non-conductive).

Figure 43:
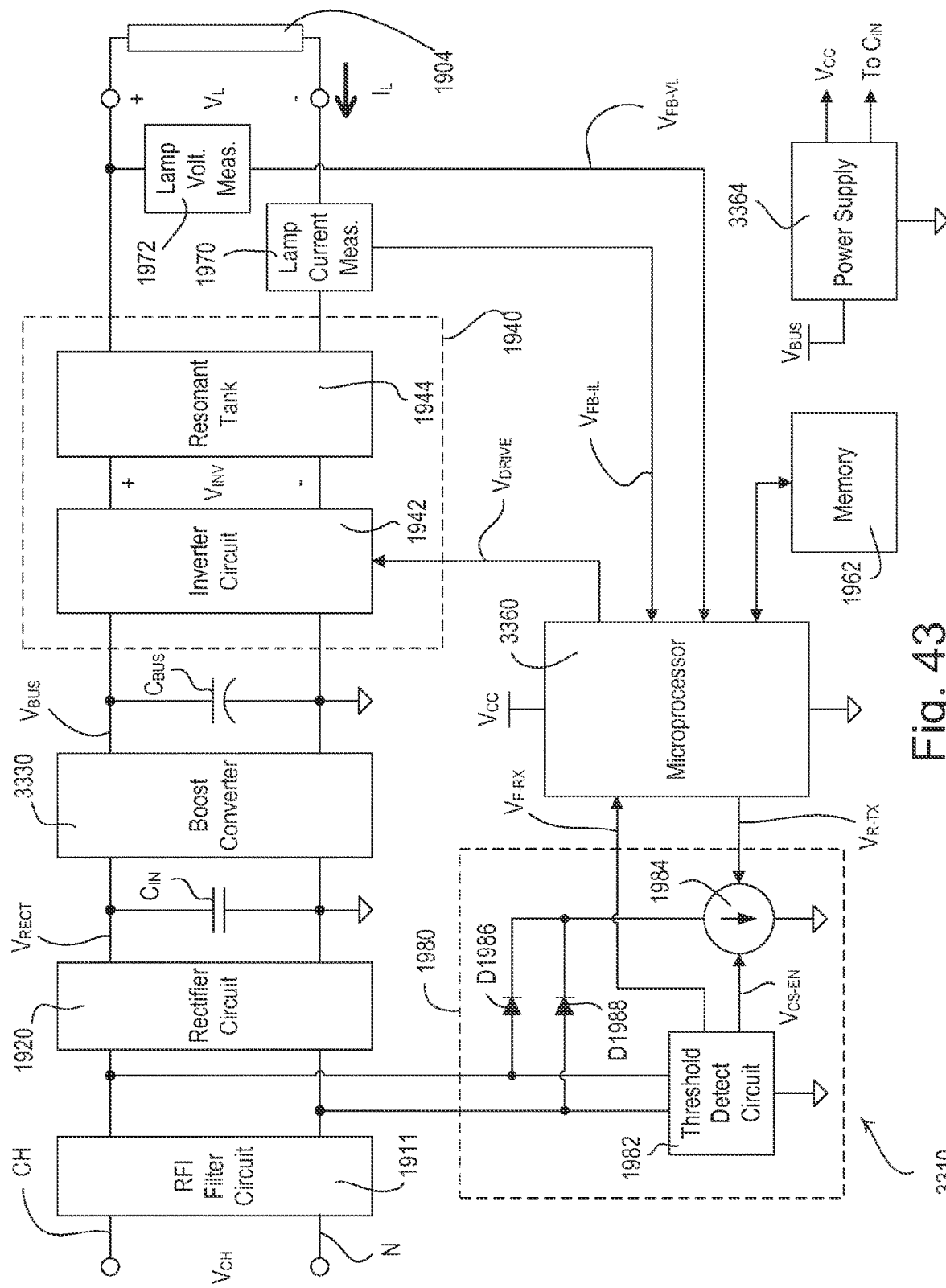
FIG. 43 is a simplified block diagram of another example digital dimming ballast that is able to communicate and receive power via a circuit wiring.

FIG. 43 is a simplified block diagram of an example digital dimming ballast 3310 (e.g., one of the digital dimming ballasts of the load control system 1700 of FIG. 24) that is able to communicate and receive power via a circuit wiring (e.g., the circuit wiring 1714). The digital dimming ballast 3310 shown in FIG. 43 is very similar to the digital dimming ballast 1710 shown in FIG. 26. The digital dimming ballast 3310 comprises a boost converter 3330 that receives a rectified voltage $V_{RECT}$ produced across an input capacitor $C_{IN}$ and generates a bus voltage $V_{BUS}$ across a bus capacitor $C_{BUS}$, where the magnitude of the bus voltage $V_{BUS}$ is greater than the peak magnitude of the rectified voltage $V_{RECTR}$. The digital dimming ballast 3310 comprises a power supply 3364 (e.g., a buck converter) that receives the bus voltage $V_{BUS}$ and has first and second outputs. At the first output, the power supply 3364 provides a DC supply voltage $V_{CC}$ for powering a control circuit (e.g., a microprocessor 3360) and the other low-voltage circuitry of the ballast. The second output of the power supply 3364 is coupled to the input capacitor $C_{IN}$ of the boost converter 3330 for charging the input capacitor $C_{IN}$ when the magnitude of the control-hot voltage $V_{CH}$ is approximately zero volts each half-cycle (e.g., when the triac 1810 of the digital power device controller 1820 is non-conductive).

Figure 44:
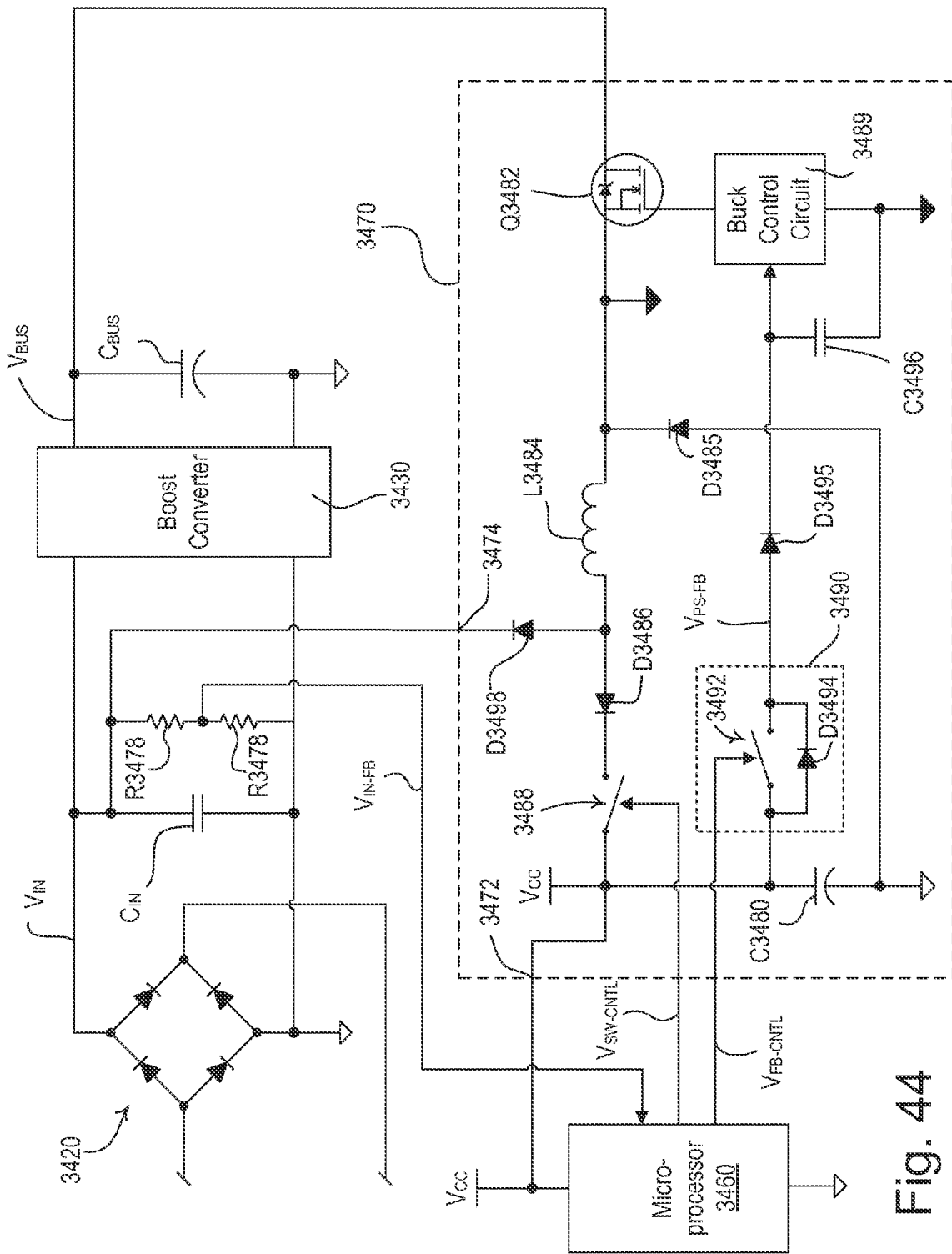
FIG. 44 is a simplified schematic diagram of an example power supply for an electronic ballast.

FIG. 44 is a simplified schematic diagram of an example power supply 3470 for a load control device (e.g., the power supply 3364 of the digital dimming ballast 3310 shown in FIG. 43). The power supply 3470 receives a bus voltage $V_{BUS}$ that may be generated by a boost converter 3430 (e.g., the boost converter 3330 of the digital dimming ballast 3310 shown in FIG. 43). The boost converter 3430 comprises an input for receiving an input voltage $V_{IN}$ (e.g., a rectified voltage) from a rectifier circuit 3420 (e.g., a full-wave bridge rectifier as shown in FIG. 44). An input capacitor $C_{IN}$ is coupled across the input of the boost converter 3430 and may have a capacitance of, for example, approximately 0.22 µF. The power supply 3470 may comprise a first output 3472 for providing a DC supply voltage $V_{CC}$ for powering a control circuit (e.g., a microprocessor 3460). The power supply 3364 comprises a second output 3474 that may be coupled to the input capacitor $C_{IN}$ for charging the input capacitor when the magnitude of the control-hot voltage $V_{CH}$ is approximately zero volts. The microprocessor 3460 receives an input voltage feedback signal $V_{IN\text{-}FB}$ from a resistor divider that is coupled across the input capacitor $C_{IN}$ and includes two resistors R3476, R3478 (e.g., having resistances of approximately 1857 kΩ and 10 kΩ, respectively). The input voltage feedback signal $V_{IN\text{-}FB}$ has a magnitude that is representative of the magnitude of the input voltage $V_{IN}$.

The power supply 3470 is operable to generate the DC supply voltage $V_{CC}$ across a supply capacitor C3480 (e.g., having a capacitance of approximately 220 µF). The power supply 3470 comprises a buck converter including a power switching device, e.g., a FET Q3482, coupled to receive the bus voltage $V_{BUS}$, an inductor L3484 (e.g., having an inductance of approximately 680 µH), and diodes D3485, D3486. The inductor L3484 is coupled between the FET Q3482 and the diode D3486, while the diode D3485 is coupled between circuit common and the junction of the FET Q3482 and the inductor L3484. The diode D3486 is coupled to the supply capacitor C3480 through a first controllable switch 3488 (e.g., a FET), which may be opened and closed in response to a switch control signal $V_{SW\text{-}CNTL}$ generated by the microprocessor 3460. The power supply 3470 further comprises a buck control circuit 3489 coupled to the gate of the FET Q3482 for controlling the operation of the buck converter. The FET Q3482 and the buck control circuit 3489 may be implemented together in an integrated circuit, e.g., a VIPER16 converter, manufactured by STMicroelectronics. The buck control circuit 3489 may be referenced to the junction of the FET Q3482 and the inductor L3484.

The power supply 3470 further comprises a feedback circuit 3490 configured to receive the supply voltage $V_{CC}$ from the supply capacitor C3480. The feedback circuit 3490 generates a feedback signal $V_{PS\text{-}FB}$, which is coupled to the buck control circuit 3489 through a diode D3495 to charge a capacitor C3496. The buck control circuit 3489 is configured to control the operation of the buck converter to generate the DC supply voltage $V_{CC}$ in response to the voltage generated on the capacitor C3496 (i.e., in response to the feedback signal $V_{PS\text{-}FB}$). The feedback circuit 3490 comprises a second controllable switch 3492 (e.g., a FET or a bipolar junction transistor) and a diode D3494 coupled in parallel with the controllable switch. The microprocessor 3460 generates a feedback circuit control signal $V_{FB\text{-}CNTL}$ for controlling the second controllable switch 3492 (i.e., to open and closed the switch).

The microprocessor 3460 is configured to close the first and second controllable switches 3488, 3492 to allow the buck converter to generate the DC supply voltage $V_{CC}$ across the supply capacitor C3480. Because the second controllable switch 3492 is closed, the magnitude of the feedback signal $V_{PS\text{-}FB}$ is approximately equal to the magnitude of the DC supply voltage $V_{CC}$. When the buck control circuit 3489 renders the FET Q3482 conductive, the inductor L3484 is operable to charge from the bus voltage $V_{BUS}$ and the DC supply voltage $V_{CC}$ increases in magnitude. When the FET Q3482 is rendered non-conductive, the inductor L3484 is operable to conduct current through the supply capacitor C3480 and the diode D3485. At this time, the junction of the source of the FET Q3482 and the inductor L3484 (to which buck control circuit 3489 is referenced) is one diode drop below circuit common, and the magnitude of the voltage across the capacitor C3496 is one diode drop below the magnitude of the feedback voltage $V_{PS-FB}$ (which is approximately equal to the magnitude of the supply voltage $V_{CC}$). Accordingly, the voltage across the capacitor C3496 is representative of the magnitude of the supply voltage $V_{CC}$ when the diode D3485 is conductive. The buck control circuit 3489 is operable to control the duty cycle of the FET Q3482 to adjust the magnitude of the supply voltage $V_{CC}$ to a target voltage (e.g., approximately 15 volts).

The junction of the inductor L3484 and the diode D3486 is coupled to the input capacitor $C_{IN}$ for charging the input capacitor through the second output 3474 of the power supply 3470. At the beginning of each half-cycle of the control-hot voltage $V_{CH}$ (i.e., when the magnitude of the control-hot voltage $V_{CH}$ is approximately zero volts), the microprocessor 3460 is configured to open the first controllable switch 3488, such that the input capacitor $C_{IN}$ is operable to charge from the current conducted through the inductor L3484. The microprocessor 3460 is configured to also open the second controllable switch 3492 at the beginning of each half-cycle, such that the magnitude of the feedback signal $V_{PS-FB}$ is less than the magnitude of the DC supply voltage $V_{CC}$. Accordingly, the buck control circuit 3489 tries to increase the magnitude of the DC supply voltage $V_{CC}$ towards the target voltage by increasing the duty cycle of the FET Q3482, such that the magnitude of the input voltage $V_{IN}$ across the input capacitor $C_{IN}$ increases. Since the supply capacitor C3480 is disconnected from the buck converter, the magnitude of the supply voltage $V_{CC}$ continues to decrease, and the magnitude of the input voltage $V_{IN}$ continues to increase. When the magnitude of the input voltage feedback signal $V_{IN-FB}$ indicates that the magnitude of the input voltage $V_{IN}$ across the input capacitor $C_{IN}$ has exceeded an input voltage threshold $V_{IN-TH}$ (e.g., approximately 100-220 volts), the microprocessor 3460 closes the first and second controllable switches 3488, 3492 to allow the buck converter to once again generate the DC supply voltage $V_{CC}$ across the supply capacitor C3480. Alternatively, the diode D3494 of the feedback circuit 3490 could comprise two diodes coupled in series or another impedance element for making the magnitude of the feedback signal $V_{PS-FB}$ to be less than the magnitude of the DC supply voltage $V_{CC}$ when the buck converter is charging the input capacitor $C_{IN}$.

The circuits and methods described herein for charging an input capacitor of a power converter circuit (e.g., the input capacitor $C_{IN}$ for the boost converters 1930, 2030, 3230, 3330, 3430) could be used in any electronic ballast, even ballasts that do not communicate using the communication techniques described herein (e.g., by transmitting and receiving forward and reverse digital messages over a circuit wiring). In addition, the circuits and methods described herein for charging an input capacitor (e.g., the input capacitor $C_{IN}$) could be used in any two-wire load control device (e.g., an LED driver) that may be receiving power from a phase-control signal (e.g., a forward phase-control signal or a control-hot signal as described herein) to reduce the magnitude of the charging current required to charge the input capacitor at the firing time each half-cycle.

Figure 45:
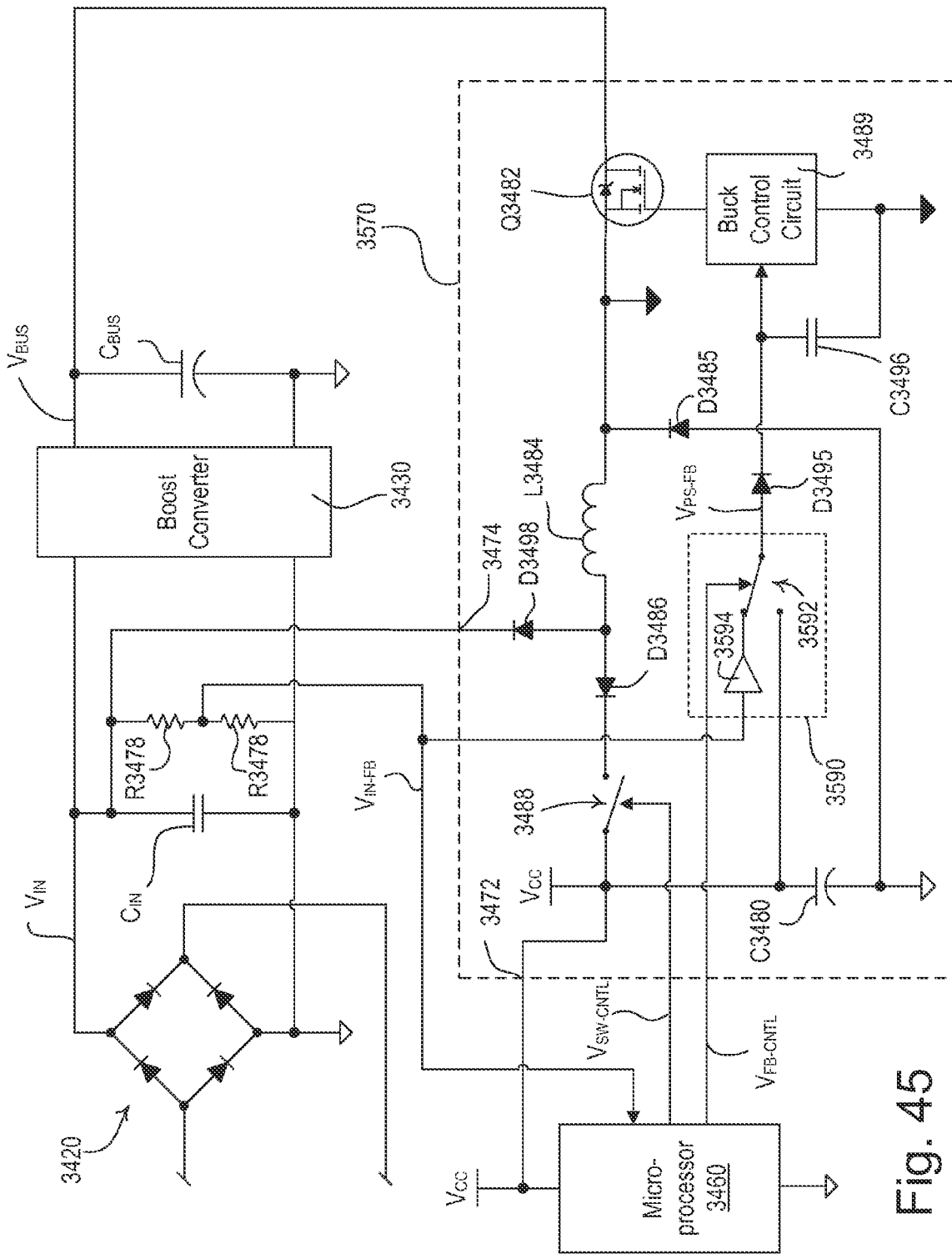
FIG. 45 is a simplified schematic diagram of another example power supply for an electronic ballast.

FIG. 45 is a simplified schematic diagram of another example power supply 3570 for a load control device (e.g., the power supply 3364 of the digital dimming ballast 3310 shown in FIG. 43). The power supply 3570 receives a bus voltage $V_{BUS}$ that may be generated by a boost converter (e.g., the boost converter 3430). The power supply 3570 comprises a buck converter that is similar in operation as the buck converter of the power supply 3470 shown in FIG. 44. However, the power supply 3570 comprises a feedback circuit 3590 that receives the DC supply voltage $V_{CC}$ across the supply capacitor 3480 and the input voltage feedback signal $V_{IN-FB}$, which is representative of the magnitude of the input voltage $V_{IN}$ across the input capacitor $C_{IN}$ of the boost converter 3430. The feedback circuit 3590 comprises a third controllable switch 3592 and a buffer circuit 3594. The microprocessor 3460 generates a feedback circuit control signal $V_{FB-CNTL}$ for controlling the third controllable switch 3592 (i.e., to control the switch between first and second positions).

When the power supply 3570 is charging the supply capacitor C3480, the microprocessor 3460 closes the first controllable switch 3488 and controls the third controllable switch 3592 to a first position, such that the supply voltage $V_{CC}$ is coupled to the diode D3495 and the magnitude of the feedback signal $V_{PS-FB}$ is approximately equal to the magnitude of the supply voltage $V_{CC}$. When the magnitude of the control-hot voltage $V_{CH}$ is approximately zero volts, the microprocessor 3460 opens the first controllable switch 3488, such that the input capacitor $C_{IN}$ is operable to charge from the current conducted through the inductor L3484. At this time, the microprocessor 3460 also controls the third controllable switch 3592 to a second position to coupled the output of the buffer circuit 3594 to the diode D3592, such that the magnitude of the feedback signal $V_{PS-FB}$ is representative of the magnitude of the input voltage $V_{IN}$ across the input capacitor $C_{IN}$. Accordingly, the buck control circuit 3489 will attempt to regulate the magnitude of the input voltage $V_{IN}$ to a predetermined magnitude.

While the present application has been described with reference to the single-phase electric power systems shown in FIGS. 1, 20, 22, and 24, the communication techniques of the present invention could also be applied to two-phase and three-phase electric power systems.

This application is related to commonly-assigned U.S. patent application Ser. No. 13/359,722, filed Jan. 27, 2012, entitled DIGITAL LOAD CONTROL SYSTEM PROVIDING POWER AND COMMUNICATION VIA EXISTING POWER WIRING, the entire disclosure of which is hereby incorporated by reference.

Although the present disclosure has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A load control system comprising:
controller circuitry couplable between a power source and an electric power device, the controller circuitry to:
supply a periodic voltage, via electrical wiring, to the electric power device;
transmit a forward digital message to the electric power device by encoding digital information in timing edges of the periodic voltage;
transmit a short pattern that allows the electric power device to synchronize to a frequency of the periodic voltage prior to the electric power device transmitting a reverse digital message to the controller;
perform error detection on the reverse digital message received from the electric power device;
transmit a retry pattern to the electric power device responsive to detection of an error in the reverse digital message; and receive a retransmitted reverse digital message from the electric power device responsive to the receipt of the retry pattern by the electric power device.

2. The load control system of claim 1:
wherein the controller comprises a controllably conductive device couplable between an alternating current (AC) power supply and the electric power device; and
wherein to supply the periodic voltage to the electric power device, the controller circuitry to further:
supply a phase-controlled AC voltage to the electric power device.

3. The load control system of claim 2 wherein to transmit a forward digital message to the electric power device, the controller circuitry to further:
transmit a forward digital message to the electric power device by encoding digital information in timing edges of the phase-control signal.

4. The load control device of claim 1 wherein to transmit the short pattern that allows the electric power device to synchronize to the frequency of the periodic voltage, the controller circuitry to further:
transmit a short pattern that allows the electric power device to synchronize to a frequency of the periodic voltage, the short pattern having a short pattern length less than the message length of the forward digital message.

5. The load control device of claim 1 wherein to transmit the forward digital message to the electric power device by encoding digital information in timing edges of the periodic voltage, the controller circuitry to further:
transmit a forward digital message that includes:
a four-bit start field;
a four-bit channel mask field;
a two-bit command field;
a five-bit data field; and
a five-bit error correction field.

6. The load control device of claim 2 wherein to supply the phase-controlled AC voltage to the electrical electric power device, the controller circuitry to further:
cause a controllably conductive device operatively coupled between the power source and the electric power device to reversibly transition between a CONDUCTIVE state and a NON-CONDUCTIVE state to provide the phase-controlled AC voltage to the electric power device.

7. A method to control an electric power device, comprising:
supplying, by controller circuitry via electrical wiring, a periodic voltage to an electric power device, the controller circuitry couplable between a power source and the electric power device;
transmitting, by the controller circuitry, a forward digital message to the electric power device by encoding digital information in timing edges of the periodic voltage;
transmitting, by the controller circuitry, a short pattern that allows the electric power device to synchronize to a frequency of the periodic voltage prior to the electric power device transmitting a reverse digital message to the controller circuitry;
performing, by the controller circuitry, error detection on the reverse digital message received from the electric power device;
transmitting, by the controller circuitry, a retry pattern to the electric power device responsive to detection of an error in the reverse digital message; and receiving, by the controller circuitry, a retransmitted reverse digital message from the electric power device responsive to the receipt of the retry pattern by the electric power device.

8. The method of claim 7 wherein supplying the periodic voltage to the electric power device further comprises:
supplying, by the controller circuitry, a phase-controlled AC voltage to the electric power device.

9. The method of claim 8 wherein transmitting the forward digital message to the electric power device further comprises:
transmitting, by the controller circuitry, a forward digital message to the electric power device by encoding digital information in timing edges of the phase-control signal.

10. The method of claim 7 wherein transmitting the short pattern that allows the electric power device to synchronize to the frequency of the periodic voltage further comprises:
transmitting, by the controller circuitry, a short pattern having a short pattern length less than the message length of the forward digital message to the electric power device.

11. The method of claim 7 wherein transmitting the forward digital message to the electric power device by encoding digital information in timing edges of the periodic voltage, further comprises:
transmitting, by the controller circuitry to the electric power device, a forward digital message that includes:
a four-bit start field;
a four-bit channel mask field;
a two-bit command field;
a five-bit data field; and
a five-bit error correction field.

12. The method of claim 8 wherein supplying a phase-controlled AC voltage to the electric power device further comprises:
causing, by the controller circuitry, a controllably conductive device operatively coupled between the power source and the electric power device to reversibly transition between a CONDUCTIVE state and a NON-CONDUCTIVE state to provide the phase-controlled AC voltage to the electric power device.

13. A non-transitory, machine-readable, storage device that includes instructions that when executed by controller circuitry in an electric power device controller, cause the controller circuitry to:
supply, via electrical wiring, a periodic voltage to an operatively coupled electric power device;
transmit a forward digital message to the electric power device by encoding digital information in timing edges of the periodic voltage;
transmit a short pattern that allows the electric power device to synchronize to a frequency of the periodic voltage prior to the electric power device transmitting a reverse digital message to the controller circuitry;
perform error detection on the reverse digital message received from the electric power device;
transmit a retry pattern to the electric power device responsive to detection of an error in the reverse digital message; and
receive a retransmitted reverse digital message from the electric power device responsive to the receipt of the retry pattern by the electric power device.

14. The non-transitory, machine-readable, storage device of claim 13 wherein the instructions that cause the controller circuitry to supply the periodic voltage to the electric power device further cause the controller circuitry to:

supply a phase-controlled AC voltage to the electric power device.

15. The non-transitory, machine-readable, storage device of claim method of claim 14 the instructions that cause the controller circuitry to transmit transmitting the forward digital message to the electric power device further cause the controller circuitry to:
  transmit a forward digital message to the electric power device by encoding digital information in timing edges of the phase-control signal.

16. The non-transitory, machine-readable, storage device of claim 13 wherein the instructions that cause the controller circuitry to transmit the short pattern that allows the electric power device to synchronize to the frequency of the periodic voltage further cause the controller circuitry to:
  transmit a short pattern having a short pattern length less than the message length of the forward digital message.

17. The non-transitory, machine-readable, storage device of claim 13 wherein the instructions that cause the controller circuitry to transmit the forward digital message to the electric power device by encoding digital information in timing edges of the periodic voltage, further cause the controller circuitry to:
  transmitting, by the control circuitry, a forward digital message that includes:
    a four-bit start field;
    a four-bit channel mask field;
    a two-bit command field;
    a five-bit data field; and
    a five-bit error correction field.

18. The non-transitory, machine-readable, storage device of claim 13 wherein the instructions that cause the controller circuitry to supply the periodic voltage to the electric power device further cause the controller circuitry to:
  cause a controllably conductive device operatively coupled between the power source and the electric power device to reversibly transition between a CONDUCTIVE state and a NON-CONDUCTIVE state to provide the phase-controlled AC voltage to the electric power device.

* * * * *